United States Patent
Lussier et al.

(12) 
(10) Patent No.: US 6,451,200 B1
(45) Date of Patent: Sep. 17, 2002

(54) HYDROTHERMALLY STABLE HIGH PORE VOLUME ALUMINUM OXIDE/SWELLABLE CLAY COMPOSITES AND METHODS OF THEIR PREPARATION AND USE

(75) Inventors: Roger Jean Lussier, Ellicott City; Stanislaw Plecha, Columbia; Charles Cross Wear, Severna Park; Gordon Dean Weatherbee, Laurel, all of MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 09/906,237

(22) Filed: Jul. 16, 2001

Related U.S. Application Data

(62) Division of application No. 09/482,734, filed on Jan. 13, 2000.

(51) Int. Cl.$^7$ .............................................. C10G 45/14
(52) U.S. Cl. ....................... 208/300; 208/213; 208/248; 208/251 H; 208/254 H; 208/260; 502/84
(58) Field of Search ................................ 208/213, 218, 208/251 H, 259 H, 260, 300; 502/64

(56) References Cited

U.S. PATENT DOCUMENTS

| | | |
|---|---|---|
| 2,915,365 A | 12/1959 | Saussol |
| 3,222,129 A | 12/1965 | Osment et al. |
| 3,322,495 A | 5/1967 | Magee |
| 3,392,125 A | 7/1968 | Kelly et al. |
| 3,417,028 A | 12/1968 | Montgomery et al. |
| 3,586,478 A | 6/1971 | Neumann |
| 3,630,888 A | 12/1971 | Alpert et al. |
| 3,773,691 A | 11/1973 | Leach |
| 3,803,026 A | 4/1974 | Jaffe |
| 3,844,978 A | 10/1974 | Hickson |
| 3,844,979 A | 10/1974 | Hickson |
| 3,850,849 A | 11/1974 | Kivosky et al. |
| 3,887,454 A | 6/1975 | Hickson |
| 3,887,455 A | 6/1975 | Hamner et al. |
| 3,892,655 A | 7/1975 | Hickson |
| 3,898,322 A | 8/1975 | Leach |
| 3,974,099 A | 8/1976 | Lussier et al. |
| 3,975,510 A | 8/1976 | Leach et al. |
| 3,987,155 A | 10/1976 | Ziegenhain |
| 4,045,331 A | 8/1977 | Ward |
| 4,049,780 A | 9/1977 | Neumann |
| 4,051,072 A | 9/1977 | Bedford et al. |
| 4,069,140 A | 1/1978 | Wunderlich |
| 4,073,718 A | 2/1978 | Hamner |
| RE29,605 E | 4/1978 | Ziegenhain |
| 4,120,943 A | 10/1978 | Iwaisako et al. |

(List continued on next page.)

FOREIGN PATENT DOCUMENTS

| | | | |
|---|---|---|---|
| EP | 537871 | 2/1996 | |
| EP | 837118 | 4/1998 | ........... C10G/11/05 |
| GB | 2153813 | 8/1985 | ........... C04B/38/00 |
| WO | WO 93/11069 | 6/1993 | |
| WO | WO 94/16996 | 8/1994 | |
| WO | WO 95/31280 | 11/1995 | |

*Primary Examiner*—Bakir L. Yildirim
(74) *Attorney, Agent, or Firm*—Robert A. Maggio

(57) ABSTRACT

Porous composite particles are provided which comprise an aluminum oxide component, e.g., crystalline boehmite, and a swellable clay component, e.g., synthetic hectorite, intimately dispersed within the aluminum oxide component at an amount effective to increase the hydrothermal stability, pore volume, and/or the mesopore pore mode of the composite particles relative to the absence of the swellable clay. Also provided is a method for making the composite particles, agglomerate particles derived therefrom, and a process for hydroprocessing petroleum feedstock using the agglomerates to support a hydroprocessing catalyst.

12 Claims, 24 Drawing Sheets

EFFECT OF 3% LAPONITE WITH/WITHOUT MILLING ON THE 800C STEAMED SURFACE AREA OF BOEHMITE FROM REHYDRATED CALCINED ALUMINA

U.S. PATENT DOCUMENTS

| | | |
|---|---|---|
| 4,124,699 A | 11/1978 | Michel et al. |
| 4,159,969 A | 7/1979 | Mone et al. |
| 4,175,118 A | 11/1979 | Wassermann et al. |
| 4,176,090 A | 11/1979 | Vaughan et al. ............ 252/455 |
| 4,276,201 A | 6/1981 | Sawyer |
| 4,309,278 A | 1/1982 | Sawyer |
| 4,375,406 A | 3/1983 | Santilli ...................... 208/251 |
| 4,392,987 A | 7/1983 | Laine et al. |
| 4,497,909 A | 2/1985 | Itoh et al. |
| 4,508,841 A | 4/1985 | Onuma et al. ................ 502/73 |
| 4,579,839 A | 4/1986 | Pearson |
| 4,629,712 A | 12/1986 | Pinnavaia et al. ............ 502/63 |
| H189 H | 1/1987 | Bauer |
| 4,637,992 A | 1/1987 | Lewis et al. ................... 502/84 |
| 4,657,665 A | 4/1987 | Beaton et al. .............. 208/216 |
| 4,708,945 A | 11/1987 | Murrell et al. |
| 4,761,391 A | 8/1988 | Occelli ........................ 502/63 |
| 4,791,090 A | 12/1988 | Pereira et al. |
| 4,844,790 A | 7/1989 | Occelli |
| 4,886,594 A | 12/1989 | Miller |
| 4,981,825 A | 1/1991 | Pinnavaia et al. ............. 502/63 |
| 4,995,964 A | 2/1991 | Gortsema et al. ........... 208/112 |
| 5,032,379 A | 7/1991 | Pedersen |
| 5,114,895 A | 5/1992 | Holmgren et al. |
| 5,160,032 A | 11/1992 | Holmgren et al. ............ 208/46 |
| 5,244,648 A | 9/1993 | Dupin et al. |
| 5,266,300 A | 11/1993 | Harrison |

HYDROTHERMALLY STABLE HIGH PORE VOLUME ALUMINUM OXIDE/SWELLABLE CLAY COMPOSITES AND METHODS OF THEIR PREPARATION AND USE

This is a division of application Ser. No. 09/482,734, filed Jan. 13, 2000.

FIELD OF THE INVENTION

This invention relates to high pore volume aluminum oxide composite particles, methods of their production, agglomerates and supported catalysts derived therefrom; and methods of using said catalysts.

BACKGROUND OF THE INVENTION

The art relating to particulate porous alumina particles, shaped catalyst supports derived therefrom, supports impregnated with various catalytically active metals, metal compounds and/or promoters, and various uses of such impregnated supports as catalysts, is extensive and relatively well developed.

While the prior art shows a continuous modification and refinement of such particles, supports, and catalysts to improve their catalytic activity, and while in some cases highly desirable activities have actually been achieved, there is a continuing need in the industry for improved catalyst supports and catalysts derived therefrom. which have enhanced activity and life mediated through a desirable balance of morphological properties.

Alumina is useful for a variety of applications including catalyst supports and catalysts for chemical processes, catalyst linings for automotive mufflers, and the like. In many of these uses it will be desirable to add catalytic materials, such as metallic ions, finely-divided metals, cations, and the like, to the alumina. The level and distribution of these metals on the support, as well as the properties of the support itself are key parameters that influence the complex nature of catalytic activity and life.

Alumina useful in catalytic applications has been produced heretofore by a variety of processes, such as the water hydrolysis of aluminum alkoxides, precipitation of alumina from alum, sodium aluminate processes, and the like. High costs arise from the latter two methods because the quantity of by-products, such as sodium sulfate, actually exceed the quantity of desired product obtained, i.e., boehmite. Typically, the cost of boehmite will be 4 times as expensive as active alumina.

Generally speaking, while alumina from these sources can be used for catalyst supports, such use is subject to certain limitations. This stems from the fact that for supported catalysts used in chemical reactions, the morphological properties of the support, such as surface area, pore volume, and pore size distribution of the pores that comprise the total pore volume are very important. Such properties are instrumental in influencing the nature and concentration of active catalytic sites, the diffusion of the reactants to the active catalyst site, the diffusion of products from the active sites, and catalyst life.

In addition, the support and its dimensions also influence the mechanical strength, density and reactor packing characteristics, all of which are important in commercial applications.

Hydroprocessing catalysts in petroleum refining represent a large segment of alumina-supported catalysts in commercial use. Hydroprocessing applications span a wide range of feed types and operating conditions, but have one or more of common objectives, namely, removal of heteroatom impurities (sulfur, nitrogen, oxygen, metals), increasing the H/C ratio in the products (thereby reducing aromatics, density and/or carbon residues), and cracking carbon bonds to reduce boiling range and average molecular weight.

More particularly, the use of a series of ebullated bed reactors containing a catalyst having improved effectiveness and activity maintenance in the desulfurization and demetallation of metal-containing heavy hydrocarbon streams are well known.

As refiners increase the proportion of heavier, poorer quality crude oil in the feedstock to be processed, the need grows for processes to treat the fractions containing increasingly higher levels of metals, asphaltenes, and sulfur.

It is widely known that various organometallic compounds and asphaltenes are present in petroleum crude oils and other heavy petroleum hydrocarbon streams, such as petroleum hydrocarbon residua, hydrocarbon streams derived from tar sands, and hydrocarbon streams derived from coals. The most common metals found in such hydrocarbon streams are nickel, vanadium, and iron. Such metals are very harmful to various petroleum refining operations, such as hydrocracking, hydrodesulfurization. and catalytic cracking. The metals and asphaltenes cause interstitial plugging of the catalyst bed and reduced catalyst life. The various metal deposits on a catalyst tend to poison or deactivate the catalyst. Moreover, the asphaltenes tend to reduce the susceptibility of the hydrocarbons to desulfurization. If a catalyst, such as a desulfurization catalyst or a fluidized cracking catalyst, is exposed to a hydrocarbon fraction that contains metals and asphaltenes, the catalyst will become deactivated rapidly and will be subject to premature replacement.

Although processes for the hydrotreating of heavy hydrocarbon streams, including but not limited to heavy crudes, reduced crudes, and petroleum hydrocarbon residua, are known, the use of fixed-bed catalytic processes to convert such feedstocks without appreciable asphaltene precipitation and reactor plugging and with effective removal of metals and other contaminants, such as sulfur compounds and nitrogen compounds, are not common because the catalysts employed have not generally been capable of maintaining activity and performance.

Thus, certain hydroconversion processes are most effectively carried out in an ebullated bed system. In an ebullated bed, preheated hydrogen and resid enter the bottom of a reactor wherein the upward flow of resid plus an internal recycle suspend the catalyst particles in the liquid phase. Recent developments involved the use of a powdered catalyst which can be suspended without the need for a liquid recycle. In this system, part of the catalyst is continuously or intermittently removed in a series of cyclones and fresh catalyst is added to maintain activity. Roughly about 1 wt. % of the catalyst inventory is replaced each day in an ebullated bed system. Thus, the overall system activity is the weighted average activity of catalyst varying from fresh to very old i.e., deactivated.

In general, it is desirable to design the catalyst for the highest surface area possible in order to provide the maximum concentration of catalytic sites and activity. However, surface area and pore diameter are inversely related within practical limits. Sufficiently large pores are required for diffusion as the catalyst ages and fouls, but large pores have a lower surface area.

More specifically, the formulator is faced with competing considerations which often dictate the balance of morphological properties sought to be imparted to supports or catalysts derived therefrom.

For example, it is recognized (see for example. U.S. Pat. No. 4,497,909) that while pores having a diameter below 60 Angstroms (within the range of what is referred to herein as the micropore region) have the effect of increasing the number of active sites of certain silica/alumina hydrogenation catalysts, these very same sites are the first ones clogged by coke thereby causing a reduction in activity. Similarly, it is further recognized that when such catalysts have more than 10% of the total pore volume occupied by pores having a pore diameter greater than 600 Angstroms (within the region referred to herein generally as the macropore region), the mechanical crush strength is lowered as is the catalyst activity. Finally, it is recognized, for certain silica/alumina catalysts, that maximization of pores having a pore diameter between 150 and 600 Angstroms (approximately within the region referred to herein as the mesopore region) is desirable for acceptable activity and catalyst life.

Thus, while increasing the surface area of the catalyst will increase the number of the active sites, such surface area increase naturally results in an increase in the proportion of pores in the micropore region. As indicated above, micropores are easily clogged by coke. In short, increases in surface area and maximization of mesopores are antagonistic properties.

Moreover, not only must the surface area be high, but it should also remain stable when exposed to conversion conditions such as high temperature and moisture. There has therefore been a continuing search for high pore volume, high surface area, hydrothermally stable alumina suitable for catalyst supports. The present invention was developed in response to this search.

U.S. Pat. No. 4,981,825 is directed to compositions of inorganic metal oxide (e.g., $SiO_2$) and clay particles wherein the oxide particles are substantially segregated from each other by the clay particles. Suitable clays include Laponite®. The disclosed ratio of metal oxide:clay is between 1:1 to 20:1 (preferably 4:1 to 10:1). The subject composition is derived from an inorganic oxide sol having a particle size of 40 to 800 Angstroms (0.004 to 0.08 microns). The particle size of the final product is dependent on the size of the particles in the starting sol, although the final particle size is unreported. It is critical that the metal oxide and clay particles have opposite charges so that they will be attracted to each other such that the clay particles inhibit aggregation of the metal oxide particles. Thus, the clay particles are described as being placed between the sol particles. Control of the charges on the two different types of particles is determined by the pH of the sol. The pH of the inorganic oxide is controlled to be below its isoelectric point by acid addition thereby inducing a positive charge on the inorganic oxide particles. While suitable inorganic metal oxides are disclosed to also include $Al_2O_3$, no examples of carrying out the invention using $Al_2O_3$ are provided. Consequently, translating this concept to $Al_2O_3$ is not without difficulty. For example, the isoelectric point of $Al_2O_3$ is at a basic pH of about 9. However, $Al_2O_3$ sols only form at a low pH of less than about 5. If the pH exceeds about 5, an $Al_2O_3$ sol will precipitate from dispersion or never form in the first place. In contrast, $SiO_2$ sols do not have to be acidic. Consequently, while any point below the isoelectric point is acceptable for $SiO_2$ sols, the same is not true of $Al_2O_3$ sols. Rather, one must operate at a pH well below the isoelectric point of the $Al_2O_3$ in the pH region where alumina sols form. Moreover, this patent discloses nothing about the pore properties of the resulting composite and its thrust is only directed toward obtaining high surface area. As indicated above, surface area and high mesopore pore volume are typically antagonistic properties.

In contrast, the presently claimed invention neither starts with an $Al_2O_3$ sol nor forms a sol during rehydration. The pH at which the presently claimed composites are formed is too high for a sol to form during rehydration and the starting alumina particles are too big for a sol to form initially.

Another area of technology relating to combinations of various clay and metal oxides is known as intercalated clays. Intercalated clays are represented by U.S. Pat. Nos. 3,803, 026; 3,887,454 (See also U.S. Pat. No. 3,844,978); U.S. Pat. No. 3,892,655 (See also U.S. Pat. No. 3,844,979); U.S. Pat. Nos. 4,637,992; 4,761,391 (See also U.S. Pat. No. 4,844, 790); and U.S. Pat. No. 4,995,964. Intercalated clay patents typically have in common the requirement that large clay:sol ratios be employed. Intercalated clays generally have most of their surface area in micropores unless freeze-dried.

U.S. Pat. No. 3,803,026 discloses a hydrogel or hydrogel slurry comprising water, a fluorine-containing component, and an amorphous cogel comprising oxides or hydroxides of silicon and aluminum. The amorphous cogel further comprises an oxide or hydroxide of at least one element selected from magnesium, zinc, boron, tin, titanium, zirconium, hafnium, thorium, lanthanum, cerium, praseodymium, neodymium, and phosphorus, said amorphous cogel being present in the hydrogel or hydrogel slurry at an amount of from 5 to 50 wt. %. The slurry is subjected to a pH of 6 to 10 and conversion conditions create a substantial amount of crystalline aluminosilicate mineral, preferably in intimate admixture with a substantial amount of unreacted amorphous cogel. The silica/alumina molar ratio is at least 3:1 and the resulting material is referred to as a synthetic layered crystalline clay-type aluminosilicate mineral and the unreacted amorphous co-gel exists mostly as $SiO_2$. At column 5, lines 39 et seq., it is disclosed that the resulting aluminosilicate can be broken into particles, pulverized into a powder, the powder dispersed in a hydrogel, or hydrogel slurry to which is added components selected from precursor compounds of, inter-alia, alumina. The resulting mixture is then dried and activated. Notwithstanding the above disclosure, no specific examples employing a mixture of silica-aluminate with alumina is disclosed. Consequently, neither the starting alumina, the final alumina, nor the amounts employed of each material are disclosed.

U.S. Pat. No. 3,887,454 (and its parent U.S. Pat. No. 3,844,978) discloses a layered type dioctaliedral, clay-like mineral (LDCM) composed of silica, alumina, and having magnesia incorporated into its structure in controlled amounts. Preferred clays are montmorillonite and kaolin. At column 6, lines 24 et seq., it is disclosed that the clay material can be combined generally with inorganic oxide components such as, interalia, amorphous alumina. In contrast, the presently claimed composite utilizes crystalline boehmite alumina. Similar disclosures are found in U.S. Pat. Nos. 3.892,655: and 3,844,979, except that these latter patents are directed to layer-type. trioctahedral, clay-like mineral containing magnesia as a component thereof (LTCM) and illustrated with a saponite type clay.

U.S. Pat. No. 4,637,992 is an intercalated clay patent which employs colloidal suspension of inorganic oxides and adds a swellable clay thereto. While specific ranges illustrating the ratio of clay to inorganic oxide are not disclosed, it appears that the final material is still referred to as being a clay based substrate into which is incorporated the inorganic oxide. Consequently, this suggests that the final material contains a major amount of clay rather than a predominate amount of aluminum oxide and very minor amounts of clay as in the present invention. See for example, column 5, lines 46 et seq., of the '992 patent.

U.S. Pat. No. 4,844,790 (division of U.S. Pat. No. 4,761, 391) is directed to a delaminated clay prepared by reacting a swellable clay with a pillaring agent which includes alumina. The ratio of clay to pillaring agent is 0.1:1 to 10:1, preferably between 1:1 to 2:1. The primary thrust of the patent, however, is clay containing alumina and not alumina containing less than 10 wt. % clay. It is reasoned that the metal oxides prop apart the platelets of the clay and impart acidity thereto which is responsible for the catalytic activity of the delaminated clay. The preferred clay is a Laponite®.

U.S. Pat. No. 4,995,964, is directed to a product prepared by intercalating expandable clay (hectorite, saponite, montmorillonite) with oligimers derived from rare earth salts, and in particular, trivalent rare earths, and polyvalent cations of pillaring metals, such as $Al^{-3}$. The aluminum oxide material is an aluminum containing oligimer which is used in providing the pillars of the expanded clays. The claimed invention does not use or produce oligimers of aluminum hydroxy materials.

U.S. Pat. No. 4,375,406 discloses compositions containing fibrous clays and precalcined oxides prepared by forming a fluid suspension of the clay with the precalcined oxide, agitating the suspension to form a codispersion, and shaping and drying the codispersion. The ratio of fibrous formed clay to precalcined oxide composition can vary from 20:1 to 1:5. These amounts are well above the amounts of clay employed in the presently claimed invention. Moreover, fibrous clay is not within the scope of the swellable clays described herein.

A number of patents are directed to various types of alumina and methods of making the same, namely, U.S. Pat. No. Re 29,605; SIR H198; and U.S. Pat. Nos. 3,322,495; 3,417,028; 3,773,691; 3,850,849; 3,898,322; 3,974,099; 3,987,155; 4,045,331; 4,069,140; 4,073,718; 4,120,943; 4,175,118; 4,708,945; 5,032,379; and 5,266,300.

More specifically, U.S. Pat. No. 3,974,099 is directed to silica/alumina hydrogels from sodium silicate and sodium aluminate cogels. The essence of this invention is directed to the precipitation of $Al_2O_3$ onto silica-alumina gel which stabilizes the cracking sites to hydrothermal deactivation. (Column 2, lines 43 et seq.) The resulting material typically has about 38.6% alumina oxide when all the excess sodium aluminate is removed. In contrast, the silica employed in the presently claimed invention is an additive which coats the surface of the alumina/clay composite particles since it is added after the composite formation.

U.S. Pat. No. 4,073,718 discloses a catalyst base of alumina stabilized with silica on which is deposited a cobalt or nickel catalyst.

U.S. Pat. No. 4,708,945 discloses a cracking catalyst of silica supported on boehmite-like surface by compositing particles of porous boehmite and treating them with steam at greater than 500° C. to cause silica to react with the boehmite. 10% silica is usually used to achieve a surface monolayer of silica to improve thermal stability.

U.S. Pat. No. 5,032,379 is directed to alumina having greater than 0.4 cc/g pore volume and a pore diameter in the range of 30 to 200 Å. The alumina is prepared by mixing two different types of rehydration bondable aluminas to produce a product having a bimodal pore distribution.

U.S. Pat. No. 4,266,300 discloses an alumina support prepared by mixing at least two finely divided aluminas, each of which is characterized by at least one pore mode in at least one of the ranges (i) 100,000 to 10,000 Å, (ii) 10,000 to 1,000 Å, (iii) 1,000 to 30 Å.

U.S. Pat. No. 4,791,090 discloses a catalyst support with a bidispersed micropore size distribution. Column 4, lines 65, discloses that two sizes of micropores can be formulated by mixing completely different materials having different pore sizes such as alumina and silica.

U.S. Pat. No. 4,497,909 is directed to silica/alumina carriers having a silica content less than about 40% by weight and at least one noble metal component of Group VII of the Periodic Table and wherein the catalyst contains pores having a diameter smaller than 600 Å occupying at least 90% of the total pore volume, and pores having a diameter of 150 to 600 Å occupying at least about 40% of the total pore volume made up of pores having a diameter smaller than 600 Å.

The following patents disclose various types of clays: U.S. Pat. Nos. 3,586,478; 4,049,780; 4,629,712; and PCT Publication Nos. WO 93/11069; and WO 94/16996.

The following patents disclose various types of agglomerates which can be formed from alumina: U.S. Pat. Nos. 3,392,125: 3,630,888; 3,975,510; 4,124,699; 4,276,201 (see also U.S. Pat. No. 4,309,278); U.S. Pat. Nos. 4,392,987; and 5,244,648.

U.S. Pat. No. 4,276,201 discloses a hydroprocessing catalyst which utilizes an agglomerate support of alumina, e.g., beaded alumina, and silica wherein the silica is less than 10 wt. % of the support. The agglomerate support has a surface area of 350–500 $m^2$/g. A total pore volume (TPV) of 1.0 to 2.5 cc/g with less than 0.20 cc/g of the TPV residing in pores having a diameter greater than 400 Å.

U.S. Pat. No. 5,114,895 discloses a composition of a layered clay homogeneously dispersed in an inorganic oxide matrix such that the clay layers are completely surrounded by the inorganic oxide matrix. The inorganic oxide matrix is selected from alumina, titania, silica, zirconia, $P_2O_5$ and mixtures. Suitable clays include bentonite, sepiolite, Laponite™, vermiculite, montmorillonite, kaolin, palygorskite (attapulgus), hectorite, chlorite, beidellite, saponite, and nontronite. To get the clay homogeneously dispersed within the inorganic oxide matrix, a precursor of the inorganic oxide is dispersed as a sol or hydrosol and gelled in the presence of the clay. While clay contents of 5 to 70 wt. % are disclosed broadly, the Examples employ at least 30 wt. % clay. In addition, none of the pore properties or the resulting product are disclosed.

U.S. Pat. No. 4,159,969 discloses a process for the manufacture of agglomerates of aluminum oxide by contacting a hydrous aluminum oxide gel with an organic liquid immiscible with water wherein the amount of said liquid is a function of the water in the hydrous aluminum oxide gel. An amount of clay, such as bentonite or kaolin, sufficient to increase the strength of the agglomerates may be added to the aluminum oxide during or after gelation. No specific amount of clay is disclosed and kaolin is not a swellable clay. None of the examples employ clay.

U.S. Pat. No. 3,630,888 discloses a catalyst having a structure in which access channels having diameters between about 100 and 1000 Å units constitute 10 to 40% of the total pore volume and in which access channels having diameters greater than 1000 Å units constitute between about 10 to about 40% of the total pore volume, while the remainder of the pore volume comprises 20 to 80% of micropores with diameters less than 100 Å.

The following patents disclose various hydroprocessing operations and use of catalysts therein: U.S. Pat. Nos. 3,887,455; 4,657,665; 4,886,594: PCT Publication No. WO 95/31280.

SUMMARY OF THE INVENTION

The present invention is based on the discovery that when active alumina is dispersed and subjected to a rehydration process in the presence of controlled amounts of a dispersed swellable clay, the resulting composite particles exhibit and maintain high surface area while simultaneously possessing a higher pore volume and pore mode in the mesopore region relative to the absence of the clay. These properties are substantially preserved in agglomerates, e.g., shaped extrudates, derived from the composite particles before and after impregnation with catalytically active metal components such as those employed for hydroprocessing operations. In addition, the incorporation of the swellable clay improves the hydrothermal stability of the composite particles.

Improvements in hydrothermal stability improve the overall economics of a process employing the same while shifts to higher mesopore pore modes increase the activity of supported catalyst derived from the composite particles. A higher pore mode improves accessibility of the hydrocarbons and reduces the possibility of the pores being plugged due to coke or metals deposition.

High pore volume aluminas are often prepared by azeotroping with alcohols to remove the water before drying. The alcohol is used to reduce the surface tension of the water which in turn reduces the shrinkage of pores during drying. This technique is very expensive and environmentally unfriendly. Aluminas with a high average pore diameter (APD) are often prepared by sintering at high temperatures. While sintering increases the APD of the unsintered material, it necessarily decreases the surface area relative to the unsintered material. Thus, one is forced to sacrifice surface area in order to achieve the higher APD. It has been found that one can not only shift the mesopore pore mode to larger pores prior to sintering, but also it is believed that less shrinkage in pore diameter will occur upon exposure to elevated temperatures(commonly associated with sintering without clay). Thus, since one can start with a higher pore mode, and less shrinkage occurs from that higher pore mode, a high surface area, high pore volume product can be obtained in a more cost efficient and environmentally friendly manner, e.g., alcohol azeotroping can be eliminated, and the temperatures to which the alumina would otherwise need to be heated can be lowered.

Accordingly, in one aspect of the present invention there is provided porous composite particles comprising an aluminum oxide component and a swellable clay component intimately dispersed within the aluminum oxide component wherein in said composite particles:

(A) the alumina oxide component comprises at least 75 wt. % alumina, at least 5 wt. % of which alumina is in the form of crystalline boehmite, gamma alumina derived from the crystalline boehmite, or mixtures thereof;

(B) the swellable clay component is dispersible prior to incorporation into the composite particle and present in the composite particles at an amount (a) of less than about 10 wt. %, based on the combined weight of the aluminum oxide component and the swellable clay component. and (b) effective to increase at least one of the hydrothermal stability, nitrogen pore volume, and nitrogen mesopore pore mode of the composite particles relative to the corresponding hydrothermal stability, pore volume and mesopore pore mode, of the aluminum oxide component in the absence of said swellable clay; and (C) the average particle diameter of the composite particles is from about 0.1 to about 100 microns.

In a further aspect of the present invention, there is provided a process for making porous composite particles comprising:

(A) forming a non-colloidal dispersion comprising at least one aluminum oxide component comprising at least 75 wt. % active alumina, and at least one swellable clay component in a liquid dispersing medium;

(B) rehydrating the active alumina of the aluminum oxide component in the presence of said dispersed swellable clay to convert at least 5 wt. % of the active alumina to crystalline boehmite and to form composite particles comprising an effective amount of swellable clay intimately dispersed within the aluminum oxide component, said effective amount of swellable clay being (i) less than 10 wt. %, based on the combined weight of the aluminum oxide component and swellable clay component, and (ii) sufficient to provide an increase in at least one of the hydrothermal stability, nitrogen pore volume and nitrogen mesopore pore mode of the composite particles relative to the corresponding hydrothennal stability, pore volume, and mesopore pore mode, of the aluminum oxide component in the absence of said swellable clay;

(C) recovering the composite particles from the dispersion; and (D) optionally calcining the recovered composite particles at a temperature of from about 250 to about 1,000° C. for a time of from about 0.15 to about 3 hours.

In another aspect of the present invention, there is provided agglomerates of the above particles.

In a further aspect of the present invention, there is provided supported catalysts derived from the above agglomerates.

In a still further aspect of the present invention, there is provided a process for hydroprocessing petroleum feedstock using the above agglomerates as supports for hydroprocessing catalysts.

BRIEF DESCRIPTION OF THE DRAWINGS

The following table summarizes FIGS. 1 to 24 which are plots derived from the examples. The pertinent information about the Figures including the corresponding Run Numbers, Example or Comparative Example Number, the X-axis, Y-axis and plot legends are provided in the following table:

Figure Summary Table

| Figure No. | Run Nos. | Ex or C Ex. No. | X-Axis | Y-Axis | Legend Designations | Invention Disclosure Designation Ref. No. | Attachment No. or Orig. Figure No. |
|---|---|---|---|---|---|---|---|
| 1 | 1–2 | Ex. 1 | N$_2$ Pore Diameter A | dV/d Log D | -⊖-Run 1 (0% L)<br>-■-Run 2 (2 wt. % L) | 9433 | A-2 |
| 2 | 3–5 | Ex. 2 | N$_2$ Pore Diameter A | dV/d Log D | -⊖-Run 3 (0% L)<br>-■-Run 4 (0.5 wt. % L)<br>-▲-Run 5 (1 wt. % L) | 9433 | A-4 |
| 3 | 3, 6, 7, 9, 10 | Ex. 2 | N$_2$ Pore Diameter A | dV/d Log D | -⊖-Run 1 (0% L)<br>-■-Run 6 (2 wt. % L)<br>-▲-Run 7 (3 wt. % L)<br>-+-Run 9 (5 wt. % L)<br>-⊞-Run 10 (6 wt. % L) | 9433 | A-5 |

-continued

Figure Summary Table

Figure 9:
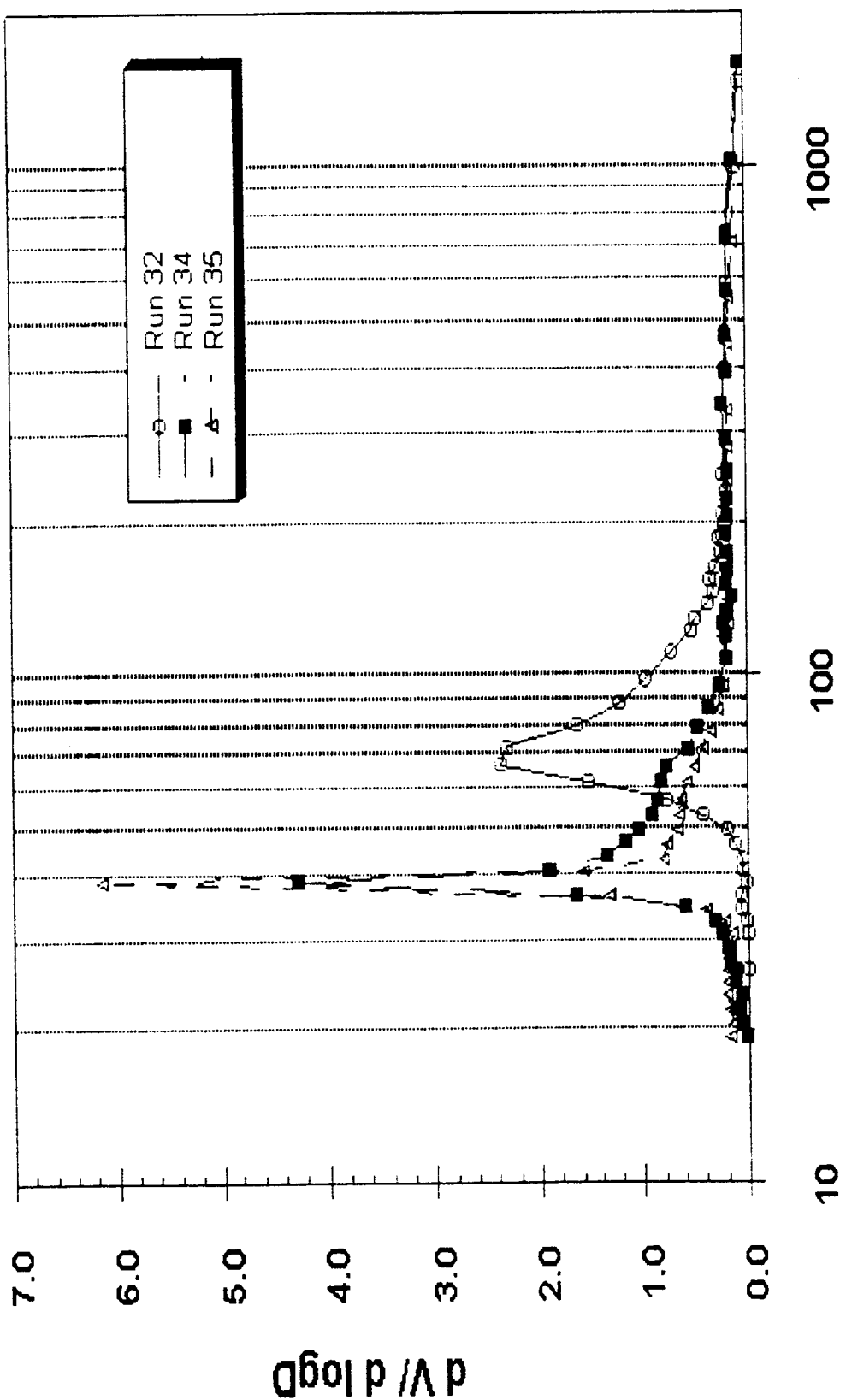
Figure 10:
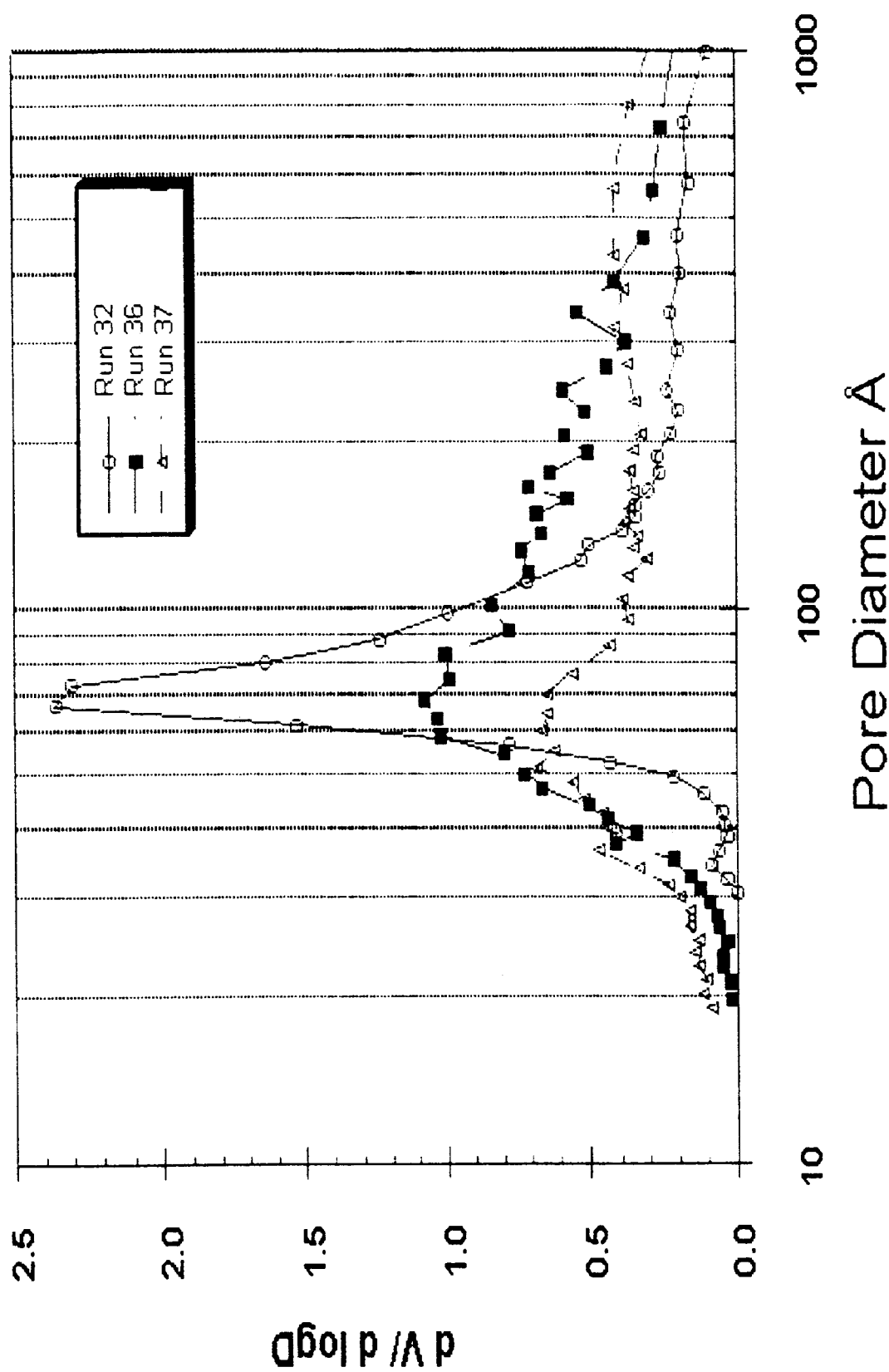

| Figure No. | Run Nos. | Ex or C Ex. No. | X-Axis | Y-Axis | Legend Designations | Ref. No. | Attachment No. or Orig. Figure No. |
|---|---|---|---|---|---|---|---|
| 4 | 16–1, 16–2 | Ex. 4 | $N_2$ Pore Diameter Å | dV/d Log D | -○- Run 3 (0% wt. % L)<br>-■- Run 16–1 (3 wt. % SH-1)<br>-△- Run 16–2 (3 wt. % SH-2) | 9433 | A-7 |
| 5 | 17–19 | Ex. 5 | $N_2$ Pore Diameter Å | dV/d Log D | -○- Run 17 (0% L)<br>-■- Run 18 (4 wt. % NH-1)<br>-△- Run 19 (4 wt. % NH-2) | 9433 | A-8 |
| 6 | 22–23 | Ex. 6 | wt. % L | Steamed SA ($m^2/g$) | -□- Run 22 (AP-15)<br>-○- Run 23 (CP-3) | 9433 | A-10 |
| 7 | 24–25 | Ex. 7 | wt. % L | Steamed SA ($m^2/g$) | -□- Run 24 (Post hydration)<br>-○- Run 25 (Pre hydration) | 9433 | A-11 |
| 8 | 26–28 | Ex. 8 | $N_2$ Pore Diameter Å | dV/d Log D | -○- Run 26 (0% L)<br>-■- Run 27 (3 wt. % L)<br>-△- Run 28 (3 wt. % L + milling) | 9433 | A-13 |
| 9 | 32, 34, 35 | C. Ex. 2 | Pore Diameter Å | dV/d Log D | -○- Run 32 (0% Clay)<br>-■- Run 34 (6 wt. % CK)<br>-△- Run 35 (12 wt. % CK) | 9433 | A-16 |
| 10 | 32, 36, 37 | Ex. 10 | $N_2$ Pore Diameter Å | dV/d Log D | -○- Run 32 (0 % Clay)<br>-■- Run 36 (6 wt. % GL)<br>-△- Run 37 (12 wt. % GL) | 9433 | A-17 |
| 11 | 32, 38, 39 | Ex. 11 | $N_2$ Pore Diameter Å | dV/d Log D | -○- Run 32 (0 wt. % Clay)<br>-■- Run 39 (0.5 wt. % $SiO_2$)<br>-△- Run 38 (1 wt. % $SiO_2$) | 9433 | A-18 |
| 12 | 40–42 | Ex. 12 | Hrs @ 800° C. in contact with 20% steam | SA | -○- Run 40 (0 wt. % L)<br>-□- Run 41 (3 wt. % L)<br>-×- Run 42 (3 wt. % L + milling) | 9433 | A-19 |
| 13 | 40–42 | Ex. 12 | Hrs @ 800° C. in contact with 20% steam | % SA Retention | -○- Run 40 (0 % L)<br>-□- Run 41 (3 wt. % L)<br>-×- Run 42 (3 wt. % L + milling) | 9433 | A-20 |
| 14 | 43–44 | Ex. 13 | Wt. % $SiO_2$ added to boehmite | Steamed SA | -○- Run 43 (boehmite from CP-3)<br>-□- Run 44 (boehmite from AP-15) | 9434 | A-1 |
| 15 | 45–46 | Ex. 14 | Wt. % $SiO_2$ added | Steamed SA | -○- Run 45 (3 wt. % L)<br>-□- Run 46 (5 wt. % L) | 9434 | A-2 |
| 16 | 43–46 | Ex. 14 | Wt. % $SiO_2$ added | Steamed SA | -○- Run 43 (0% Clay)<br>-□- Run 44 (0% Clay)<br>-×- Run 45 (3 wt. % Clay)<br>-✳- Run 46 (5 wt. % Clay) | 9434 | A-3 |
| 17 | 47–49 | Ex 15 | Wt. % $SiO_2$ added | Steamed SA | -○- Run 47 (0% Clay)<br>-□- Run 48 (3 wt. % dispersed clay)<br>-×- Run 49 (3 wt. % poorly dispersed clay) | 9434 | A-4 |
| 18 | 53–55 | Ex. 17 | Wt. % $SiO_2$ | SA after 4 hours @ 800° C. | -○- Run 53 ($SiO_2$ After Age)<br>-□- Run 54 ($SiO_2$ Before Age)<br>-×- Run 55 ($SiO_2$ After Age @ 3 wt. % L) | 9434 | A-6 |
| 19 | 56–59 | Ex. 18 | $N_2$ Pore Diameter Å | dV/d Log D | -○- Run 56 (0% $SiO_2$)<br>-■- Run 57 (2 wt. % $SiO_2$)<br>-△- Run 58 (4 wt. % $SiO_2$)<br>-+- Run 59 (8 wt. % $SiO_2$) | 9434 | A-7 |
| 20 | 60–61 | Ex. 19 | Hg Pore Diameter Å | Hg dV/dLogD | ----- Run 61 (CAX-1)<br>- - - - - Run 60 (AX-1) | 9450 | FIG. 1 |
| 21 | 62, 64, 66, 68 | Ex. 20<br>Ex. 21<br>C. Ex. 4 | Hg Pore Diameter Å | dV/dLogD | ----- Run 68 (EMCAX-1)<br>- - - - - Run 62 (EMAX-1)<br>-- -- - Run 64 (EMAX-2)<br>_____ Run 66 (EMAX-3) | 9450 | FIG. 2 |
| 22 | 70–72 | Ex. 23<br>Ex. 24<br>C. Ex. 5 | Hg Pore Diameter Å | HgdV/dLogD | ----- Run 72<br>- - - - - Run 71<br>_____ Run 70 | 9450 | FIG. 6 |
| 23 | 76–77 | Ex. 26<br>C. Ex. 7 | Catalyst Age, bbl/lb. | % Conversion | ◆ Run 76 (EMAX-1)<br>▲ Run 77 (EMCAX-1) | 9450 | FIG. 9.1 |
| 24 | 78–80 | Ex. 27<br>Ex. 28<br>C. Ex. 8 | Catalyst Age, bbl/lb. | % Conversion | ◆ Run 78 (EMAX-2)<br>■ Run 79 (EMAX-3)<br>● Run 80 (EMCAX-1) | 9450 | FIG. 10.1 | dV/d log D = the differential of the change in pore volume (cc/g) per change in the differential of the Log of pore diameter
L = Laponite ® (synthetic hectorite)
CK = Calcined Kaolin
GL = Gelwhite -I. Montmorillonite Clay
SA = Surface Area

DESCRIPTION OF PREFERRED EMBODIMENTS

The term "micropore" as used herein means pores having a diameter of less than 100 Angstroms.

The term "mesopore" as used herein means pores having a diameter between 100 and 500 Angstroms.

The term "macropore" as used herein means pores having a diameter greater than 500 Angstroms.

The term "pore mode" as used herein means the pore diameter corresponding to the peak maximum where the log differential nitrogen or mercury intrusion in cc/g, is plotted as a function of the differential of the log of the pore diameter.

The term "total pore volume" as used herein means the cumulative volume in cc/g of all pores discernable by either nitrogen desorption or mercury penetration methods. More specifically, for alumina particles which have not been agglomerated (e.g., by extrusion) the pore diameter distribution and pore volume is calculated with reference to the nitrogen desorption isotherm (assuming cylindrical pores) by the B.E.T. technique as described by S. Brunauer, P. Emmett, and E. Teller in the Journal of American Chemical Society, 60, pp 209–319 (1939).

In respect to alumina particles which have been agglomerated, e.g., formed into extrudates, the pore diameter distribution is calculated by means of the formula:

$$\text{Pore Diameter (in Anstroms)} = \frac{150}{\text{absolute mercury pressure (in bar)}} \quad \text{(Equation 1)}$$

and in accordance with the mercury penetration method (as described by H. L. Ritter and L. C. Drake in Industrial and Engineering Chemistry, Analytical Edition 17, 787 (1945)), using mercury pressures of 1–2000 bar. Surface Area for composite particles as well as agglomerates is determined however by the nitrogen desorption method.

The total $N_2$ pore volume of a sample is the sum of the nitrogen pore volumes as determined by the above described nitrogen desorption method. Similarly, the total mercury pore volume of a sample is the sum of the mercury pore volumes as determined by the mercury penetration method described above using a contact angle of 130°, a surface tension of 485 dynes /cm and a Hg density of 13.5335 gm/cc.

All morphological properties involving weight, such as pore volume (cc/g) or surface area ($m^2$/g) are to be normalized to a Metals Free Basis as defined in accordance with Equation 4 described in Example 20.

All fresh surface areas are determined on samples which have been dried and then calcined in air at 537.8° C. for 2 hours.

Bulk density is measured by quickly transferring (in 10 seconds) the sample powder into a graduated cylinder which overflows when exactly 100 cc is reached. No further powder is added at this point. . The rate of powder addition prevents settling within the cylinder. The weight of the powder is divided by 100 cc to give the density.

All particle size and particle size distribution measurements described herein are determined by a Mastersizer unit from Malvern, which operates on the principle of laser light diffraction and is known to all familiar in the art of small particle analysis.

The aluminum oxide component which is mixed with the swellable clay component comprises typically at least 75, preferably at least 80 (e.g., at least 85). most preferably at least 90 (e.g., at least 95) wt. % active alumina which amounts can vary typically from about 75 to 100, preferably from about 80 to 100, and most preferably from about 90 to 100 wt. % active alumina. Active alumina can be prepared by a variety of methods. For example, alumina trihydrate precipitated in the Bayer process may be ground and flash calcined. Active alumina, as referred to herein, is characterized as having a poorly crystalline and/or amorphous structure.

The expression "alumina of poorly crystalline structure" for the purposes of the aforegoing process is understood as meaning an alumina which is such that X-ray analysis gives a pattern which shows only one or a few diffuse lines corresponding to the crystalline phases of the low-temperature transition aluminas, and contains essentially the chi, rho, eta, gamma and pseudo-ganima phases and mixtures thereof.

By the expression "alumina of amorphous structure" is meant an alumina which is such that its X-ray analysis does not give any line characteristic of a highly (predominantly) crystalline phase.

Active alumina employed herein can be generally obtained by the rapid dehydration of aluminum hydroxides such as bayerite, hydrargillite or gibbsite, and nordstrandite, or of aluminum oxyhydroxides such as boehmite and diaspore. The dehydration can be carried out in any appropriate apparatus, and by using a hot gaseous stream. The temperature at which the gases enter the apparatus can generally vary from about 400°to 1,200° C. and the contact time of the hydroxide or oxyhydroxide with the hot gases is generally between a fraction of a second and 4 to 5 seconds.

The resulting product may contain minor, e.g., trace, amounts of boehmite, gibbsite, gamma, alpha, delta and other crystalline alumina structures.

The resulting active alumina will typically exhibit a weight loss when heated to 538° C. for 1 hour of from about 4 to 12 wt. %.

The specific surface area of the active alumina obtained by the rapid dehydration of hydroxides or oxyhydroxides, as measured by the conventional BET method, generally varies between about 50 and 400 $m^2$/g, and the diameter of the particles is generally between 0.1 and 300 microns and preferably between 1 and 120 microns with an average particle size of typically greater than 1 micron, preferably between about 5 and about 20, most preferably between about 5 and about 15 microns. The loss on ignition, measured by calcination at 1,000° C., generally varies between 3 and 15%, which corresponds to a molar ratio $H_2O/Al_2O_3$ of between about 0.17 and 1.0.

In a preferred embodiment, an active alumina originating from the rapid dehydration of Bayer hydrate (gibbsite), which is a readily available and inexpensive industrial aluminum hydroxide is employed. Active alumina of this type is well known to those skilled in the art and the process for its preparation has been described, for example, in U.S. Pat. Nos. 2,915,365; 3,222,129; 4,579,839 and preferably U.S. Pat. No. 4,051,072, column 3, line 6, to column 4, line 7, the disclosures of which patents are incorporated herein by reference.

The active alumina employed can be used as such or may be treated so that its sodium hydroxide content, expressed as $Na_2O$, is less than 1,000 ppm.

More specifically, the composite particles prepared with silicate or certain clays such as synthetic hectorite will typically contain $Na_2O$, which can cause sintering of the alumina at high temperatures. This sintering will reduce surface area. To eliminate such sintering, the alumina is preferably washed to remove the Na$_2$O in the form of salts. Still, more specifically, the alumina is preferably slurried in water containing about 0.05 parts by weight ammonium sulfate (A/S), about 1 part by weight alumina, and 5 parts by weight water, for 15 minutes. The slurry is then filtered, washed at least one time with water to remove salts and oven dried. This wash can be conducted before or after contact with the clay or on any component which may possess Na$_2$O. The active alumina employed may or may not be ground but it is preferred to be ground to facilitate dispersion in or with the swellable clay slurry described hereinafter.

Suitable active alumina powder starting material is commercially available from the Aluminum Company of America under grade designations CP-3, CP-1, CP-5, CP-7, and CP-100 It is also available from Porocel (Little Rock, Ark.) under the designation AP-15.

All of the active aluminas suitable for use in the aluminum oxide component of the present invention are rehydrateable and form a hydroxyl bond upon contact with water. The present invention draws a distinction between the phenomenon of rehydration, i.e., the chemical changes induced by subjecting the active alumina to water and elevated temperatures, and the process of rehydration, i.e., the process steps involved in inducing the phenomenon of rehydration.

The phenomenon of rehydration is believed to represent the chemical and, physical state of that active alumina which has been converted to crystalline boehmite. However, the change in state from active alumina to boehmite does not have to be complete with reference to the entire sample being acted upon during the rehydration process. For example, depending on the condition of the rehydration process, it may be possible that only the outer shell of an active alumina particle or filter cake is converted to boehmite with the remaining inner portions thereof remaining as either active alumina or some form of alumina other than boehmite or active alumina. Thus, while "rehydrated alumina" is chemically synonymous with boehmite; alumina derived from the rehydration of active alumina includes boehmite, active alumina, and any alumina by-products other than boehmite which might form during the rehydration process. Similarly, the rehydration process refers to the manipulative process steps involving the addition of active alumina to water under conditions, e.g., elevated temperature, described hereinafter.

The swellable clay component comprises any member of the 2:1 clay:mineral layered silicate clays capable of undergoing swelling and dispersion and mixtures thereof. Swelling clays are expandable clays whose platelets are held together by weak van der Waal's forces and have a particular shape or morphology. Such clays include the smectite class of clays as well as the ion exchanged (e.g., Na, Li$^+$) derivatives thereof. In general, alkali metal exchange forms are preferred because of their enhanced ability to swell and disperse. Also, dispersible 2:1 layered silicates such as tetrasilicic mica and taeniolite are useful.

More specifically, smectites are 2:1 clay mineral that carry a lattice charge and characteristically expand when solvated with water and alcohols, most notably ethylene glycol and glycerol. These minerals comprise layers represented by the general formula:

$$(M_8)^{IV}(M'_x)^{VI}O_{20}(OH,F)_4$$

wherein IV indicates an ion coordinated to four other ions, VI indicates an ion coordinated to six other ions and x may be 4 or 6. M is commonly Si$^{4+}$. Al$^{3+}$ and/or Fe$^{3+}$, but also includes several other four coordinate ions such as P$^{5+}$, B$^{3+}$, Ge$^{4+}$, Be$^{2+}$. and the like. M' is commonly Al$^{3+}$, or Mg$^{2+}$, but also includes many possible hexacoordinated ions such as Fe$^{3+}$, Fe$^{2+}$, Ni$^{2+}$, Co$^{2+}$, Li$^{2+}$, and the like. The charge deficiencies created by the various substitutions into these four and six coordinate cation positions are balanced by one or several cations located between the structural units. Water may also be occluded between these structural units bonded either to the structure itself, or to the cations as a hydration shell. When dehydrated (dehydroxylated), the above structural units have a repeat distance of about 9 to 12 Angstroms, as measured by X-ray diffraction. Commercially available natural smectites include montmorillonite (bentonite), beidellite, hectorite, saponite, sauconite and nontronite. Also commercially available are synthetic smectites such as LAPONITE®, a synthetic hectorite available from Laporte Industries Limited.

Smectites are classified into two categories, dioctahedral and trioctahedral, the difference being the number of octahedral sites in the central layer which are occupied. This, in turn, is related to the valency of the cation in the central layers.

The dioctahedral smectites have central cations which are trivalent and accordingly only two-thirds of the octahedral sites are occupied, whereas trioctahedral smectites have divalent central cations where all of the octahedral sites are occupied. Dioctahedral smectites include montmorillonite, beidellite and nontronite wherein, for example, montmorillonite has as the octahedral cation (M'), aluminum, with other cations such as magnesium also present. Trioctahedral smectites, which are preferred, include hectorite and saponite and their synthetic forms wherein, for example. hectorite has as the octahedral cation (M'), magnesium, with lithium also present.

The smectite most advantageously used in the preparation of the compositions of this invention is trioctahedral smectite clay having a lath-shape morphology. However, trioctahedral smectites of platety-shape or mixed lath-shape and platety-shape morphology can be employed. Exemplary of suitable trioctahedral smectite clays are natural saponite, and preferably, natural hectorite and synthetic hectorite.

The most preferred swelling clay for use as the swellable clay component are the synthetic hectorites. Procedures for preparing synthetic hectorites are well known and are described for example, in U.S. Pat. Nos. 3,803,026; 3,844,979; 3,887,454; 3,892,655 and 4,049,780, the disclosures of which is herein incorporated by reference. A typical example of synthetic hectorite is Laponite® RD. Laponite® RD clay is a filter pressed, tray dried and pin milled product. The platelets of Laponite® RD clay are composed of two silica layers surrounding a layer of magnesium in octahedral coordination, with lithium substitution in this layer. Laponite® RD clay and other Laponites are manufactured and sold by Laporte Inorganics, a part of Laporte Industries Limited. A typical analysis and the physical properties of Laponite® RD clay are set forth below in Table 1.

TABLE 1

Chemical Composition Laponite ® RD

| Component | Weight % |
|---|---|
| SiO$_2$ | 59–60 |
| MgO | 27–29 |
| Li$_2$O | 0.7–0.9 |

TABLE 1-continued

Chemical Composition Laponite ® RD

| Component | Weight % |
|---|---|
| $Na_2O$ | 2.2–3.5 |
| Loss of Ignition | 8–10 |
| Physical Properties | |
| Appearance | white powder |
| pH (2% Suspension) | 9.8 |
| Bulk Density (kg/m$^2$) | 1000 |
| Surface Area ($N_2$ adsorption) | 370 m$^2$/g |
| Sieve Analysis % < 250 microns | 98 |
| Moisture Content, Wt. % | 10 |

In order to prepare the composite particles of the present invention, non-colloidal active alumina is at least partially rehydrated in the presence of the dispersed swellable clay.

Rehydration of the alumina will eventually naturally occur at room temperature in the presence of water but would take an extended amount of time. Rehydration is therefore preferably conducted at elevated temperatures of at least about 50° C. to speed up the rehydration process. It is convenient to conduct rehydration by simple refluxing of an aqueous slurry of the active alumina for a period of typically from about 1 to about 72, preferably from about 2 to about 48, and most preferably from about 3 to about 24 hours.

Rehydration conditions are controlled to obtain a high pore volume product. Accordingly, rehydration conditions are controlled such that typically at least 5, preferably at least 10, and most preferably at least 15 wt. % of the active alumina is converted to boehmite, and the boehmite content in the alumina derived from the rehydration of active alumina can range typically from about 5 to about 100 (e.g., 30 to 100), preferably from about 10 to about 100 (e.g., 50 to 100), most preferably from about 15 to about 100 (e.g., 75 to 100) wt. %, based on the weight of the alumina. An undesirable by-product to boehmite formation is bayerite which is an alumina trihydrate that forms if the pH of the water exceeds about 10.

In view of the initial active alumina content in the aluminum oxide component and the degree of conversion of active alumina to crystalline boehmite, the aluminum oxide component of the composite particles will desirably contain (A) typically at least 75, preferably at least 80 (e.g., at least 85), and most preferably at least 90 (e.g., at least 95) wt. % alumina, preferably alumina derived from the rehydration of active alumina, and (B) typically at least 3.75, and preferably at least 7.5, and most preferably at least 10 wt. % of the aluminum oxide component is crystalline boehmite. which amount of crystalline boehmite can vary typically from about 3.75 to about 100 (e.g., 40–100), preferably from about 7.5 to about 100 (e.g., 75–100), and most preferably from about 10 to about 100 (e.g., 90–100) wt. %, based on the weight of the aluminum oxide component. Similarly, the weight ratio of crystalline boehmite to swellable clay in the composite particles will typically vary from about 4:1 to about 99:1, preferably from about 9:1 to about 50:1, and most preferably from about 15:1 to about 50:1.

The crystallite size (as determined by the procedure described at Example 1) will typically be less than about 110 (e.g., less than about 100) Angstroms and will range typically from about 55 to about 110, preferably from about 60 to about 100, and most preferably from about 65 to about 95 Angstroms.

Boehmite formation is maximized at a pH of about 9 (e.g., 7 to 10). Thus, a buffer, such as sodium gluconate, can be added to stabilize the pH at about 9 but such an additive can have the undesired effect of reducing the size of the boehmite crystallites which in turn tends to lower the total pore volume. Thus, it is preferred not to employ a buffer. In fact, one of the advantages of the swellable clay is that it is a natural buffer at a pH of about 9 and inhibits rehydration to Bayerite.

As indicated above, the rehydration of the active alumina in the aluminum oxide component must occur in the presence of the dispersed swellable clay. Without wishing to be bound to any particular theory, it is believed that the highly dispersed swellable clay becomes entrapped within the growing boehmite crystals and creates intercrystalline voids by propping the crystallites apart, thereby increasing the pore volume without decreasing surface area. It is believed to be for this reason that the smaller the swellable clay particle size and the higher the degree of dispersion of the clay particles in the slurry, the greater will be the shift of the pore mode in the mesopore region of the composite particles. The rehydration of the alumina neither starts with an alumina sol nor converts the active alumina to an alumina sol during rehydration. Moreover, if the swellable clay is merely mixed with preformed boehmite rather than forming the boehmite, e.g., by rehydration of active alumina, in the presence of the clay, the improved pore properties will not be obtained.

In a preferred embodiment, the aluminum oxide component can be premilled prior to rehydration of the active alumina therein alone or in admixture with the swellable clay. Premilling can be conducted in wet mills such as DRAIS, PREMIER, or other types of sand or pebble mills.

However, if the premilling is conducted in the absence of the desired swellable clay, it must be conducted under conditions, e.g., at sufficiently low temperatures, to avoid premature rehydration of the alumina before contact thereof with the dispersed swellable clay.

Premilling of the aluminum oxide component is conducted typically at room temperature for a period sufficient to reduce the average particle size to be typically from about 0.1 to about 8 (e.g., 1 to 8), preferably from about 0.1 to about 5 (e.g., 1 to 5), and most preferably from about 0.1 to about 2.5 microns.

The swellable clay component is dispersed in a slurry, typically an aqueous slurry, under conditions which preferably will maximize the degree of dispersion. Some swellable clays are more readily dispersible than others. If the degree of dispersion attained during contact with the alumina being rehydrated is poor, the desired impact on the pore properties of the alumina may not be attained or maximized. Accordingly, steps may need to be taken to induce the proper degree of dispersion such as milling, total volatiles control, and/or the use of dispersing aids such as tetrasodium pyrophosphate ($Na_4P_2O_7$). Slow addition of the clay to deionized water or water containing $Na_4P_2O_7$ to minimize the amount of divalent cations such as $Ca^{+2}$ and $Mg^{+2}$ helps to disperse the clay. The time required to disperse the clay is reduced if it is added to a high shear mixer such as COWLES, MYERS or SILVERSON mixer. Satisfactory dispersion can be obtained with paddle type agitators, particularly when a tank with baffles is used.

Attainment of the proper degree of dispersion is difficult to quantify, but as a general rule, the greater the degree of clarity of the suspending medium, the better the dispersion and a completely clear medium is most preferred when employing a synthetic hectorite. This will typically occur when the clay particles are predominately colloidal in size, e.g., less than about 1 micron.

Accordingly, dispersion of the swellable clay can be accomplished by mixing the clay with water, preferably under conditions of high shear for periods of typically from about 5 to about 60, and preferably from about 10 to about 30 minutes. The temperature at which the dispersion is formed is not critical and will typically range from about 10 to about 60° C. It is important that the water not contain other minerals, e.g., deionized water is preferred, which would affect the dispersability of the clay.

The degree of dispersion is enhanced if the starting clay has a total volatile content of typically at least 6, and preferably at least 8 wt. % thereof, and can range typically from about 6 to about 30, preferably from about 10 to about 20 and most preferably from about 12 to about 18 wt. %.

The amount of clay sought to be imparted to the final composite particles is selected to be effective to increase at least one of the total nitrogen pore volume, hydrothermal stability, and/or the nitrogen mesopore pore mode relative to the corresponding pore volume, hydrothermal stability (as defined hereinafter) and mesopore pore mode of the aluminum oxide component in the absence of the swellable clay. More specifically, the mesopore pore mode is increased typically at least 10, preferably at least 30, and most preferably at least 50% of the corresponding mesopore pore mode achieved in the absence of the swellable clay.

Suitable effective amounts of the swellable clay will typically be less than about 10 (e.g., less than about 9), preferably less than about 8, most preferably less than about 6 wt. %, and can vary typically from about 1 to about 9 (e.g., 1 to about 8). preferably from about 2 to about 7, and most preferably from about 2 to about 5 wt. % based on the combined weight of aluminum oxide component and swellable clay component.

As the clay content of the composite particles increases above 1 wt. %, not only is the mesopore pore volume increased, up until about 6 wt. % swellable clay, after which it begins to decrease, but also the surface area. In addition, the presence of the clay increases the hydrothermal stability of the composite particles up to about 10 w % clay content, after which it levels off or decreases.

From the above discussion, it will be apparent that rehydration of the alumina in the presence of the dispersed swellable clay can be brought about in a variety of ways.

For example, two separately prepared slurries (dispersions) containing the swellable clay component and non-colloidal aluminum oxide component, respectively, can be combined or, preferably a single slurry can be made directly by adding either component first to water or simultaneously combining the clay and aluminum oxide components with water.

However, if two separate slurries are prepared care should be taken to assure that rehydration of the active alumina in the aluminum oxide component does not occur prematurely before contact with the dispersed clay.

The solids content of the slurry containing the aluminum oxide component and clay component is controlled such that it is typically from about 2 to about 30, preferably from about 4 to about 25 and most preferably from about 5 to about 25 wt. % based on the slurry weight. As the solids content decreases within these ranges, the mesopore pore mode will typically increase and vice-versa when the clay wt. % is at or below 4.

Accordingly, absent premilling of the clay component and aluminum oxide component, it is preferred to prepare a slurry of the dispersible clay component in dispersed form, add the aluminum oxide component thereto and then subject the mixture to shear under elevated temperature as described above to intimately disperse the swellable oxide and rehydrate the alumina.

In one preferred embodiment, the dispersed clay component is premilled in admixture with the aluminum oxide component prior to rehydration of the alumina. Thus, in this embodiment, a slurry of the swellable clay component is prepared under agitation until fully dispersed. To the clay dispersion is added the appropriate amount of aluminum oxide component, and the resultant combination wet milled, preferably severely milled, at room temperature, e.g., in a DRAIS mill, for a period of typically from about 0.1 to about 3, preferably from about 0.5 to about 2.0 minutes. The premilled slurry is then refluxed as described above to rehydrate the alumina.

Premilling has been found to lead to increased hydrothermal stability of the composition while resulting in only a slight shift to smaller pores.

More specifically, the hydrothermal stability of the alumina composite particles is evaluated by comparing fresh and steamed surface areas as follows.

The BET $N_2$ surface area is determined after calcining in air at 537.8° C. (1000° F.) for 2 hours and designated as the fresh surface area. An uncalcined sample is then exposed to an atmosphere containing about 20 v % steam for 4 hours at 800° C. at autogenous pressure and BET surface area determined thereon and designated the steamed surface area.

A comparison is then made between the fresh and steamed surface areas. The smaller the difference between the fresh and steamed surface areas, the higher the hydrothermal stability.

Once rehydration of the active alumina (in the aluminum oxide component) in the presence of the swellable clay component is complete, the resulting composite particles can be recovered, thermally activated under the same conditions as described for agglomerates hereinafter or used directly to conduct application of catalyst thereto.

Preferably, the composite particles are recovered and dried and optionally sized. Suitable particle sizes can range typically from about 1 to about 150 (e.g., 1 to about 100), preferably from about 2 to about 60, and most preferably from about 2 to about 50 microns.

Recovery is accomplished by filtration, evaporation, centrifugation and the like. The slurry may also be spray dried to effect recovery.

The resulting composite particles have a nitrogen BET surface area (on a metals free basis) of typically at least about 200, preferably at least about 240, and most preferably at least about 260 $m^2/g$, which surface area can range typically from about 200 to about 400, preferably from about 240 to about 350, and most preferably from about 240 to about 300 $m^2/g$. The surface area determination is made on a sample which has been dried at 138° C. (280° F.) for 8 hours and calcined for 2 hours at 537.8° C. (1000° F.).

The average nitrogen pore diameter of the composite particles will range typically from about 60 to about 400 (e.g., 60 to about 300), preferably from about 70 to about 275, and most preferably from about 80 to about 250 Angstroms.

The total nitrogen pore volume of the composite particles (on a metals free basis) can vary from about 0.5 to about 2.0, preferably from about 0.6 to about 1.8, and most preferably from about 0.7 to about 1.6 cc/g. Prior to testing for pore diameter or pore volume, the samples are oven dried at 138° C. (280° F.) and then calcined for 2 hours at 537.8° C. (1000° F.).

It is an advantage of the present invention that the swellable clay shifts the mesopore pore mode to a higher pore diameter relative to its absence while still maintaining a high surface area as recited above.

Even more importantly, the present invention provides a mechanism for controlling the size of the pore mode by varying the preparation conditions, particularly the clay content in the composite and the solids content of the rehydration slurry. More specifically, reductions in clay content from the optimum and/or increases in the rehydration slurry solids content will each lower the pore mode.

Thus, the macropore content (i.e., % of those pores within the total nitrogen pore volume which fall within the macropore region) of the composite particles will be typically not greater than about 40, preferably not greater than about 30, and most preferably not greater than about 25% of the total pore volume, which macropore content will range typically from about 5 to about 50, preferably from about 10 to about 40, and most preferably from about 10 to about 30% of the total pore volume.

The nitrogen mesopore content will range typically from about 20 to about 90, preferably from about 30 to about 80, and most preferably from about 40 to about 70% of the total pore volume. Moreover, typically at least about 40, preferably at least about 50, and most preferably at least about 60% of the pores within the mesopore region will have pore diameters of typically from about 100 to about 400, preferably from about 100 to about 350, and most preferably from about 125 to about 300 Angstroms.

The nitrogen mesopore content of the composite particles as formed also desirably will possess a nitrogen pore mode, preferably only a single pore mode (monomodal), of typically from about 60 to about 400 (e.g. 60 to about 300), preferably from about 70 to about 275, and most preferably from about 80 to about 250 Angstroms.

The nitrogen micropore content of the composite particles will be typically not greater than about 80, preferably not greater than about 60, and most preferably not greater than about 50% of the total pore volume which micropore content can range typically from about 80 to about 5, preferably from 60 about to about 10, and most preferably from about 30 to about 15% of the total pore volume.

It has been further found that the hydrothermal stability of the composite particles can be further improved by the incorporation of silicate salts therein.

Suitable silicate salts include the alkali and alkaline earth metal silicates, most preferably sodium silicate. Less soluble silicates, such as found in natural or synthetic clays or silica gels also improve stability. Examples of such clays are kaolinite, montmorillonite, and hectorite. Calcined clays also give improved hydrothermal stability.

The silicate can be added to the aluminum oxide and swellable clay components prior to rehydration, but it is preferred to conduct the addition after rehydration (hot aging) to maximize the hydrothermal stability inducing effects, and to obtain a high pore volume and high average pore diameter. Addition of soluble silicate before rehydration of the alumina tends to produce small pores which are somewhat less stable (i.e., coalesce into larger pores upon heating) than large ones thereby reducing the total pore volume. The silicate can be added after a few hours of hot aging after the pore size distribution is set.

Amounts of silicate effective to improve the hydrothermal stability of the composite particles described herein can range typically from about 0.1 to about 40, preferably from about 1 to about 20, and most preferably from about 2 to about 10 wt. %, based on the combined weight of silicate, aluminum oxide component and swellable clay component.

Without wishing to be bound by any particular theory, it is believed that the added silicate is distinguishable from the silicate in the clay in that the former is believed to be free to migrate to the alumina during rehydration whereas the clay silicate remains mostly intact during rehydration. However, some of the observed effect of the clay on the pore size and stability may be attributable to silicate migrated from the clay to the alumina during rehydration.

While the composite alumina particles can be used directly as supports, it is more conventional to agglomerate the particles for such use.

Such alumina agglomerates can be used as catalysts or catalyst supports in any reaction which requires a particular pore structure together with very good mechanical, thermal and hydrothermal properties. The agglomerates of the present invention can thus find particular applicability as catalyst supports in the treatment of exhaust gases generated by internal combustion engines and in hydrogen treatments of petroleum products, such as hydrodesulfurization, hydrodemetallation and hydrodenitrification. They can also be used as catalyst supports in reactions for the recovery of sulfur compounds (Claus catalysis), the dehydration, reforming, steam reforming, dehydrohalogenation, hydrocracking, hydrogenation, dehydrogenation, and dehydrocyclization of hydrocarbons or other organic compounds, as well as oxidation and reduction reactions. They can also be used as additives for fluid cracking catalysts, particularly to enhance pore volume and meso or macroporosity.

They may also be used as catalysts per se in reactions typically catalyzed by aluminas such as hydrocracking and isomerization reactions.

Thus, the advantageous properties of enhanced mesopore content at higher surface area and hydrothermal stability of the composite particles are passed on to the agglomerates.

The term "agglomerate" refers to a product that combines particles which are held together by a variety of physical-chemical forces.

More specifically, each agglomerate is composed of a plurality of contiguous, constituent primary particles, sized as described above, preferably joined and connected at their points of contact.

Thus, the agglomerates of the present invention may exhibit a higher macropore content than the constituent primary particles because of the interparticle voids between the constituent composite alumina particles.

Nevertheless, the agglomerate particles still preserve the higher mesopore mode.

Accordingly, the agglomerates of the present invention are characterized as having the following properties (on a metals free basis) after drying for 8 hours at 121° C. (250° F.) and calcination for 1 hour at 537.8° C. (1000° F.):

(1) a nitrogen surface area of at least about 100, preferably at least about 150, and most preferably from at least about 200 $m^2/g$, which surface area can range typically about 100 to about 400, preferably from about 125 to about 375, and most preferably from about 150 to about 350 $m^2/g$, (2) a bulk density of the agglomerates of typically at least about 0.30, preferably at least about 0.35, and most preferably at least about 0.40 g/ml which bulk density can range typically from about 0.30 to about 1, preferably from about 0.35 to about 0.95, and most preferably from about 0.40 to about 0.90 g/ml.

(3) a total mercury pore volume of from about 0.40 to about 2.0, preferably from about 0.5 to about 1.8, and most preferably from about 0.6 to about 1.5 cc/g, (4) a macropore content (i.e., those pores within the total pore volume which fall within the macropore region) of typically not greater than about 40, preferably not greater than about 30, and most preferably not greater than about 20%, of the total pore volume, which macropore content will range typically from about 5 to about 40, preferably from about 10 to about 35, and most preferably from about 15 to about 30% of the total pore volume, (5) a mesopore content of typically from about 15 to about 95, preferably from about 20 to about 90, and most preferably from about 30 to about 80% of the total pore volume. Moreover, typically at least about 30, preferably at least about 40, and most preferably at least about 50% of the pores within the mesopore region will have pore diameters of typically from about 80 to about 400 (e.g., 100 to 400), preferably from about 90 to about 350 (e.g., 100 to 350), and most preferably from about 105 to about 300 Angstroms, (6) an average agglomerate particle diameter of typically from about 0.5 to about 5, preferably from about 0.6 to about 2, and most preferably from about 0.8 to 1.5 mm.

The mesopore content of the agglomerate particles as calcined also desirably will possess a mesopore pore mode of typically from about 60 to about 400 (e.g., 60 to about 300), preferably from about 65 to about 275, and most preferably from about 70 to about 250 Angstroms.

In addition, the agglomerates may be mixed with other conventional aluminas to produce supports having a pore size distribution with two or more modes in the mesopore region. Each alumina contributes a mesopore mode at its unique characteristic position. Mixtures of two or more aluminas prepared with the swellable clays having varying pore modes are also contemplated.

The agglomeration of the alumina composite is carried out in accordance with the methods well known to the art, and, in particular, by such methods as pelletizing, extrusion, shaping into beads in a rotating coating drum, and the like. The nodulizing technique whereby composite particles having a diameter of not greater than about 0.1 mm are agglomerated to particles with a diameter of at least about 1 mm by means of a granulation liquid may also be employed.

As is known to those skilled in the art, the agglomeration may optionally be carried out in the presence of additional amorphous or crystalline binders, and pore-forming agents may be added to the mixture to be agglomerated. Conventional binders include other forms of alumina, silica, silica-alumina, clays, zirconia, silica-zirconia, magnesia and silica-boria. Conventional pore-forming agents which can be used in particular, include wood flour, wood charcoal, cellulose, starches, naphthalene and, in general, all organic compounds capable of being removed by calcination. The addition of pore forming agents, however, is not necessary or desirable.

If necessary, the aging, drying and/or calcination of the agglomerates are then carried out.

The agglomerates, once formed, are then typically subjected to a thermal activation treatment at a temperature in the range of typically from about 250 to about 1000, preferably from about 350 to about 900, and most preferably from about 400 to about 800° C. for periods of typically from about 0.15 to about 3.0, preferably from about 0.33 to about 2.0, and most preferably from about 0.5 to about 1 hour(s). The atmosphere of activation is typically air, but can include inert gases such as nitrogen or steam.

The activation treatment can be carried out in several steps if desired or be part of the agglomerate treatment. Depending on the particular activation temperature and time employed, the alumina agglomerates predominantly exhibit the crystal structure characteristic of boehmite, or gamma alumina, or mixtures thereof.

More specifically, at calcination temperatures and times increasingly above about 300° C. and one hour, the boehmite will be increasingly converted to gamma alumina. However, the gamma alumina will possess the pore properties of the boehmite from which it is derived. Moreover, at the preferred calcination temperatures and times substantially all of the crystalline boehmite is converted to gamma alumina. Consequently, the sum of the crystalline boehmite content (wt. %) discussed above plus the gamma alumina content resulting from calcination of the boehmite, will not typically exceed the original boehmite content derived from rehydration of the active alumina. This conclusion applies equally to composite particles which are activated and used directly in composite particle form without agglomeration.

The percent $\gamma$-$Al_2O_3$ (gamma alumina) is determined as follows:

(1) 100% $\gamma$-$Al_2O_3$ is defined as an integrated intensity (area under the peak) of the (440) peak of a $\gamma$-$Al_2O_3$ standard.

(2) The (101) peak intensity of a Quartz plate is used as an X-ray intensity monitor.

(3) Data collection is performed on a Philips® 3720 automatic diffractometer equipped with a graphite diffract beam monochromator and sealed Cu X-Ray tube. The X-ray generator is operated at 45 kV and 40 mA.

(4) Full width at half maximum (FWHM) and integrated intensity (area under the peak) of the (440) $\gamma$-$Al_2O_3$ peak are obtained by curve fitting. In the case where one peak can not yield a good fit of the peak, two peaks are used. In the case where two peaks are used for curve fitting, two crystallite sizes are obtained by using Equation 3. Percent $\gamma$-$Al_2O_3$ of the two crystallite sizes are obtained by using Equation 2.

(5) The percentage of $\gamma$-$Al_2O_3$ of a sample is determined by the following equation:

$$\%_{\gamma\text{-}Al2O3} = (I_{sample} * I_{quartz,c}) / (I_{standard} * I_{quartz,s}) \quad \text{(Equation 2)}$$

wherein:

$I_{sample}$=Integrated intensity of the (440) peak of sample;

$I_{quartz,c}$=Intensity of the (101) quartz peak, measured at the time that the standard $\gamma$-$Al_2O_3$ is measured;

$I_{standard}$=Integrated intensity of the (440) peak of the standard $\gamma$-$Al_2O_3$; and $I_{quartz,s}$=Intensity of the (101) quartz peak, measured at the time the sample is measured.

$\gamma$-$Al_2O_3$ crystallite size (L) is determined by the following procedure. The sample is hand ground with a mortar and pestle. An even layer of the sample is placed on 3.5 gms polyvinyl alcohol (PVA) and pressed for 10 seconds at 3,000 psi to obtain a pellet. The pellet is then scanned with Cu K Alpha radiation and the diffraction pattern between 63 and 73 degrees (2θ) is plotted. The peak at 66.8 degrees (2θ) is used to calculate the crystallite size using Equation 3 and the measured peak width at half height.

$$L(\text{size in Å}) = 82.98/\text{FWHM}(2\theta°) \cos(\theta°) \quad \text{(Equation 3)}$$

wherein:

FWHM=Full width at half maximum; and

θ=The angle of diffraction between X-ray beam and planar surface on which the sample is sitting.

The percent boehmite is determined as described at Example 1.

The large average pore diameter and high pore volume render the alumina composites of the present invention useful for the treatment of: high molecular weight, high boiling feeds, where not all the feed can be practically vaporized, in both F.C.C. and hydroprocessing operations; short contact time cracking operations, where the large pores can minimize diffusion resistance; hydrocracking, hydrotreating, hydro-desulfurization and hydro denitrogenation; processing of tar sands, shale oil extracts or coal liquids; catalyst supports with metals, the high pore volume and pore diameter providing for improved metal dispersion; separation of high molecular weight compounds in a solvent from lower molecular weight compounds: and applications requiring fine particle size aluminas at low pH, such as in suspending agents, and polishing agents.

The alumina composite particles are particularly adapted for use as supports for a variety of catalyst systems employing heavy metals as the catalyst component. Consequently, the metal components of such catalysts must be added and incorporated into the alumina composite. Thermal activation is typically conducted after agglomerate formation rather than before.

Such additions can be achieved by mixing the catalytic materials with the alumina during the production of the composite alumina but after rehydration thereof. during the preparation of the agglomerates, e.g. extrudates or pellets and the like, by impregnating the alumina agglomerates, such as extrudates or pellets, with catalytic material by immersion in solutions containing the catalytic material and the like. The "dry" impregnation technique is another suitable alternative wherein the composite particles or agglomerates are contacted with a quantity of impregnation liquid, the volume of which corresponds to the pore volume of the support. Other and additional methods of modifying the alumina may appear desirable to those skilled in the art.

The porous composite aluminas of the present invention are particularly useful when employed as supports for catalytically active hydrogenation components such as Group VIB and Group VIII metals. These catalytically active materials can be suitably applied in hydroprocessing operations.

More specifically, "hydroprocessing" as the term is employed herein means oil refinery processes for reacting petroleum feedstocks (complex mixtures of hydrocarbon present in petroleum which are liquid at conditions of standard temperature and pressure) with hydrogen under pressure in the presence of a catalyst to lower: (a) the concentration of at least one of sulfur, contaminant metals, nitrogen. and Conradson carbon, present in said feedstock, and (b) at least one of the viscosity. pourpoint, and density of the feedstock. Hydroprocessing includes hydrocracking, isomerization/dewaxing, hydrofinishing, and hydrotreating processes which differ by the amount of hydrogen reacted and the nature of the petroleum feedstock treated.

Hydrofinishing is typically understood to involve the hydroprocessing of hydrocarbonaceous oil containing predominantly (by weight of) hydrocarbonaceous compounds in the lubricating oil boiling range ("feedstock") wherein the feedstock is contacted with solid supported catalyst at conditions of elevated pressure and temperature for the purpose of saturating aromatic and olefinic compounds and removing nitrogen, sulfur, and oxygen compounds present within the feedstock, and to improve the color, odor, thermal, oxidation, and UV stability, properties of the feedstock.

Hydrocracking is typically understood to involve the hydroprocessing of predominantly hydrocarbonaceous compounds containing at least five (5) carbon atoms per molecule ("feedstock") which is conducted: (a) at superatmospheric hydrogen partial pressure; (b) at temperatures typically below 593.3° C. (1100° F.); (c) with an overall net chemical consumption of hydrogen; (d) in the presence of a solid supported catalyst containing at least one (1) hydrogenation component; and (e) wherein said feedstock typically produces a yield greater than about one hundred and thirty (130) moles of hydrocarbons containing at least about three (3) carbon atoms per molecule for each one hundred (100) moles of feedstock containing at least five (5) carbon atoms per molecule.

Hydrotreating is typically understood to involve the hydroprocessing of predominantly hydrocarbonaceous compounds containing at least five carbon atoms per molecule ("feedstock") for the desulfurization and/or denitrification of said feedstock, wherein the process is conducted: (a) at superatmospheric hydrogen partial pressure; (b) at temperatures typically below 593.3° C. (1100° F.); (c) with an overall net chemical consumption of hydrogen; (d) in the presence of a solid supported catalyst containing at least one hydrogenation component; and (e) wherein: (i)the feedstock produces a yield of typically from about 100 to about 130 moles (inclusive) of hydrocarbons containing at least three carbon atoms per molecule for each 100 moles of the initial feedstock; or (ii) the feedstock comprises at least 50 liquid volume percent of undeasphalted residue typically boiling above about 565.6° (1050° F.) as determined by ASTM D-1160 Distillation and where the primary function of the hydroprocessing is to desulftirize said feedstock or (iii) the feedstock is the product of a synthetic oil producing operation.

Isomerization/dewaxing is typically understood to involve hydroprocessing predominantly hydrocarbonaceous oil having a Viscosity Index (VI) and boiling range suitable for lubricating oil ("feedstock") wherein said feedstock is contacted with solid catalyst that contains, as an active component, microporous crystalline molecular sieve, at conditions of elevated pressure and temperature and in the presence of hydrogen, to make a product whose cold flow properties are substantially improved relative to said feedstock and whose boiling range is substantially within the boiling range of the feedstock.

More specifically, well known hydroprocessing catalyst components typically include at least one component of a metal selected from the group consisting of Group VIII metals, including Group VIII platinum group metals, in particular platinum and palladium, the Group VIII iron group metals, in particular cobalt and nickel, the Group VI B metals, in particular molybdenum and tungsten, and mixtures thereof. If the feedstock has a sufficiently low sulfur content, e.g., less than about 1 weight percent and preferably less than about 0.5 weight percent, the Group VIII platinum group metals may be employed as the hydrogenation component. In this embodiment. the Group VIII platinum group metal is preferably present in an amount in the range of about 0.01 weight percent to about 5 weight percent of the total catalyst, based on elemental platinum group metal. When the feedstock being treated contains more than about 1.0 weight percent sulfur, the hydrogenation component is preferably a combination of at least one Group VIII iron group metal and at least one Group VI B metal. The non-noble metal hydrogenation components are preferably present in the final catalyst composition as oxides or sulfides, more preferably as sulfides. Preferred overall catalyst compositions contain at least about 2, preferably about 5 to about 40, wt. % Group VIB metal, more preferably molybdenum and/or tungsten, and typically at least about 0.5, and preferably about 1 to about 15, wt. % of Group VIII of the Periodic Table of Elements, more preferably nickel and/or cobalt, determined as the corresponding oxides. The sulfide form of these metals is more preferred due to higher activity, selectivity and activity retention.

The catalyst components, e.g., hydroprocessing catalyst components, can be incorporated into the overall catalyst composition by any one of numerous procedures as described.

Although the non-noble metal components can be combined into the catalyst as the sulfides, this is not preferred. Such components are usually combined as a metal salt which can be thermally converted to the corresponding oxide in an oxidizing atmosphere or reduced with hydrogen or other reducing agent. The composition can then be sulfided by reaction with a sulfur compound such as carbon disulfide, hydrogen sulfide, hydrocarbon thiols, elemental sulfur, and the like.

Catalyst components can be incorporated into the composite alumina at any one of a number of stages in the catalyst preparation. For example, metal compounds, such as the sulfides, oxides or water-soluble salts such as ammonium heptamolybdate, ammonium tungstate, nickel nitrate, cobalt sulfate and the like, can be added by comulling, impregnation or precipitation, after rehydration but before the composite is finally agglomerated. In the alternative, these components can be added to the composite after agglomeration by impregnation with an aqueous, alcoholic or hydrocarbon solution of soluble compounds or precursors.

A further embodiment of the present invention is directed to a process for the hydrotreating of a hydrocarbon feedstock in at least one ebullated bed reaction zone. More particularly, the hydrocarbon feedstock is contacted with hydrogen in one or a series of ebullated bed reaction zones in the presence of a hydroprocessing catalyst comprising a hydrogenation component of catalytic metals and derivatives as described above deposited on agglomerates of the alumina composite described herein.

As is well known these feedstocks contain nickel, vanadium, and asphaltenes, e.g., about 40 ppm up to more than 1,000 ppm for the combined total amount of nickel and vanadium and up to about 25 wt. % asphaltenes. Further, the economics of these processes desirably produce lighter products as well as a demetallized residual by-product. This process is particularly useful in treating feedstocks with a substantial amount of metals containing 150 ppm or more of nickel and vanadium and having a sulfur content in the range of about 1 wt. % to about 10 wt. %. Typical feedstocks that can be treated satisfactorily by the process of the present invention contain a substantial amount (e.g., about 90%) of components that boil appreciably above 537.8° C. (1,000° F.). Examples of typical feedstocks are crude oils, topped crude oils, petroleum hydrocarbon residua, both atmospheric and vacuum residua, oils obtained from tar sands and residua derived from tar sand oil, and hydrocarbon streams derived from coal. Such hydrocarbon streams contain organometallic contaminants which create deleterious effects in various refining processes that employ catalysts in the conversion of the particular hydrocarbon stream being treated. The metallic contaminants that are found in such feedstocks include, but are not limited to, iron, vanadium, and nickel.

While metallic contaminants, such as vanadium, nickel, and iron, are often present in various hydrocarbon streams, other metals are also present in a particular hydrocarbon stream. Such metals exist as the oxides or sulfides of the particular metal, or as a soluble salt of the particular metal, or as high molecular weight organometallic compounds, including metal naphthenates and metal porphyrins, and derivatives thereof.

Another characteristic phenomenon of hydrotreating heavy hydrocarbons is the precipitation of insoluble carbonaceous substances from the asphaltenic fraction of the feedstock which cause operability problems. The amount of such insolubles formed increases with the amount of material boiling, over 537.8° C. (1,000° F.) which is converted or with an increase in the reaction temperature employed. These insoluble substances, also known as Shell hot filtration solids, create the operability difficulties for the hydroconversion unit and thereby circumscribe the temperatures and feeds the unit can handle. In other words, the amount of solids formed limit the conversion of a given feedstock. Operability difficulties as described above may begin to manifest themselves at solids levels as low as 0.1 wt. %. Levels below 0.5 wt. % are generally recommended to prevent fouling of process equipment. A description of the Shell hot filtration test is found at A. J. J., Journal of the Inst. of Petroleum (1951) 37, pp. 596–604 by Van Kerkvoort. W. J. and Nieuwstad, A. J. J. which is incorporated herein by reference.

It has been speculated that such insoluble carbonaceous substances are formed when the heavy hydrocarbons are converted in the hydroconversion unit, thereby rendering them a poorer solvent for the unconverted asphaltenic fraction and hence creating the insoluble carbonaceous substances. The formation of such insolubles can be decreased by having some of the surface area in the hydroconversion catalyst be accessible by very large pores so that most of the catalyst surface is accessible to large asphaltenic molecules. Also, the large pores facilitate deposition of nickel and vanadium in the hydrotreating catalyst without plugging the pores.

It has been discovered that the use of the porous composites as supports in making catalysts, particularly hydroprocessing catalysts, provides a higher initial activity than the catalysts supported on conventional alumina.

While the benefit of higher initial activity is less significant in a fixed bed operation, it is particularly important in an ebullated bed system. More specifically, in an ebullated bed system, increases in initial activity are meaningful since there is an intermittent or continuous addition of catalyst to increase and maintain overall system activity. Since the overall activity of an ebullated bed system is the weighted average activity of all catalyst present varying from fresh to deactivated, the overall activity is increased by constant or intermittent addition of catalyst possessing a relatively higher initial activity.

Hydrotreating operations are typically carried out in one or a series of ebullated bed reactors. As previously elucidated, an ebullated bed is one in which the solid catalyst particles are kept in random motion by the upward flow of liquid and gas. An ebullated bed typically has a gross volume of at least 10 percent greater and up to 70% greater than the solids thereof in a settled state. The required ebullition of the catalyst particles is maintained by introducing the liquid feed, inclusive of recycle if any, to the reaction zone at linear velocities ranging from about 0.02 to about 0.4 feet per second and preferably, from about 0.05 to about 0.20 feet per second.

The operating conditions for the hydrotreating of heavy hydrocarbon streams, such as petroleum hydrocarbon residua and the like, are well known in the art and comprise a pressure within the range of about 1.000 psia (68 atmos) to about 3,000 psia (204 atmos), an average catalyst bed temperature within the range of about 700° F. (371° C.) to about 850° F. (454° C.), a liquid hourly space velocity (LHSV) within the range of about 0.1 volume of hydrocarbon per hour per volume of catalyst to about 5 volumes of hydrocarbon per hour per volume of catalyst, and a hydrogen recycle rate or hydrogen addition rate within the range of about 2,000 standard cubic feet per barrel (SCFB) (356 m$^3$/m$^3$) to about 15.000 SCFB (2.671 m$^3$/m$^3$). Preferably, the operating conditions comprise a total pressure within the range of about 1,200 psia to about 2,000 psia (81–136 atmos); an average catalyst bed temperature within the range of about 730° F. (387° C.) to about 820° F. (437° C.); and a LHSV within the range of about 0.1 to about 4.0; and a hydrogen recycle rate or hydrogen addition rate within the range of about 5.000 SCFB (890 m$^3$/m$^3$) to about 10,000 SCFB (1.781 m$^3$/m$^3$). Generally, the process temperatures and space velocities are selected so that at least 30 vol. % of the feed fraction boiling above 1.000° F. is converted to a product boiling below 1,000° F. and more preferably so that at least 70 vol. % of the subject fraction is converted to a product boiling below 1,000° F.

For the treatment of hydrocarbon distillates, the operating conditions would typically comprise a hydrogen partial pressure within the range of about 200 psia (13 atmos) to about 3,000 psia (204 atmos): an average catalyst bed temperature within the range of about 600° F. (315° C.) to about 800° F. (426° C.); a LHSV within the range of about 0.4 volume of hydrocarbon per hour per volume of catalyst to about 6 volumes of hydrocarbon recycle rate or hydrogen addition rate within the range of about 1,000 SCFB (178 m$^3$/m$^3$) to about 10,000 SCFB (1,381 m$^3$/m$^3$). Preferred operating conditions for the hydrotreating of hydrocarbon distillates comprise a hydrogen partial pressure within the range of about 200 psia (13 atmos) to about 1,200 psia (81 atmos); an average catalyst bed temperature within the range of about 600° F. (315° C.) to about 750° F. (398° C.); a LHSV within the range of about 0.5 volume of hydrocarbon per hour per volume of catalyst to about 4 volumes of hydrocarbon per hour per volume of catalyst; and a hydrogen recycle rate or hydrogen addition rate within the range of about 1,000 SCFB (178 m$^3$/m$^3$) to about 6,000 SCFB (1,068 m$^3$/m$^3$).

The most desirable conditions for conversion of a specific feed to a predetermined product, however, can be best obtained by converting the feed at several different temperatures, pressures, space velocities and hydrogen addition rates, correlating the effect of each of these variables and selecting the best compromise of overall conversion and selectivity.

All references herein to elements or metals belong to a certain Group refer to the Periodic Table of the Elements and Hawley's Condensed Chemical Dictionary, 12$^{th}$ Edition. Also, any references to the Group or Groups shall be to the Group or Groups as reflected in this Periodic Table of Elements using the CAS system for numbering groups.

All references in the claims to morphological properties defined in terms of a weight, such as surface area, and pore volume are to be interpreted as being on a metals free basis as defined in Equation 6, e.g., normalized to correct for any influence of the metal catalytic oxide (if present) on the weight of the material being analyzed. Unless otherwise specified, all composites in powder form (non-agglomerated) in the examples are filtered after rehydration and then exchanged to low soda by A/S exchange as described hereinabove prior to calcination. None of the extruded samples were A/S exchanged.

The following examples are given as specific illustrations of the claimed invention. It should be understood, however, that the invention is not limited to the specific details set forth in the examples. All parts and percentages in the examples, as well as in the remainder of the specification, are by weight unless otherwise specified. Unless otherwise specified herein, all surface area and pore property determinations or recitations in the specification and claims are to be construed as being made on samples which have been oven dried at 138° C. (280° F.) and then calcined at 537.8° C. (1000° F.) for 2 hours at atmospheric pressure in air.

Further, any range of numbers recited in the specification or claims, such as that representing a particular set of properties, conditions, physical states or percentages, is intended to literally incorporate expressly herein any number falling within such range, including any subset of numbers within any range so recited.

EXAMPLE 1

To 1843 gm H$_2$O was added 14.4 gm, dry basis, of Laponite® RD, a synthetic hectorite clay available from LaPorte Industries, Ltd. The resulting mixture was rapidly agitated for 20 minutes to disperse the clay. A very slightly cloudy solution forms, almost water clear indicating very well dispersed finely divided clay. To the Laponite® dispersion was added 23.5 gm of a 10% sodium gluconate aqueous solution followed by 465.6 gm of a calcined active alumina. CP-3 from ALCOA. The slurry was boiled under reflux for 24 hours. The slurry was filtered and dried overnight at 137.8° C. (280° F.). The resulting composite particles were then dry calcined for 2 hours at 537.8° C. (referred to herein as fresh), or calcined for 4 hours at 800° C. in an atmosphere of 20 V % steam (referred to herein as steamed) and the surface area measured for the fresh and steamed samples.

The percent conversion of the alumina sample to crystalline boehmite was determined as follows:

(1) 100% boehmite is defined as an integrated intensity (area under the peak) of the (020) peak of Catapal alumina.

(2) The (101) peak intensity of a Quartz plate is used as an X-ray intensity monitor.

(3) Data collection is performed on a Philips® 3720 automatic diffractormeter equipped with a graphite diffract beam monochromator and sealed Cu X-Ray tube. The X-ray generator is operated at 45 kV and 40 mA (4) Full width at half maximum (FWHM) and integrated intensity (area under the peak) of the (020) boehmite peak are obtained by curve fitting. In the case where one peak can not yield a good fit of the peak, two peaks are used. In the case where two peaks are used for curve fitting, two crystallite sizes are obtained by using Equation 5. Percent boehmite of the two crystallite sizes are obtained by using Equation 4.

(5) The percentage of boehmite of a sample is determined by the following equation:

$$\%_{boehmite} = (I_{sample} * I_{quartz.c}) / (I_{catapal} * I_{quartz.s}) \quad \text{(Equation 4)}$$

wherein $I_{sample}$=Integrated intensity of the (020) peak of sample;

$I_{quartz.c}$=Intensity of the (101) quartz peak, measured at the time Catapal alumina was measured;

$I_{catapal}$=Integrated intensity of the (020) peak of the Catapal alumina; and $I_{quartz.s}$=Intensity of the (101) quartz peak, measured at the time sample was measured.

Boehmite crystallite size (L) is determined by the following procedure. The sample is hand ground with a mortar and pestle. An even layer of the sample is placed on 3.5 gms polyvinyl alcohol (PVA) and pressed for 10 seconds at 3,000 psi to obtain a pellet. The pellet is then scanned with Cu K Alpha radiation and the diffraction pattern between 22 and 33 degrees (2θ) is plotted. The peak at 28 degrees (2θ) is used to calculate the crystallite size using Equation 5 and the measured peak width at half height.

$$L(\text{size in Å}) = 82.98/\text{FWHM}(2\theta^\circ)\cos(\theta) \quad (\text{Equation 5})$$

wherein

FWHM=Full width at half maximum; and

θ=The angle of diffraction between X-ray beam and planar surface on which the sample is sitting.

Figure 1:
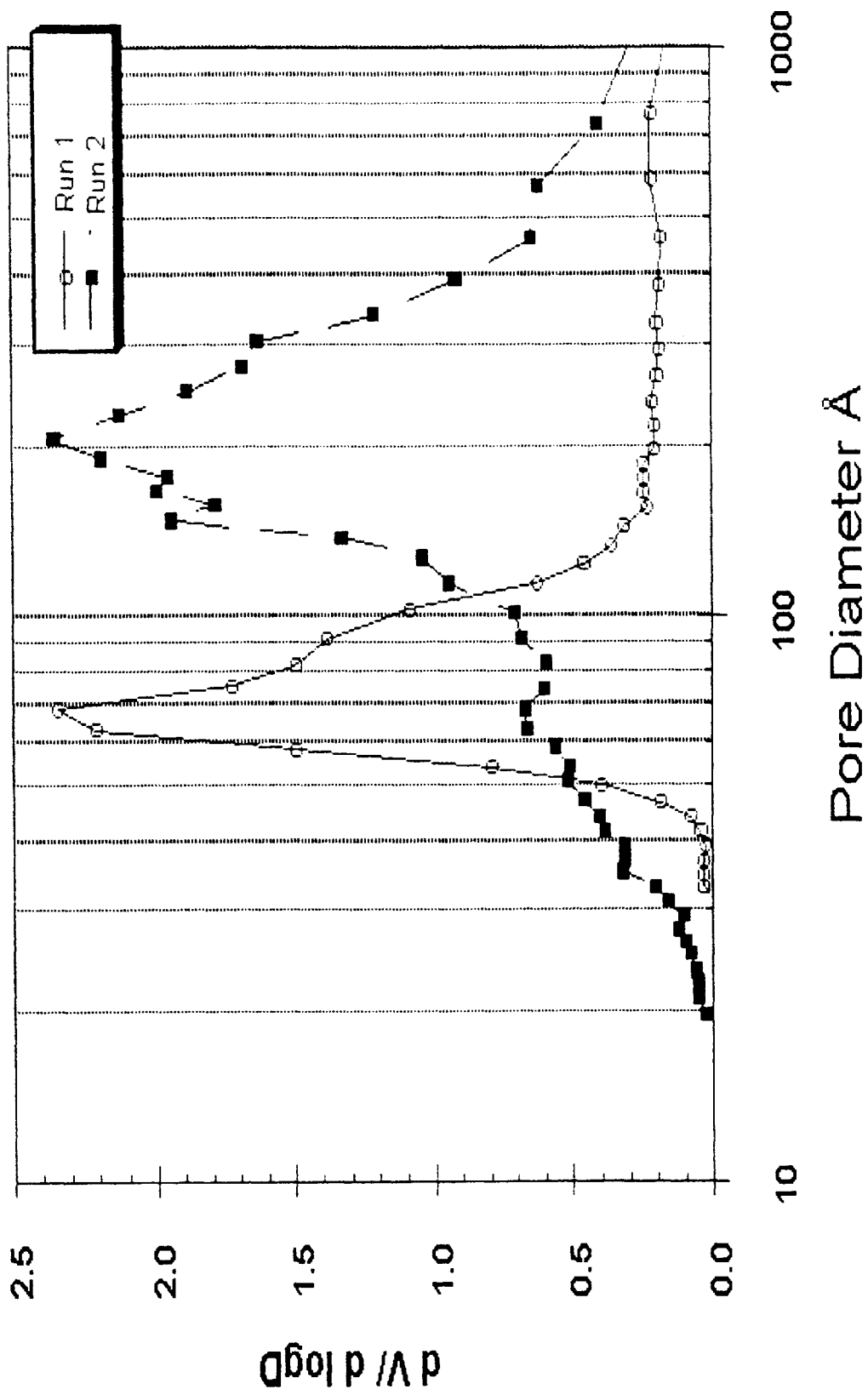

The resultant properties analyzed are reported at Table 2 and FIG. 1 and designated Run 2. The addition of 3% Laponite® gave increased fresh and steamed surface areas compared to Comparative Example 1. FIG. 1 also illustrates a large increase in total nitrogen pore volume and shift to larger pores.

COMPARATIVE EXAMPLE 1

Example 1 was repeated except that no Laponite® was added to the sample. The results are reported at Table 2, FIG. 1 and designated Run 1.

TABLE 2

EFFECT OF ADDITION OF 3% LAPONITE ® ON THE SURFACE PROPERTIES OF BOEHMITE OBTAINED BY REHYDRATION OF ACTIVE ALUMINA

| RUN NO. | 1 | 2 |
|---|---|---|
|  | Comp Ex. 1 | Example 1 |
| Wt. % Laponite ® | 0 | 3 |
| Boehmite Properties-After Hot Age 24 Hours At 100° C. (212° F.) | | |
| Average Pore Diameter (Å) | 149 | 197 |
| Total Pore Volume (cc/g) | 0.668 | 1.378 |
| Pore Volume > 600Å (cc/g) | 0.046 | 0.298 |
| Mesopore Pore Volume (cc/g) | 0.205 | 0.774 |
| Mesopore Content (% TPV) | 30.6 | 56.2 |
| Macropore SA (m²/g) | 2.8 | 17.2 |
| Mesopore Pore Mode (Å) | 70 | 200 |
| % increase in Mesopore Pore Mode | N/A | 185 |
| SURFACE AREA | | |
| 2 Hours @ 537.8° C. (Fresh) (m²/g) | 179 | 279 |
| Micropore Surface Area (Fresh) (m²/g) | 0 | 0 |
| Mesopore Surface Area (Fresh) (m²/g) | 179 | 279 |
| % Conversion Of Active Alumina To Boehmite | 83 | 78 |
| SA - 4 Hours @ 800° C., 20V % Steam (m²/g) | 112 | 182 |

EXAMPLE 2

Example 1 was repeated except that the level of the synthetic hectorite, Laponite®, was varied from 0.1 to 10 wt. % of the total solids (Laponite®+alumina) (corresponding to Runs 3–12). After a 24 hour age at reflux, the samples were filtered and dried overnight at 137.8° C. (280° F.). The boehmite crystallite size of selected samples was measured as well as the surface area after two hours at 537.8° C. (1000° F.), or 4 hours in 20 V % steam at 800° C. Also measured was the dispersability index (DPI) of the composite particles. This test measured the % of particles having a particle diameter of <1 micron after dispersing in water with a measured amount of HCl (237 milliequivalents/mole alumina) and mixing. The results of the level of synthetic hectorite on the boehmite properties are summarized at Table 3. It will be observed that the dispersible swelling clay:

(a) increased total nitrogen pore volume and average pore diameter to a maximum value in the 3–5 wt. % range;

(b) reduced Boehrnite crystallite size;

(c) significantly increased fresh and steamed surface area and nitrogen pore volume; and (d) increased dispersability of the alumina when 3 wt. % or more clay was added.

It was also noted that as the wt. % synthetic clay added was increased, the hardness of the oven dried boehmite increased. At 0 wt. % the oven dried material was a soft powder, at 3 wt. % clay it was moderately hard, while at 5–10 wt. % it was quite hard. This is believed to indicate that extrudates/beads made from the composite particles having levels of 3 wt. % and above would have a high crush strength. Plots of the nitrogen pore size distribution at clay levels from 0 to 1 wt. % are shown at FIG. 2, and those for clay levels between 0 and 6 wt. % are shown at FIG. 3.

Figure 2:
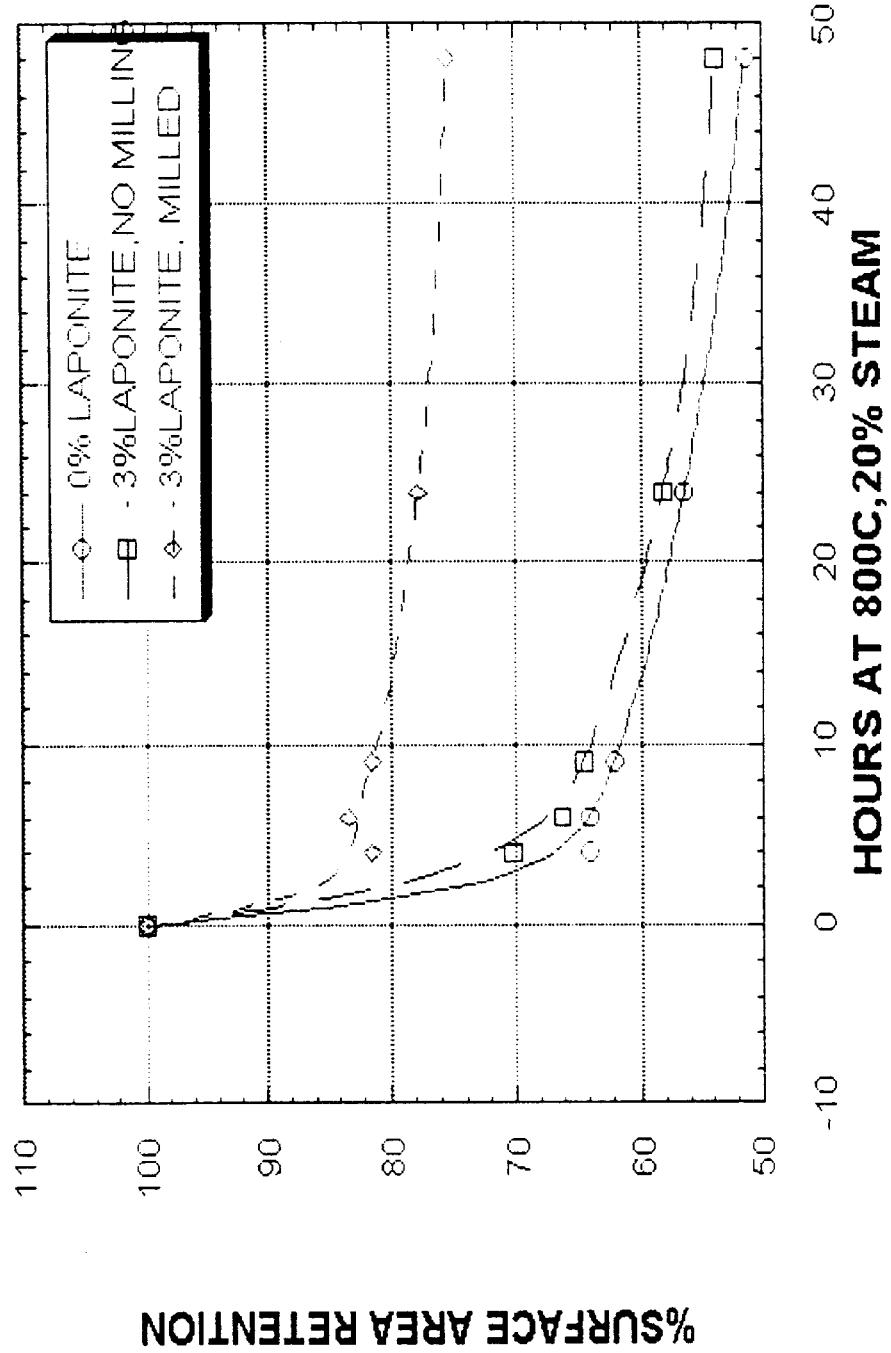
Figure 3:
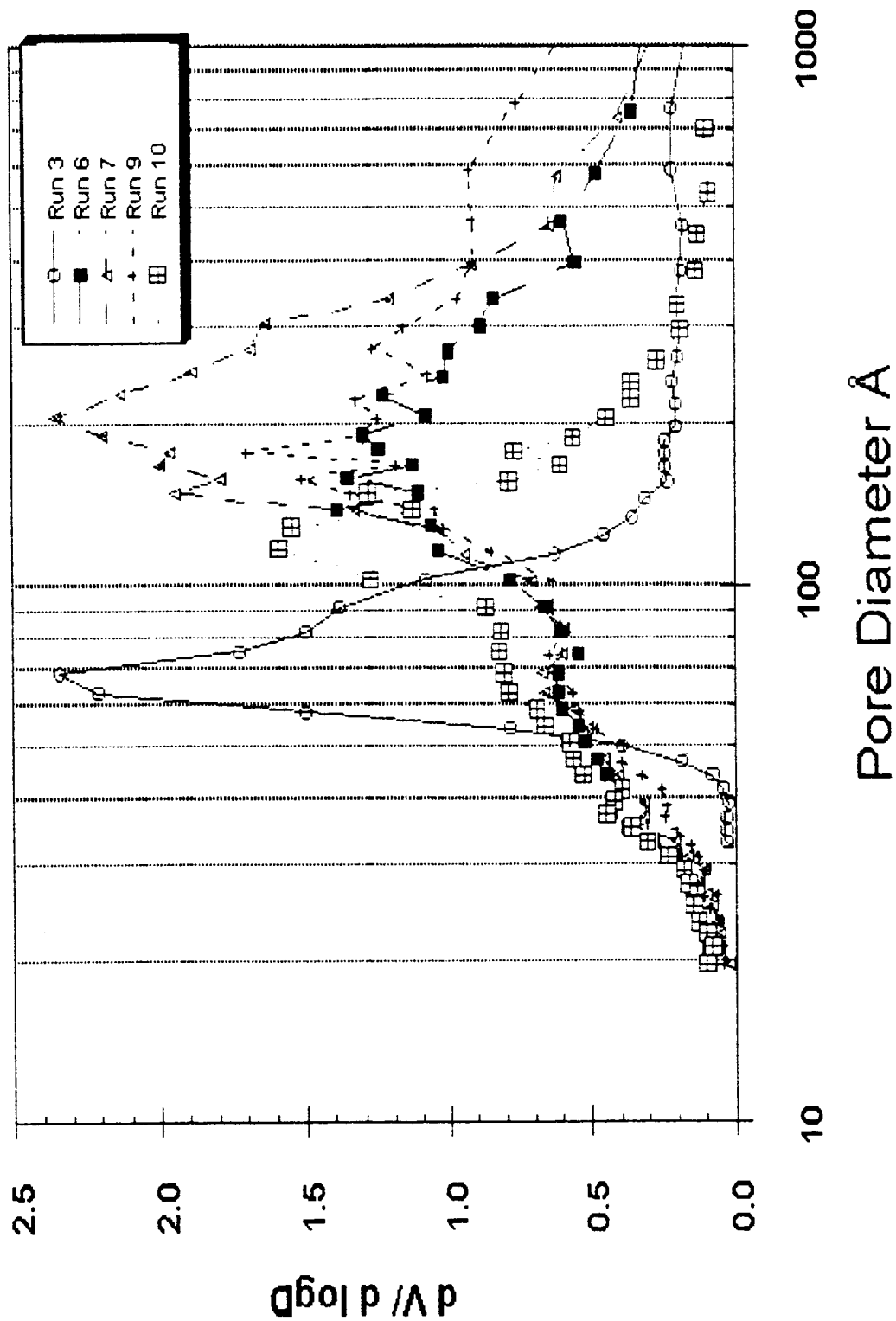

FIG. 2 actually shows a decrease in the mesopore pore mode at low levels of Laponite®. FIG. 3 shows a consistent shift to higher mesopore pore modes at increasingly higher clay concentrations between 2 and 5 wt. %. Table 3 shows a peaking of total pore volume (TPV), average pore diameter (APD), and fresh and steamed surface area (SA) peaks at a clay concentration of 5 wt. %.

TABLE 3

EFFECT OF THE LAPONITE ® LEVEL ON THE FRESH AND STEAMED PROPERTIES OF BOEHMITE

| Run No. | 3 | 4 | 5 | 6 | 7 | 8 | 9 | 10 | 11 | 12 |
|---|---|---|---|---|---|---|---|---|---|---|
| WT. % Laponite ® | 0 | 0.5 | 1 | 2 | 3 | 4 | 5 | 6 | 8 | 10 |
| % Conversion Active Alumina To Boehmite | 83 | NA | 72 | 72 | 78 | 79 | 65 | NA | 68 | NA |
| *Crystallite Size (Å) | 128 | 114 | 99 | 81 | 94 | 79 | 62 | 63 | 74 | 69 |
| DPI (%) | 21 |  | 20 | 27 | 99 | 100 | 100 | 100 | 100 | 100 |
| 2 hours @ 537.8° C. | | | | | | | | | | |
| BET SA (m²/g) | 179 | 263 | 289 | 317 | 279 | 311 | 315 | 290 | 295 | 286 |
| Micro SA (m²/g) | 0 | 0 | 0 | 0 | 0 | 0 | 0 | 0 | 0 | 0 |
| Meso SA (m²/g) | 179 | 263 | 289 | 317 | 279 | 311 | 315 | 290 | 295 | 286 |
| Ave P.D. (Å) | 149 | 90 | 95 | 122 | 197 | 153 | 188 | 112 | 89 | 88 |
| Total P.V. (cc/g) | 0.668 | 0.592 | 0.687 | 0.966 | 1.378 | 1.184 | 1.479 | 0.813 | 0.659 | 0.629 |

TABLE 3-continued

EFFECT OF THE LAPONITE ® LEVEL ON THE FRESH AND STEAMED PROPERTIES OF BOEHMITE

| Run No. | 3 | 4 | 5 | 6 | 7 | 8 | 9 | 10 | 11 | 12 |
|---|---|---|---|---|---|---|---|---|---|---|
| **SA On Dist ($m^2/g$) | 276 | 456 | 450 | 436 | 341 | 373 | 388 | 354 | 340 | 335 |
| PV>600Å (cc/g) | 0.046 | 0.054 | 0.055 | 0.226 | 0.298 | 0.222 | 0.176 | 0.061 | 0.035 | 0.034 |
| Mesopore Content (%) | 34 | 16 | 22 | 31 | 55 | 68 | 67 | 47 | 42 | 37 |
| Macropore Content (%) | 8.6 | 10 | 9 | 21 | 26 | 26 | 15 | 8 | 6 | 6 |
| Mesopore Pore Mode (Å) | 70 | 39 | 39 | 140 | 206 | 200 | 180 | 103 | 120 | 125 |
| % Increase In Pore Mode | N/A | −45 | −45 | 100 | 194 | 186 | 154 | 47 | 71 | 70 |
| 4 hours @ 800° C. (20% STEAM) | | | | | | | | | | |
| BET SA ($m^2/g$) | 112 | 131 | 150 | 184 | 182 | 198 | 228 | 209 | 213 | 203 |
| Micro SA ($m^2/g$) | 0 | | | | | | | | | |
| Meso SA ($m^2/g$) | 112 | | | | | | | | | |
| Ave. P.D. (Å) | 230 | | | | | | | | | |
| Total P.V. (cc/g) | 0.643 | | | | | | | | | |
| SA On Dist. ($m^2/g$) | 142.5 | | | | | | | | | |
| PV>600Å (cc/g) | 0.07 | | | | | | | | | |
| ***% SA Ret. | 62.6 | 49.8 | 51.9 | 58 | 65.2 | 63.7 | 72.4 | 72.1 | 72.2 | 71 |

Note: Total $N_2$ Pore Volume Measured at a Relative Pressure of 0.995 P/Po.
* = After Aging Slurry at 100° C. for 24 Hours
** = Surface Area Calculated from $N_2$ Pore Size Distribution for Pores Having Pore Diameter 20-600Å
*** = % Surface Area Retained After Steaming

EXAMPLE 3

This example illustrates the effect of drying conditions and total volatiles (TV) measured at 954.4° C. (1750° F.) on the dispersability of the synthetic hectorite and accordingly the alumina product.

A two gallon autoclave batch of synthetic hectorite was prepared in accordance with Example 2 of U.S. Pat. 4,049,780.

After autoclaving, the gel slurry of synthetic hectorite was filtered, washed with water and divided into Samples 1 to 4 as follows:

(1) held as filter cake, TV=83.43%
(2) oven dried overnight at 100° C. (212° F.), TV=12.83%
(3) spray dried (S.D.) at 130° C. outlet, TV=19.38%
(4) spray dried at 180° C. outlet, TV=15.45%

Spray dried Samples 3 and 4 were prepared by reslurrying the filter cake to about 2% solids before spray drying in a small bench top spray dryer.

Four separate alumina/synthetic hectorite composites were prepared in accordance with Example 2 but using 3 wt. % of one of the synthetic hectorite Samples 1 to 4. The solids content of each clay/alumina slurry was 17 wt. %. More specifically, each of the above synthetic hectorite Samples 1 to 4 were slurried in water with rapid agitation for ½ hour. Calcined alumina was then added to each slurry and boiled for 24 hours under reflux with good agitation. The effect on the alumina pore volume of the synthetic hectorite is shown at Table 4, Runs 13 to 16, The Total Pore Volume of the boehmite product increases as the dispersability of the synthetic hectorite increases. It was visually noted that the water dispersed synthetic hectorites increased in clarity (and hence dispersity) in the order: filter cake <oven dried <S.D. @ 130° C. <S.D. @ 180° C. which is the order of increasing pore volume, average pore diameter and dispersability index of the alumina. Accordingly, the shift in pore volume can be controlled by the level of dispersible swelling clay used and/or the degree of dispersion of the swelling clay. The degree of dispersion, or the size of the clay particles in the dispersion, can be controlled by the clay synthesis conditions (molar input ratios, autoclave temperature, etc.) or drying conditions. Note further that the fresh and steamed S.A.'s of Sample 4 is still higher than Sample 1 while achieving a much higher TPV.

TABLE 4

EFFECT OF SYNTHETIC HECTORITE DRYING CONDITIONS ON THE SURFACE PROPERTIES OF BOEHMITE FROM ACTIVE ALUMINA @ 3% CLAY

| RUN NO. | 13 | 14 | 15 | 16 |
|---|---|---|---|---|
| Synthetic Hectorite Sample # | 1 | 2 | 3 | 4 |
| Type of Drying | Not Dried (Filter Cake) | Oven Dried Overnight At 212° F.) | Spray Dried At 130° C. | Spray Dried At 180° C. |
| Clay TV | 83.43% | 12.83% | 19.38% | 15.45% |
| Wt. % Clay Added | 3% | 3% | 3% | 3% |
| Alumina Properties [Calcined 2 hours @ 537.8° C. (1000° F.)] | | | | |
| BET Surface Area ($m^2/g$) | 261 | 295 | 285 | 264 |
| Ave. Pore Diameter (A) | 119 | 172 | 195 | 216 |
| Total Pore Volume (cc/g) | 0.773 | 1.268 | 1.387 | 1.428 |
| Dispersability Index (%) | 20 | 36 | 62 | 94 |
| HydroThermal Stability | | | | |
| 4 Hrs. @ 800° C. 20V % | 195 | 238 | 230 | 213 |
| Steam Surface Area ($m^2/g$) | | | | |

EXAMPLE 4

This example illustrates the impact of dispersability on the morphological properties of the composite as mediated by the clay forming reaction temperature.

A first synthetic hectorite sample labeled SH-1, designated Run 16–1, was prepared generally in accordance with Example 3 at inputs of 1.49 moles $SiO_2$, 1.0 mole MgO, 0.06 mole Li, 0.08 mole Na by adding 97.9 gm silicic acid ($H_4SiO_4$), 58.3 gm $Mg(OH)_2$, 2.55 gm LiCl, and 4.7 gm NaCl to 1, 169 gm H$_2$O and boiled at reflux for 24 hours. A second synthetic hectorite (SH-2), designated Run 16–2, was prepared using inputs of 87.4 gm silicic acid, 58.3 gm Mg (OH)$_2$ and 10.5 gm LiCl added to 1,083 gm H$_2$O and hot aging in a plastic bottle for about 24 hours at 101.7° C. (215° F.). Both samples had X-ray diffraction patterns of hectorite. A slurry of each clay was prepared by blending in water for 2 minutes, and to this slurry was added 291 gm, dry basis, CP-3 calcined alumina and 1.5 gm sodium gluconate. The synthetic clay/alumina weight ratio was 3/97. This slurry was boiled under reflux for 24 hours, filtered and oven dried. It was observed during reflux of the synthetic hectorite starting materials for both SH-1 and SH-2, that the particles were coarse and did not disperse to a colloidal sol.

Figure 4:
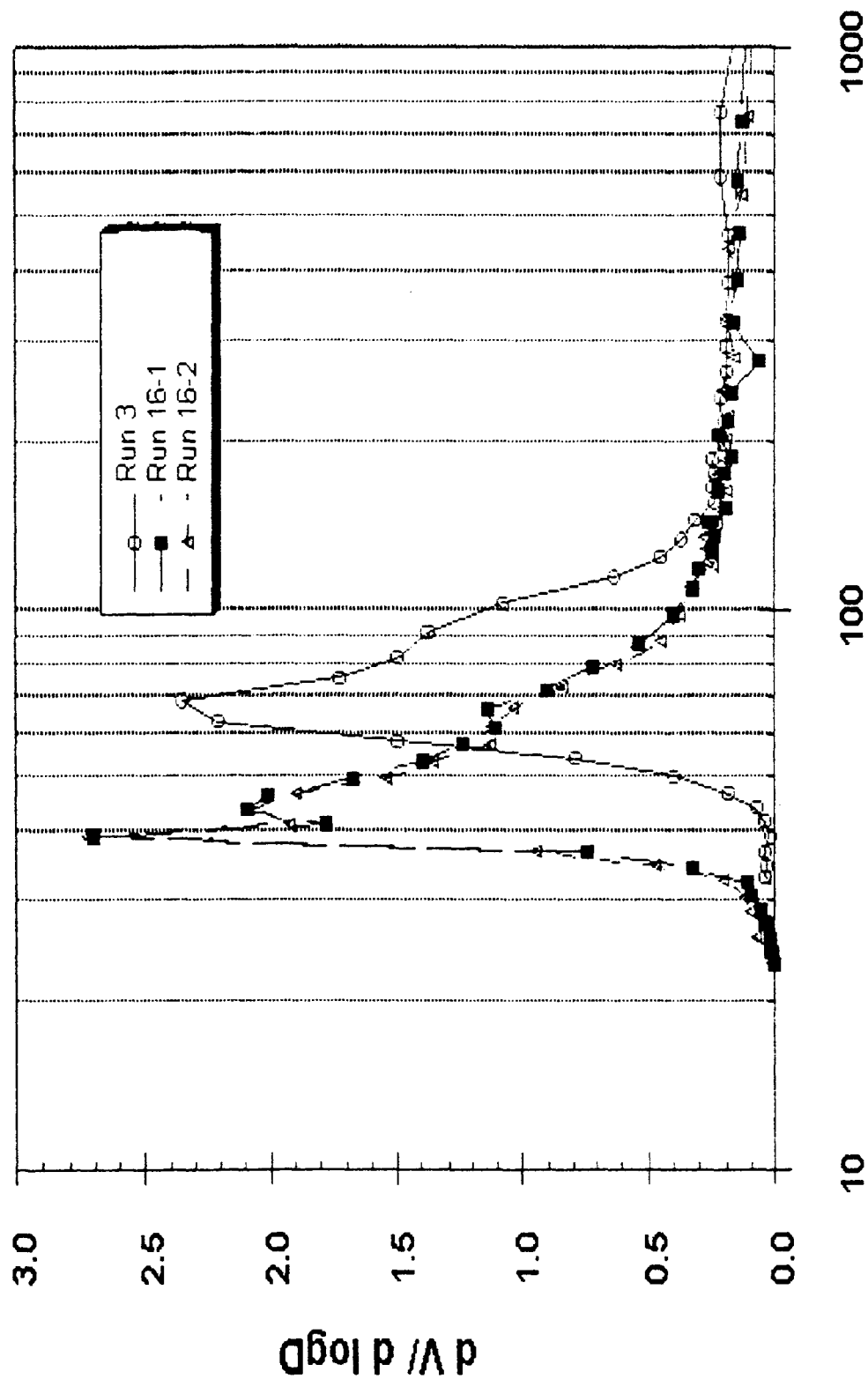

Nitrogen pore size distribution results, are summarized at FIG. 4 along with the plot from the control of Run 3. These results illustrate that this alumina prepared with nondispersible or poorly dispersed synthetic hectorites (SH-1 and SH-2) do not have the same shift in nitrogen pore size distribution of even the control without any synthetic hectorite. The amounts of reactants for SH-1 and SH-2 are summarized at Table 5.

TABLE 5

| RUN NO. | 16-1 | 16-2 |
|---|---|---|
| Reactants | Sample No. SH-1 (gms) | Sample No. SH-2 (gms) |
| H$_4$SiO$_4$ | 97.9 | 87.4 |
| Mg(OH)$_2$ | 58.3 | 58.3 |
| LiCl | 2.55 | 10.5 |
| NaCl | 4.7 | 0 |
| H$_2$O | 1.169 | 1.083 |

In general, the higher the synthetic hectorite reaction forming temperature or the longer the time, the higher will be its dispersability. Thus, reaction forming temperatures of at least 150 to 200° C. are preferred. Such temperatures are achievable with an autoclave.

EXAMPLE 5

This example illustrates the effect of employing highly purified non-fluorinated hectorite in place of a synthetic hectorite. Two samples of highly purified natural hectorite were obtained from the American Colloid Co. These clays, Hectalite 200 (designated separately NH-1) and Hectabrite DP (Designated NH-2), were dispersed for 1 minute in a blender. Calcined alumina and sodium gluconate were then added to each dispersion to give 3% clay and 97% calcined alumina (CP-3, ALCOA). The gluconate level was 0.5 wt. % on an alumina basis. Both slurries were boiled under reflux for 24 hours with agitation, filtered, and oven dried. Nitrogen pore size distribution results are reported at FIG. 5. This procedure was repeated using clay samples SH-1 and SH-2 and designated Runs 20 and 21.

A reference alumina sample designated CE-2 was also prepared in accordance with Example 5, except the clay was omitted.

Figure 5:
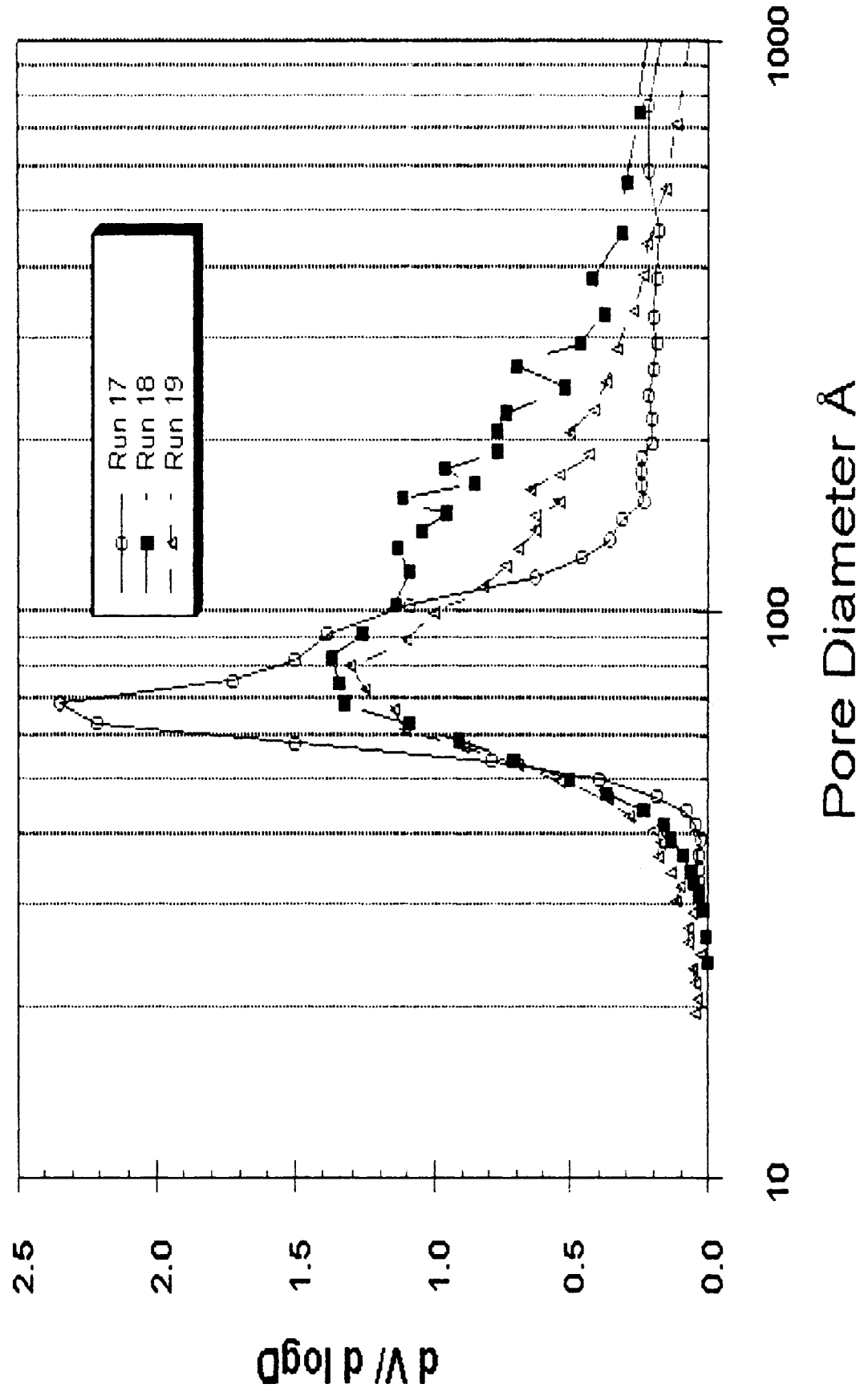

A comparison of the plots of FIGS. 1 and 3 with those of FIG. 5 illustrate only a slight shift of the mesopore mode to higher diameters when using natural hectorite versus synthetic hectorite (Runs 20–21). Other morphological properties of the natural hectorite samples (Runs 18–19), the sample from Run 7, and Comparative Sample CE-2 (Run 17) are also reported at Table 6.

TABLE 6

EFFECT OF VARIOUS HECTORITES ON BOEHMITE PORE STRUCTURE

| RUN NO. | 17 | 18 | 19 | 20 | 21 | 7 |
|---|---|---|---|---|---|---|
| SAMPLE# | CE-2 | NH-1 | NH-2 | SH-1 | SH-2 | Table 3 Run 7 |
| CLAY | 0 | HECTALITE | HECTABRITE | SYN HECT | SYN HECT | LAPONITE ® |
| WT % Added | 0 | 4 | 4 | 3 | 3 | 3 |
| BET SA (m$^2$/g) | 179 | 235 | 221 | 257 | 263 | 279 |
| Mic SA (m$^2$/g) | 0 | 0 | 0 | 0 | 0 | 0 |
| Meso SA (m$^2$/g) | 179 | 235 | 221 | 257 | 263 | 279 |
| Ave. P.D. (Å) | 149 | 166 | 127 | 106 | 102 | 197 |
| Total PV (cc/g) | 0.668 | 0.979 | 0.702 | 0.681 | 0674 | 1.378 |
| SA On Dist. (m$^2$/g) | 275.9 | 319.6 | 276.8 | 429.9 | 441.2 | 341 |
| PV>600Å (cc/g) | 0.046 | 0.143 | 0.039 | 0061 | 0.049 | 0.298 |

EXAMPLE 6

This example illustrates the effect of a synthetic hectorite on hydrothermal stability of a different calcined alumina. Thus, a calcined alumina available from Porocel under the tradename AP-15 was used to make composites of Boehmite/Laponite® using the procedure of Example 1, except the levels of dispersible hectorite (Laponite® RD) were varied at 0, 1.5, and 3 wt. % and no sodium gluconate was employed (Run 22). The results indicate good hydrothermal stability was obtained, with or without added gluconate. The stability is very comparable to that obtained with the CP-3 alumina.

Figure 6:
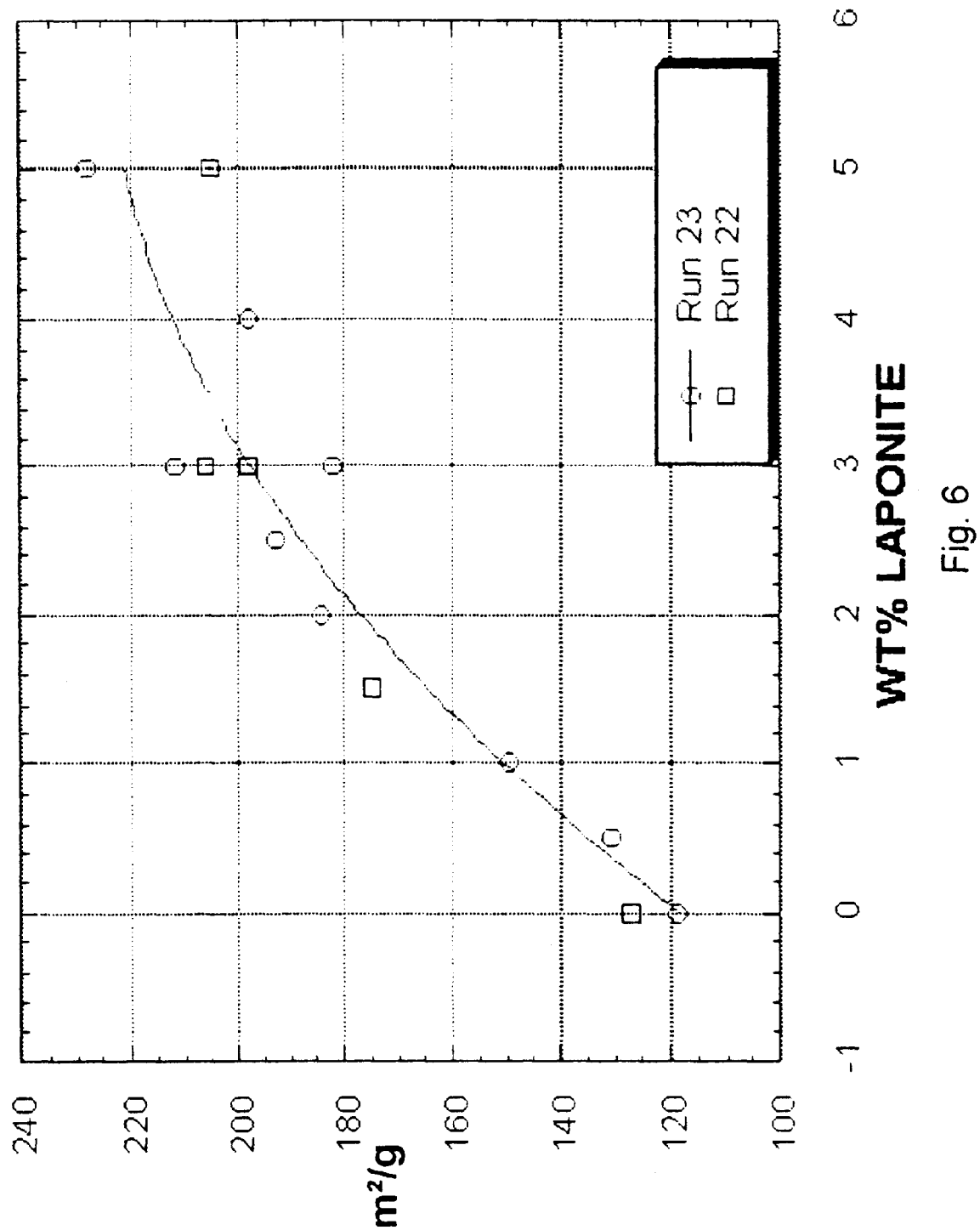

The resulting samples were aged in steam (20%) for 4 hours at 800° C. and the BET surface area in m$^2$/g determined. In addition, composite samples were prepared in accordance with Example 1 using CP-3 alumina except that the Laponite® content was varied at 0. 0.1, 0.2, 0.25, 1.5, 2, 3 and 5 wt. % and the resulting products aged as described above for the AP-15 derived samples. The results are shown at FIG. 6 as Run 23.

EXAMPLE 7

This example illustrates the effect of varying the point of addition of synthetic Laponite® before and after rehydration of the calcined alumina.

Figure 7:
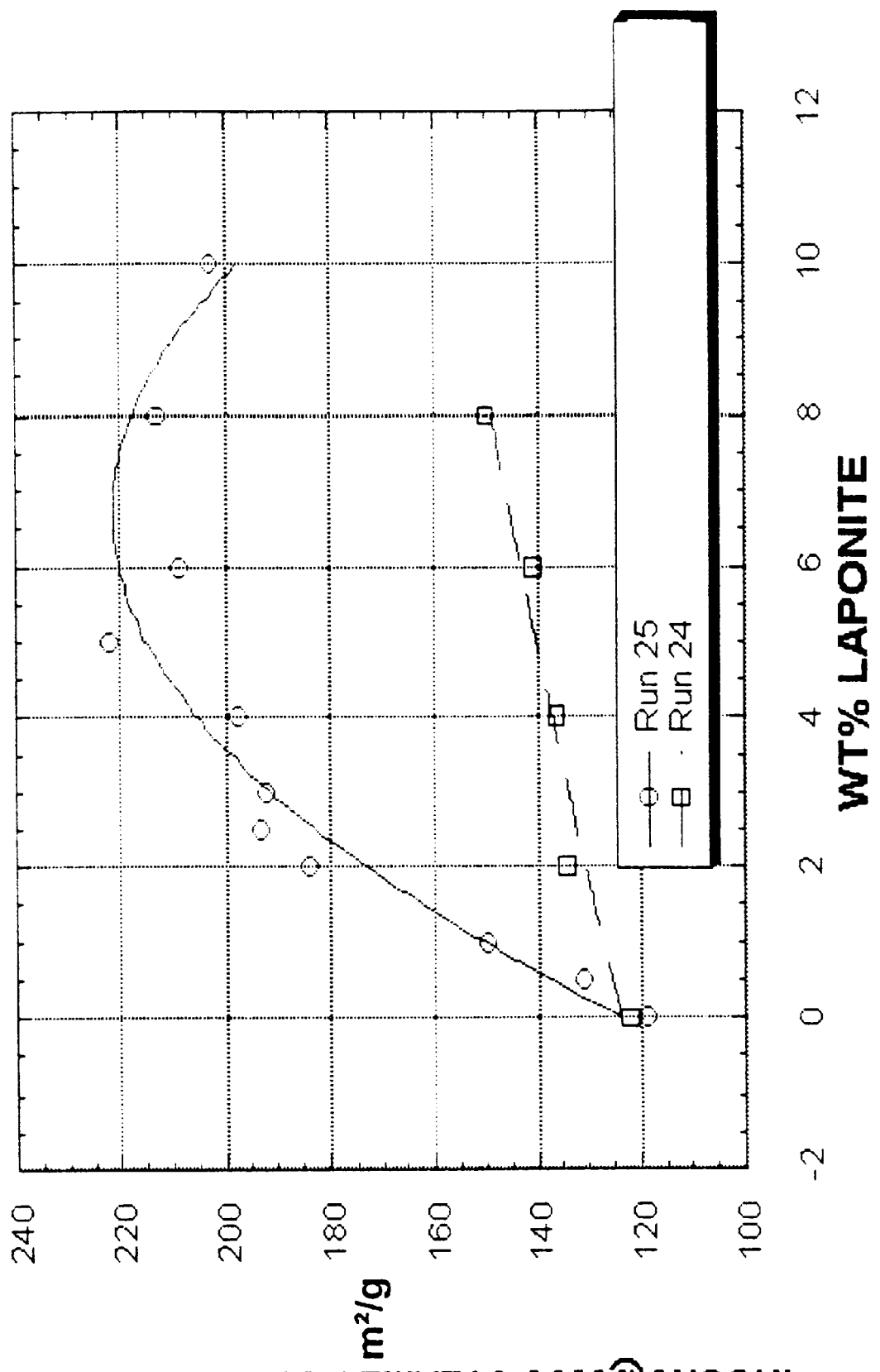

A batch of boehmite from calcined alumina was prepared as follows: to 1888 gms H$_2$O in a 3L glass container was added 24.4 gms of a 10 wt. % sodium gluconate solution and then 480 gms, dry basis, of calcined CP-3 alumina from ALCOA. This slurry was boiled for 24 hours under reflux to rehydrate the alumina. The rehydrated alumina was then divided into 5 equal portions. To each was added varying amounts of Laponite® RD (Laporte) at 0, 2, 4, 6 and 8 wt. %. The surface area of these materials was determined after aging 4 hours in 20% steam at 800° C. and the results reported at FIG. 7 as Run 24. The above procedures were repeated except that the Laponite® was added at 0, 0.25, 1.0, 2.0, 2.25, 3.0, 3.75, 4.0, 5.0, 6.0, 8.0, and 10 wt. % amounts prior to refluxing the alumina, i.e., prior to rehydration. The resulting products were then also aged in steam (20%) for 4 hours at 800° C., the BET surface area determined and results summarized at FIG. 7. Run 25. As can be seen therefrom addition of the dispersible hectorite before rehydration (Run 25) gives a more hydrothermally stable product versus addition after rehydration (Run 24). It is thought that this is due to the higher fresh surface area, pore volume and average pore diameter of this product, as well as the better dispersion of the clay within the alumina, when it is added at the start of the rehydration.

EXAMPLE 8

This example illustrates the effect on hydrothermal stability of pre-milling the slurry containing the dispersible synthetic hectorite and a calcined alumina (CP-3, ALCOA).

To 8,331 gm $H_2O$ was added with rapid agitation 51.9 gm Laponite® RD (Laporte, TV=13.26%). The slurry was aged at room temperature with agitation for 20 minutes to disperse the clay. A substantially clear solution formed indicating a good, colloidal dispersion of the clay. To this was added 1,616.7 gm CP-3 (TV=10%) with good agitation. The slurry containing 3 wt. % Laponite® was then milled under severe (80% media, 0.75 l/1 min.) conditions in a 4L DRAIS mill. The milled slurry was boiled under reflux for 24 hours and a portion filtered and oven dried. The resulting sample is designated Run 28. The designation 0.75 L/1 min refers to an input/output of 0.75 liters per minute to and from the mill.

The above procedure was repeated except the premilling was omitted. This sample is designated Run 27.

In addition, a control was prepared wherein the Laponite® was omitted and no premilling was employed. This sample was designated Run 26.

All three samples were then divided into two parts and the first part aged at 4 hours in 20% steam at 800° C. and the second part aged at 537.8° C. for 2 hours. The surface area was then determined for each aged sample. The hydrothermal stability results are summarized at Table 7 and the nitrogen pore properties depicted at FIG. 8.

Table 7 indicates that premilling leads to a product with much higher fresh surface area and steamed surface area than the no clay base case or the unmilled sample with the same level of dispersible clay. Nitrogen pore size distribution results indicate premilling gives a small shift to more pores of smaller diameter but higher TPV.

TABLE 7

| RUN NO. | 0% Laponite ® 26 | 3% Laponite ® w.o. Milling 27 | 3% Laponite ® with Milling Before Aging 28 |
|---|---|---|---|
| | SA (m²/g) | SA (m²/g) | SA (m²/g) |
| 4 hrs @ 800° C. SA | 115–119 | 195–210 | 281 |
| 2 hrs @ 537.8° C. | 199 | 279 | 345 |
| Ave P.D. (Å) | 153 | 197 | 169 |
| Total Pore Vol. (cc/g) | 0.761 | 1.378 | 1.461 |

TABLE 7-continued

| RUN NO. | 0% Laponite ® 26 | 3% Laponite ® w.o. Milling 27 | 3% Laponite ® with Milling Before Aging 28 |
|---|---|---|---|
| Mesopore Pore Mode (Å) | 69 | 111 | 108 |
| % Increase in Mesopore pore Mode | N/A | 61 | 56 |

EXAMPLE 9

This example illustrates the effect and degree of pre-dispersion achieved with a laboratory preparation of synthetic hectorite dried to a low TV (9.64%).

The synthetic hectorite was prepared by slowly adding a solution of 75.3 gm $Na_2CO_3$ dissolved in 289 gm $H_2O$ to a solution of 183.5 gm $Mg\ SO_4 \cdot 7H_2O + 3.4$ gm LiCl. Then a solution of 267.4 gm silicate (27.11% $SiO_2$) diluted with 826 gm $H_2O$ was added over a half hour period. The resulting gel slurry was boiled for 30 minutes to remove carbonate then autoclaved for 2 hours at 200° C. filtered, washed on the filter with 1 L 65.6° C. (150° F.) deionized water and dried at 135° C.

Portions were reslurried in water as follows:

| Run 29 | stir with moderate agitation for 30 minutes |
| Run 30 | disperse with Silverson mixer for 10 minutes at 10,000 RPM |
| Run 31 | stir for about 18 hours with magnetic stirring bar. |

To each of the above slurries was added enough calcined alumina (CP-3, ALCOA) to make a 15% solids slurry with 3 wt. % of the synthetic hectorite and 97% alumina. The slurry was boiled for 24 hours under reflux with agitation. The slurry was filtered and over dried at 137.8° C. (280° F.). The average pore diameter of each product derived from Runs 29 to 31 was measured after 2 hours at 537.8° C. (1000° F.) calcination. The surface area and TPV were determined and the results summarized at Table 8.

The average pore diameter increased from 147 to 159 to 176 Å for Runs 29 to 31 respectively, indicating better dispersion is achieved as dispersing time and/or severity was increased. It is believed that this sample was difficult to disperse due to its relatively low total volatiles of 9.64%. Thus, dispersability of the clay can be enhanced by controlling the TV, the degree of clay dispersion, or the clay crystallite size, which in turn control the average pore diameter of the alumina.

TABLE 8

THE EFFECT OF THE DEGREE OF DISPERSION OF THE SYNTHETIC HECTORITE ON THE TOTAL $N_2$ PORE VOLUME AND AVERAGE PORE DIAMETER OF THE BOEHMITE PREPARED BY REHYDRATION OF ACTIVE ALUMINA

| RUN NO. | 29 | 30 | 31 |
|---|---|---|---|
| WT. % Synthetic Hectorite | 3 | 3 | 3 |
| Clay Dispersion | 30 Min. Mild Agit. | 10 Min. Silverson (10,000 rpm) | 18 Hrs. Mild Agit. |

TABLE 8-continued

THE EFFECT OF THE DEGREE OF DISPERSION OF THE SYNTHETIC HECTORITE ON THE TOTAL $N_2$ PORE VOLUME AND AVERAGE PORE DIAMETER OF THE BOEHMITE PREPARED BY REHYDRATION OF ACTIVE ALUMINA

| RUN NO. | 29 | 30 | 31 |
|---|---|---|---|
| 2 hrs @ 537.8° C. (1000° F.) Alumina Properties | | | |
| Surface Area (m²/g) | 286 | 284 | 284 |
| Pore Diameter (Å) | 147 | 159 | 176 |
| $N_2$ Pore Vol. (cc/g) | 1.05 | 1.13 | 1.23 |

Total volatiles of the synthetic hectorite, sample employed for Runs 29–31 was only 9.64%, and is believed to have made this clay difficult to fully disperse regardless of the degree of agitation.

COMPARATIVE EXAMPLE 2

This example illustrates the effect of non-swellable clays such as Kaolin, or calcined Kaolin on pore structure.

Example 1 was repeated except that the clay employed was kaolin or calcined kaolin at the amounts reported in Table 9. The resulting composites are designated as Run 33 (kaolin), Run 34 (calcined kaolin at 6 wt. %), and Run 35 (calcined kaolin at 12 wt. %). The calcination of the kaolin was conducted at 900° C. for 0.66 hours. The surface properties of these materials were measured as was the fresh surface area and the results reported at Table 9. A control alumina with no clay was also employed prepared by the same method and designated Run 32. The amounts of kaolin present in the composite particles is also reported at Table 9. Nitrogen desorption data for Runs 32 to 35 is also reported at FIG. 9. As can be seen from Table 9 and FIG. 9, the kaolin actually caused a reduction in average pore diameter (APD) and Total Pore Volume relative to the control but an increase in surface area. Kaolin is a non-swellable clay.

EXAMPLE 10

This example illustrates the effect on pore properties of using the less preferred montmorillonite clay.

Comparative Example 2 was repeated except that montmorillonite clay, available from Southern Clay Products under the tradename Gelwhite L. replaced the kaolin clay at 6 wt. % (Run 36) and 12 wt. % (Run 37). The control at 0 wt. % clay is designated Run 32. The results are summarized at Table 9 and FIG. 10. As can be seen therefrom, the alumina pore properties and surface area are higher at 6 wt. % than 12 wt. % clay. Moreover, the mesopore pore mode does not appear to shift to the right, and the pore size distribution spreads out. This is believed to be attributable to the fact that montmorillonite is difficult to disperse well without some other treatment such as significant milling to reduce the particle size, ion-exchange, or the use of dispersants such as tetra sodium pyrophosphate.

EXAMPLE 11

Comparative Example 2 was repeated except that sodium silicate replaced the kaolin clay at 0.5 wt. % (Run 39) and 1 wt. % (Run 38). The control without silicate is Run 32.

TABLE 9

EFFECT OF VARIOIUS ADDITIVES ON THE BOEHMITE PORE STRUCTURE

| RUN NO. | 32 | 33 | 34 | 35 | 36 | 37 | 38 |
|---|---|---|---|---|---|---|---|
| Clay | None | Kaolin | Calcined Kaolin | Calcined Kaolin | Montmo-rillonite | Montmo-rillonite | % $SiO_2$ from Silicate |
| Wt. % | 0 | 12 | 6 | 12 | 6 | 12 | 1 |
| 2 hrs. @ 537.8° C. (1000° F.) Properties | | | | | | | |
| BET Surface Area (m²/g) | 199 | 186 | 298 | 311 | 246 | 239 | 281 |
| Ave. Pore Diameter (Å) | 153 | 129 | 91 | 77 | 138 | 116 | 102 |
| Total $N_2$ Pore Volume (cc/g) | 0.761 | 0.598 | 0.675 | 0.603 | 0.848 | 0.692 | 0.718 |
| Mesopore Pore Mode (Å) | 69 | 58 | 39 | 39 | 70 | 70 | 40 |
| % Increase in Mesopore Pore Mode | N/A | −16 | −44 | −44 | 1 | 1 | −42 |

Figure 11:
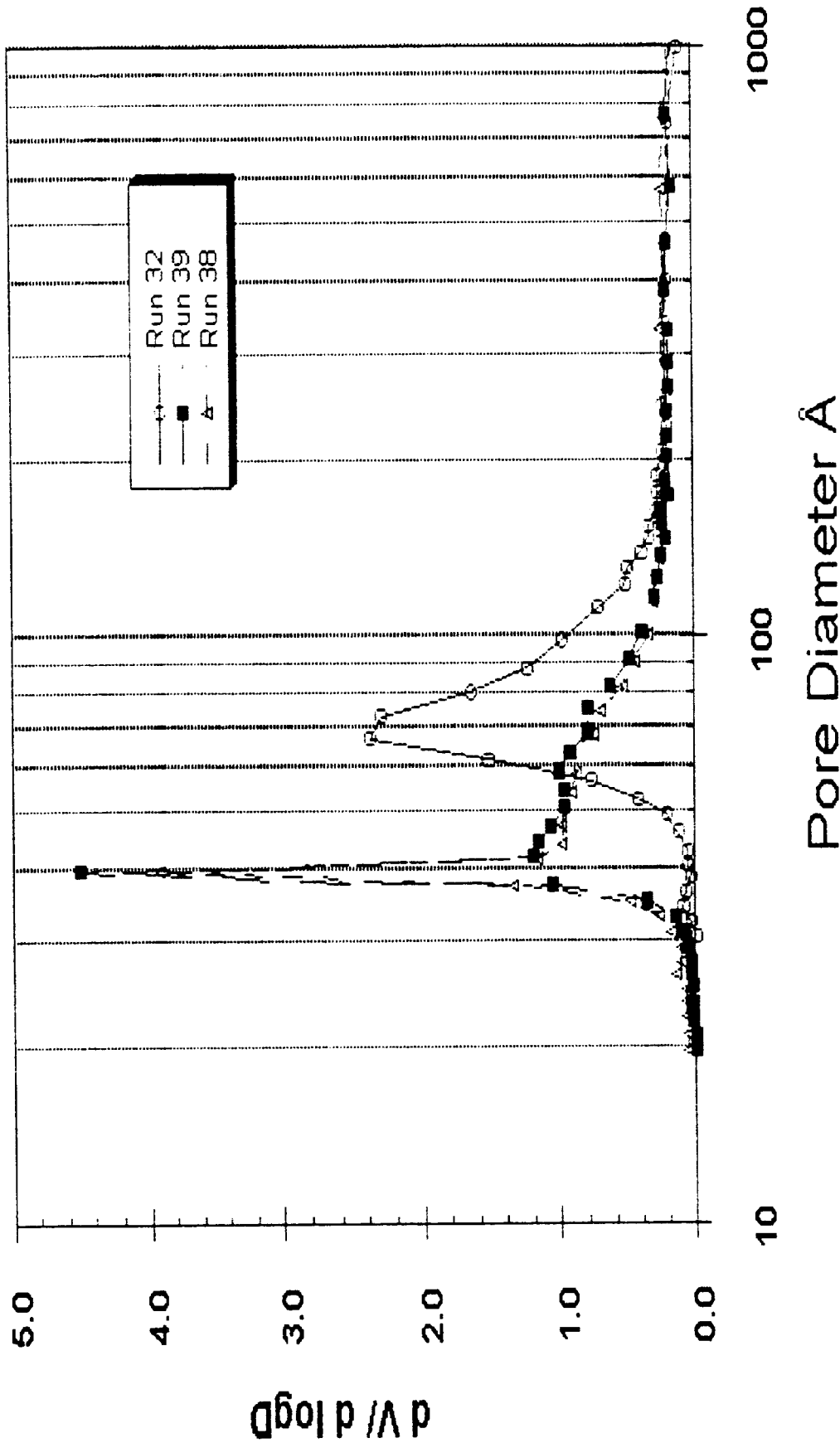

The pore properties and surface area were tested and the results summarized at Table 9 (for Run 38) and FIG. 11. As can be seen therefrom the silicate actually induced a sharp shift of the mesopore pore mode to smaller pore diameters. Thus, the silicate derived composites can be blended with the hectorite derived composites to shift the pore structure as desired for each intended application.

EXAMPLE 12

This example illustrates the effect on hydrothermal stability of milling the calcined alumina prior to rehydration in the presence of swellable clay.

Figure 12:
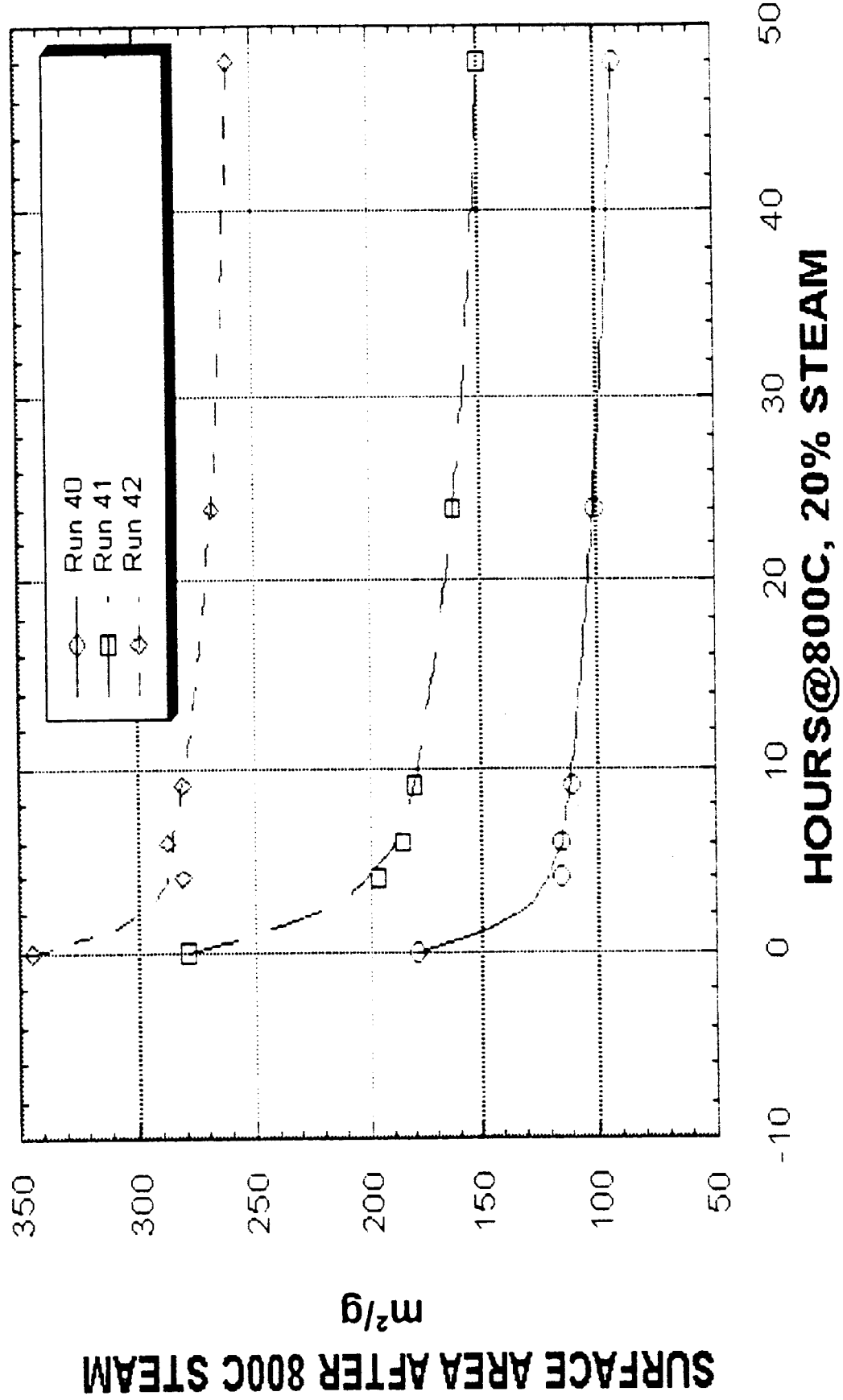
Figure 13:
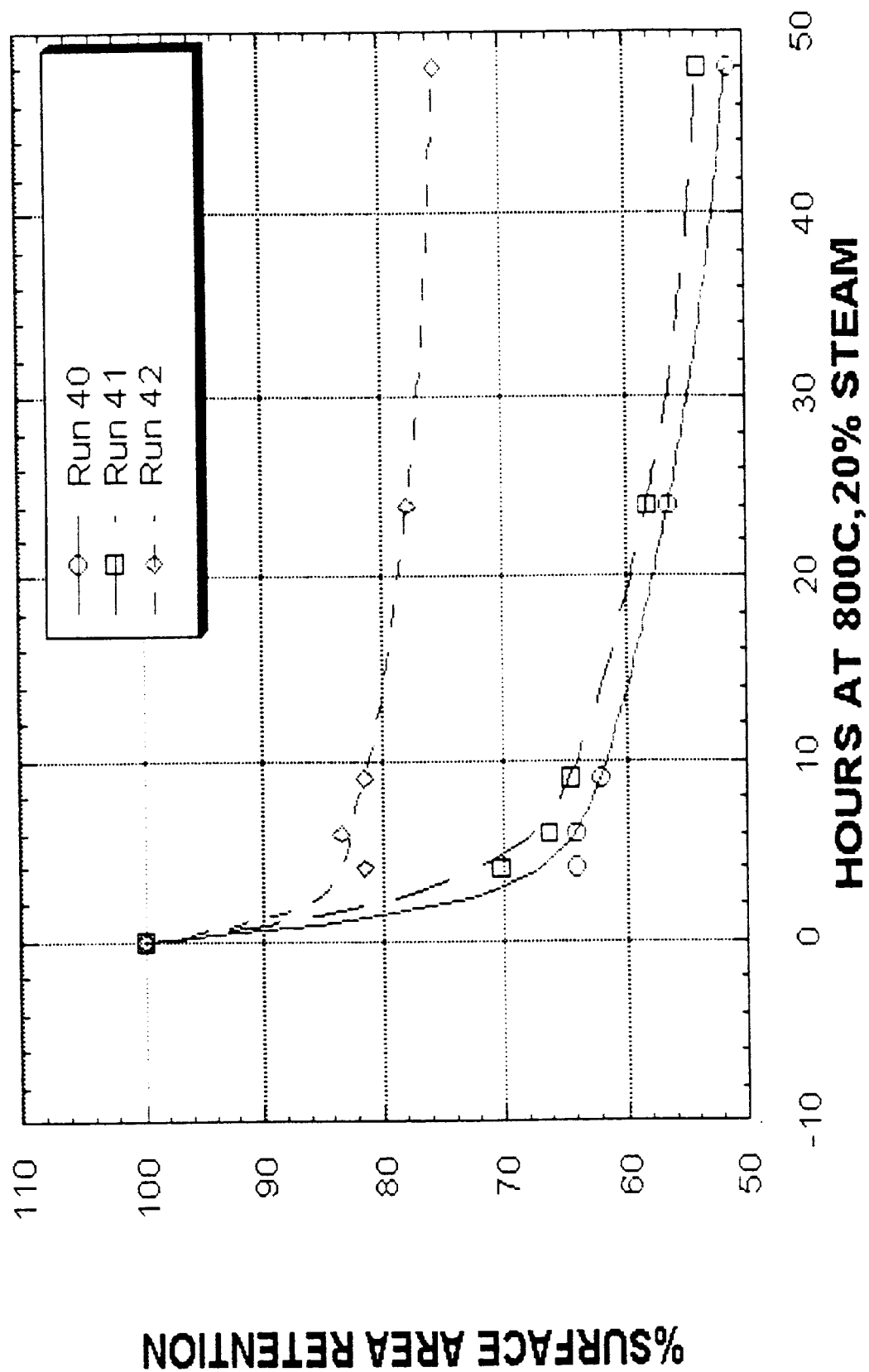

Thus, Example 8, Run 28 was repeated and the combined slurry of Laponite® (at 3 wt. %) and calcined alumina was milled prior to rehydration and designated Run 42. After reflux for 24 hours at 100° C. (212° F.) the boehmite was filtered and oven dried at 140° C. for 6 hours. Portions were calcined at 800° C. in an approximate 20% steam atmosphere for varying times and then the surface areas measured. The above procedure was repeated except that the milling step was omitted and the product designated Run 41. A control containing no Laponite® and no milling step was also made and designated Run 40 and subjected to the same steam treatment and surface area determinations. The results are summarized at FIG. 12. FIG. 13 expresses the data points of each Run of FIG. 12 as a percent of the surface area obtained on a fresh sample, heated for 2 hours at 537.8° C. (1000° F.) (i.e., 0 hours heated in steam). This percentage is referred to as a % surface area retention. As can be seen therefrom, the surface area stability increases in the order 0% Laponite® (Run 40) <3% Laponite® (Run 41) <3% Laponite® and milling (Run 42).

EXAMPLE 13

This example illustrates the effect of post-synthesis addition of Na silicate to boehmite derived from rehydrated calcined alumina.

A sample of calcined alumina available from ALCOA under the tradename CP-3 (Run 43) and a sample of calcined alumina available from Porcel under the tradename AP-15 (Run 44) were each separately slurried in water, containing 0.5 wt. % (alumina basis) sodium gluconate, at a solids content of 17 wt. % and hot aged for 24 hours under reflux. Both batches were then divided up and varying amounts of sodium silicate added, aged for about 30 minutes at 21° C. the pH adjusted to 9.0 with 4% $H_2SO_4$, filtered, reslurried with ammonium sulfate to remove $Na_2O$, filtered, water washed and dried. Each sample was steamed for 4 hours at 800° C. in an atmosphere of about 20 V % steam and the surface area measured.

Figure 14:
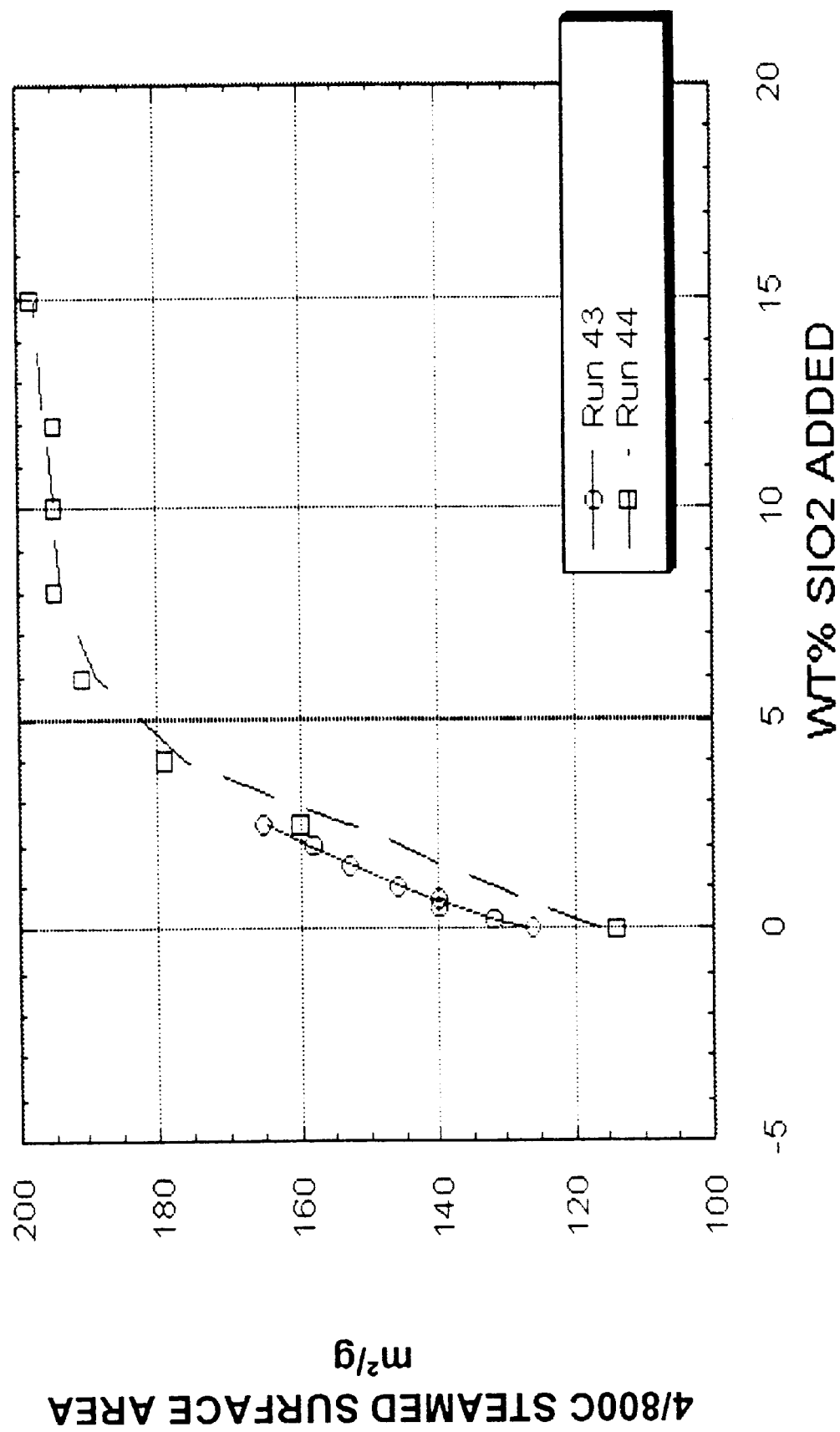

The results on the products of each run are summarized at FIG. 14. As can be seen therefrom the silicate significantly enhances the hydrothermal stability of the boehmite samples.

EXAMPLE 14

This example illustrates the effect of adding silicate to the composite of the present invention after formation thereof.

Figure 15:
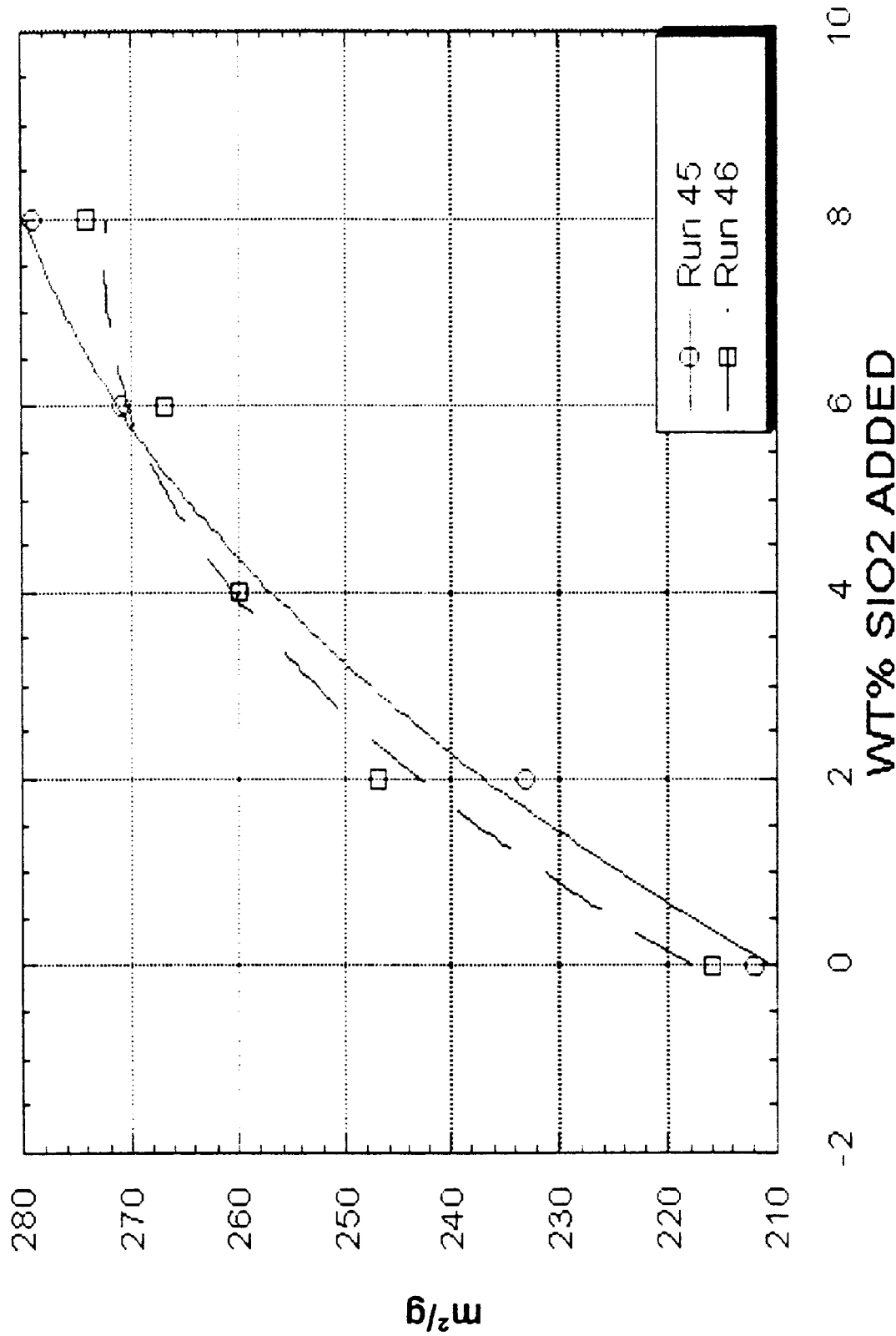
Figure 16:
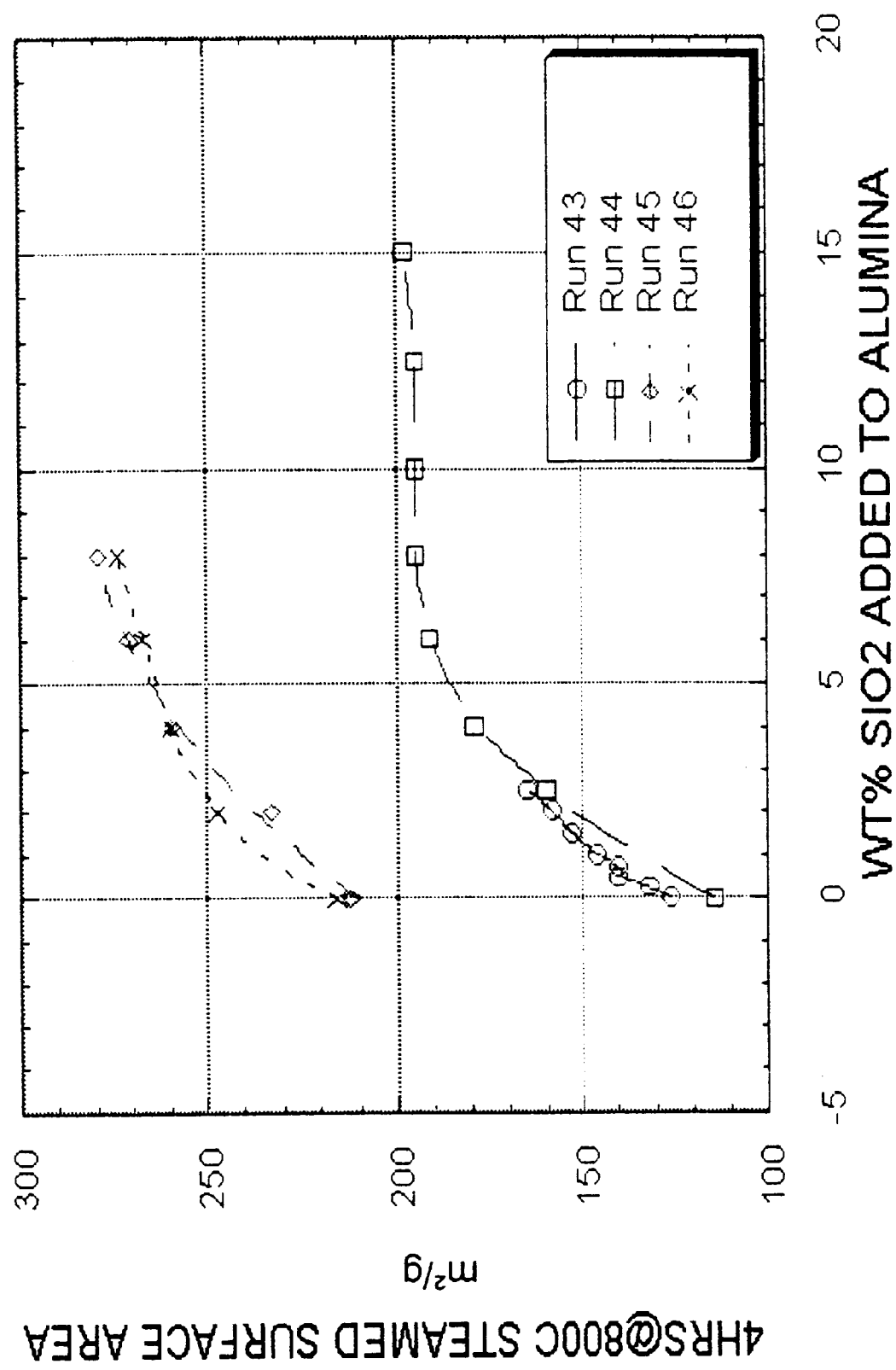

Two batches of boehmite were prepared using 3 wt. % (Run 45) and 5 wt. % (Run 46) Laponite® RD (Laporte) as the source of dispersible clay. Slurries of the Laponite® were prepared by adding the clay to water with rapid agitation and mixing for 20 minutes. Sodium gluconate was added at 0.5 wt. % (alumina basis) followed by addition of CP-3, a calcined alumina from ALCOA. Each slurry was boiled under reflux for 24 hours with agitation, filtered and oven dried overnight at 137.8° C. (280° F.). Portions of each product were reslurried in water, sodium silicate added and the mixture aged 30 minutes at 21° C. The pH was adjusted to 9.0 with 4% $H_2SO_4$, filtered, exchanged as a slurry with ammonium sulfate to remove $Na_2O$, filtered water washed and oven dried at 137.8° C. (280° F.). Each sample was then subjected to contact with 20 wt. % steam atmosphere for 4 hours at 800° C., and the surface area determined. A plot of wt. % $SiO_2$ versus steamed surface area is provided at FIG. 15. As can be seen therefrom, very high surface areas were obtained. Moreover, a comparison of these steamed surface areas with the clay free samples from Example 13 (FIG. 14), is provided at FIG. 16. As can be seen therefrom, improved surface areas were obtained by combining the addition of the dispersible clay with post-synthesis addition of silicate. It is believed that part of the reasons for the higher steamed surface area of the aluminas with dispersible clay is the higher fresh surface area, higher pore volume and higher average pore diameter.

EXAMPLE 15

This example illustrates the effect of post-synthesis silicate addition to an alumina prepared with a poorly dispersed synthetic hectorite prepared at only 100° C. (212° F.) (the lower prep temperature inducing a much lower degree of dispersability).

A batch of synthetic hectorite was prepared by adding 97.9 gm silicic acid ($H_4SiO_4$) to 1169 gm $H_2O$ in a 3L resin kettle under agitation. To the kettle was added under agitation, 58.3 gm Mg (OH), 2.55 gm LiCl, and 4.7 gm NaCl. The slurry was refluxed for 24 hours, filtered, washed three times with water at 65.6° C. (150° F.) and dried at 137.8° C. (280° F.). An X-ray diffraction pattern very similar to that of Laponite® RD was obtained. Enough of this dried material was blended in 800 ml $H_2O$ for 2 minutes to give 3% of the final alumina weight, and to disperse it as much as possible. In contrast to Laponite® RD, an opaque slurry was obtained, indicative of a low degree of dispersion. This slurry was added to a 3L resin kettle along with 0.5 wt. % sodium gluconate (alumina basis), and additional $H_2O$ to give a 17% solids slurry. CP-3 (calcined alumina from ALCOA) was then added. This slurry was boiled under reflux for 24 hours, filtered and dried at 137.8° C. (280° F.). Portions were reslurried in water, and varying amounts of silicate added as reported at FIG. 17, Run 49. Each sample was steamed for 4 hours, 800° C., in approximately 20% steam and the surface areas determined.

The above procedure was repeated except that highly dispersed Laponite® RD replaced the synthetic hectorite made and used for Run 49. Each sample of the resulting product was tested for surface area and the results designated Run 48. These results are plotted in FIG. 17.

A control was also made following the procedures of Run 49, except no clay was employed. The surface areas were plotted in FIG. 17 and designated Run 47.

Figure 17:
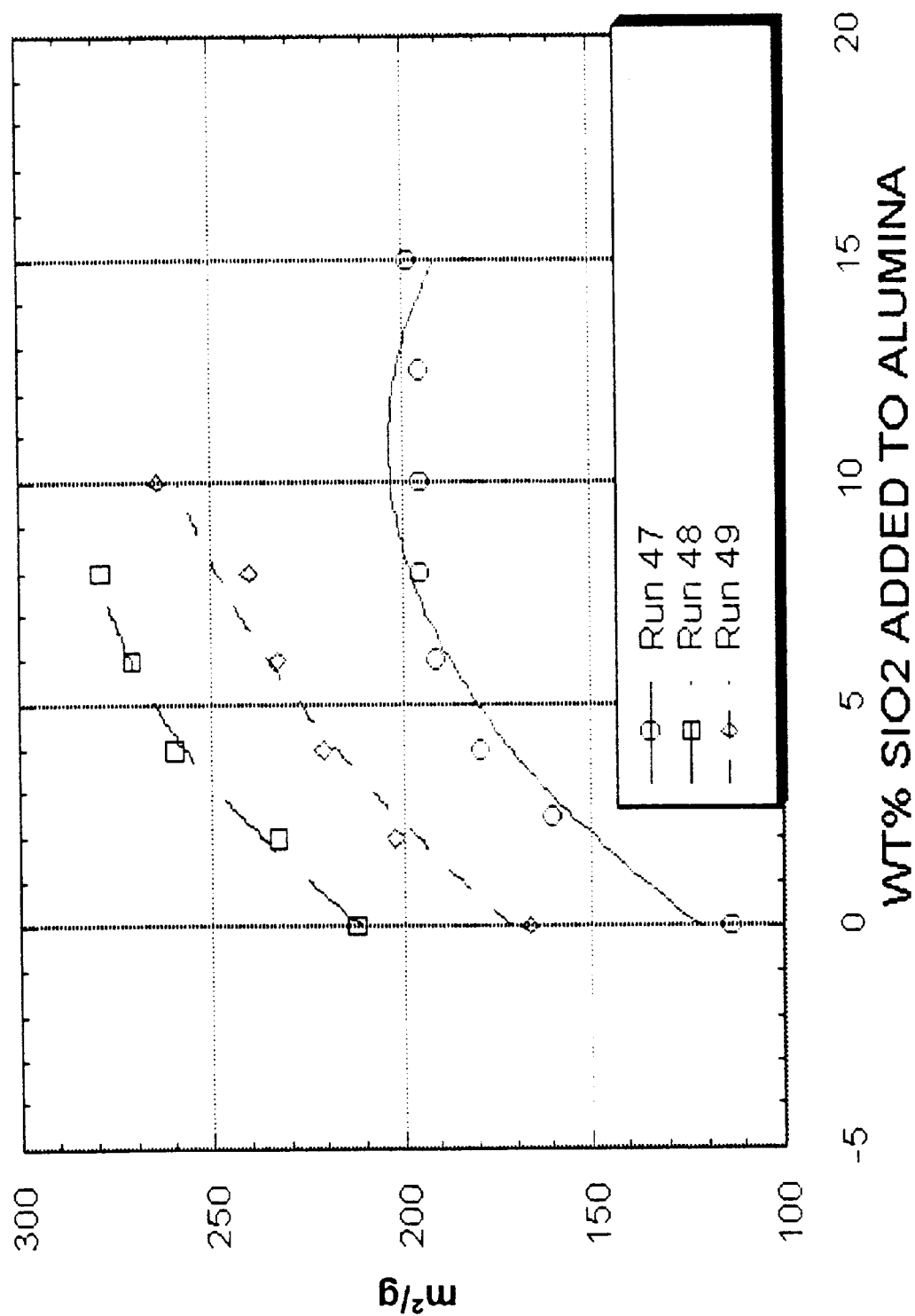

As can be seen from FIG. 17, the surface area stability increases in the order of no clay+silica <poorly dispersed clay+silica <well dispersed clay+silica.

EXAMPLE 16

This example illustrates the effect of premilling the slurry containing calcined alumina and dispersible clay before rehydration and with post synthesis addition of sodium silicate.

A slurry was prepared by dispersing 51.9 gm Laponite® RD (TV=13.26%) in 8.331 gm $H_2O$ with rapid agitation for 20 minutes, followed by addition of 1,616.7 gm of CP-3 (a calcined alumina from ALCOA, TV=10%). The resulting slurry was milled in a 4L DRAIS mill at a rate of about 1L/minute with a glass media loading of about 60%. The slurry was hot aged for 24 hours at boiling under reflux, filtered and oven dried. Samples of this boehmite alumina were reslurried in water, with varying amounts of sodium silicate as reported at Table 10, aged ¼ hour at 21° C., pH adjusted to 9.0 with 4% $H_2SO_4$, filtered and designated Run 52. The above procedure was repeated except that the milling step was omitted and resulting samples designated Run 51. A control was also prepared except that the milling step and the silica and clay addition was omitted. The control was designated Run 50. Each of the samples of Runs 50 to 52 was reslurried in water containing ammonium sulfate for ¼ hour, filtered, water washed and oven dried. This exchange was made to reduce $Na_2O$ to a low (<0.25 wt. %) level. Samples were then calcined for 4 hours at 800° C. in a 20 V % steam atmosphere. The effects of the silicate level as well as milling/not-milling and the presence of the dispersible hectorite on the steamed surface area is summarized at Table 10. Milling gives the highest surface area with or without added silicate.

TABLE 10

| RUN NO. | 50 | 51 | 52 |
|---|---|---|---|
| | ALUMINA FROM CP-3 (No-Clay) (No-Milling) SA ($m^2/gm$) | ALUMINA FROM CP-3 W.O MILLING (3% Clay) SA ($m^2/gm$) | ALUMINA WITH MILLING BEFORE AGE (3% Clay) SA ($m^2/gm$) |
| 4 hrs @ 800° C. SA | 115–119 | 195–210 | 281 |
| With 4% $SiO_2$ | 179 | 250 | 302 |
| With 8% $SiO_2$ | 195 | 279 | 311 |
| 2 hrs @ 537.8° C. (1000° F.) | | | |
| BET SA | 199 | 279 | 345 |
| Ave. P.D. | 153 | 197 | 169 |
| Total Pore Volume | 0.761 | 1.378 | 1.461 |
| % SA Retention (On $SiO_2$ SA Basis) | | | |
| 0% $SiO_2$ | 58.8 | 72.4 | 8 |
| 4% $SiO_2$ | 89.9 | 89.6 | 87.5 |
| 8% $SiO_2$ | 98 | 100 | 90.1 |

EXAMPLE 17

This example illustrates the effect of adding sodium silicate before or after rehydration (hot aging) of the calcined alumina slurry.

Figure 8:
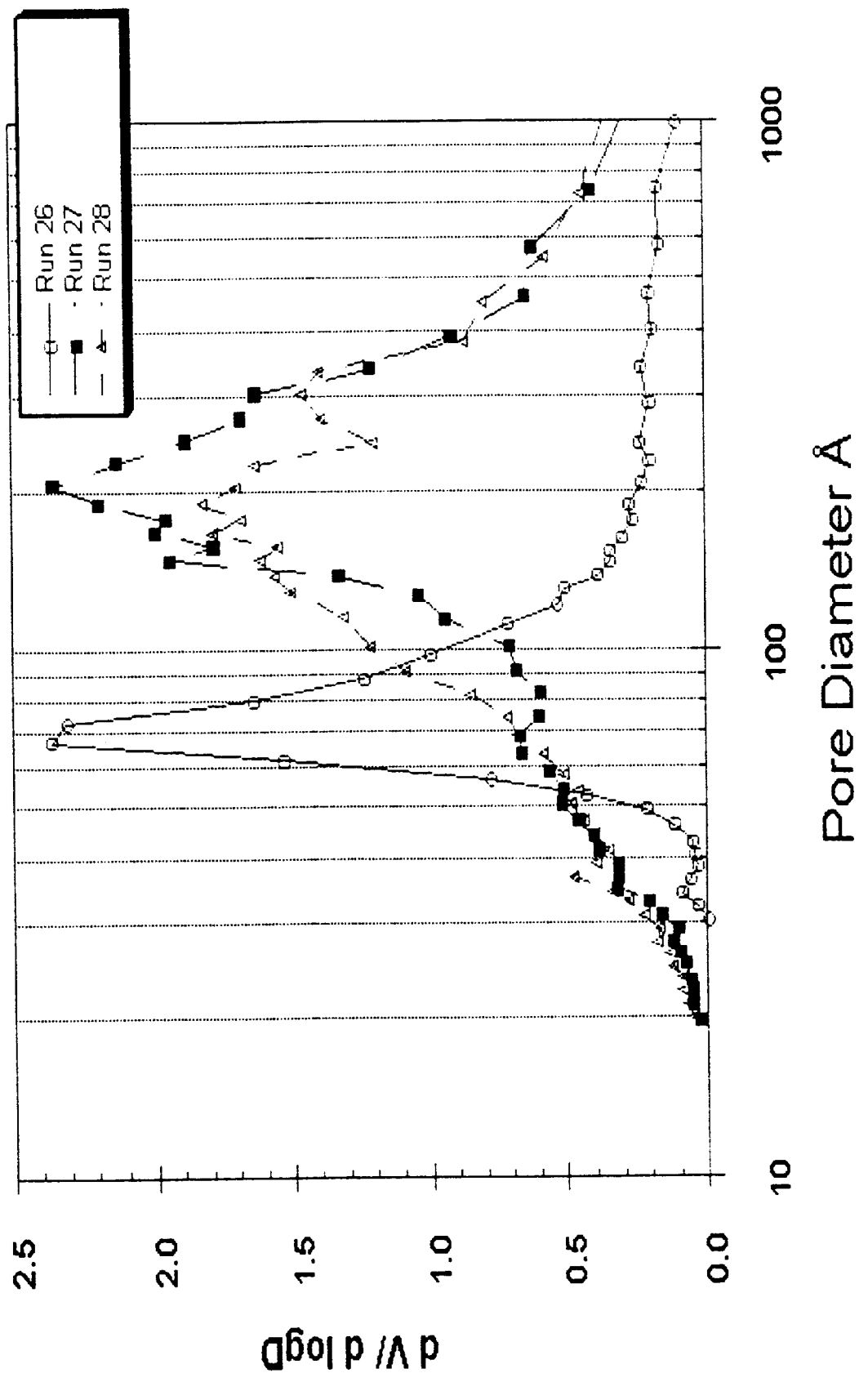
Figure 18:
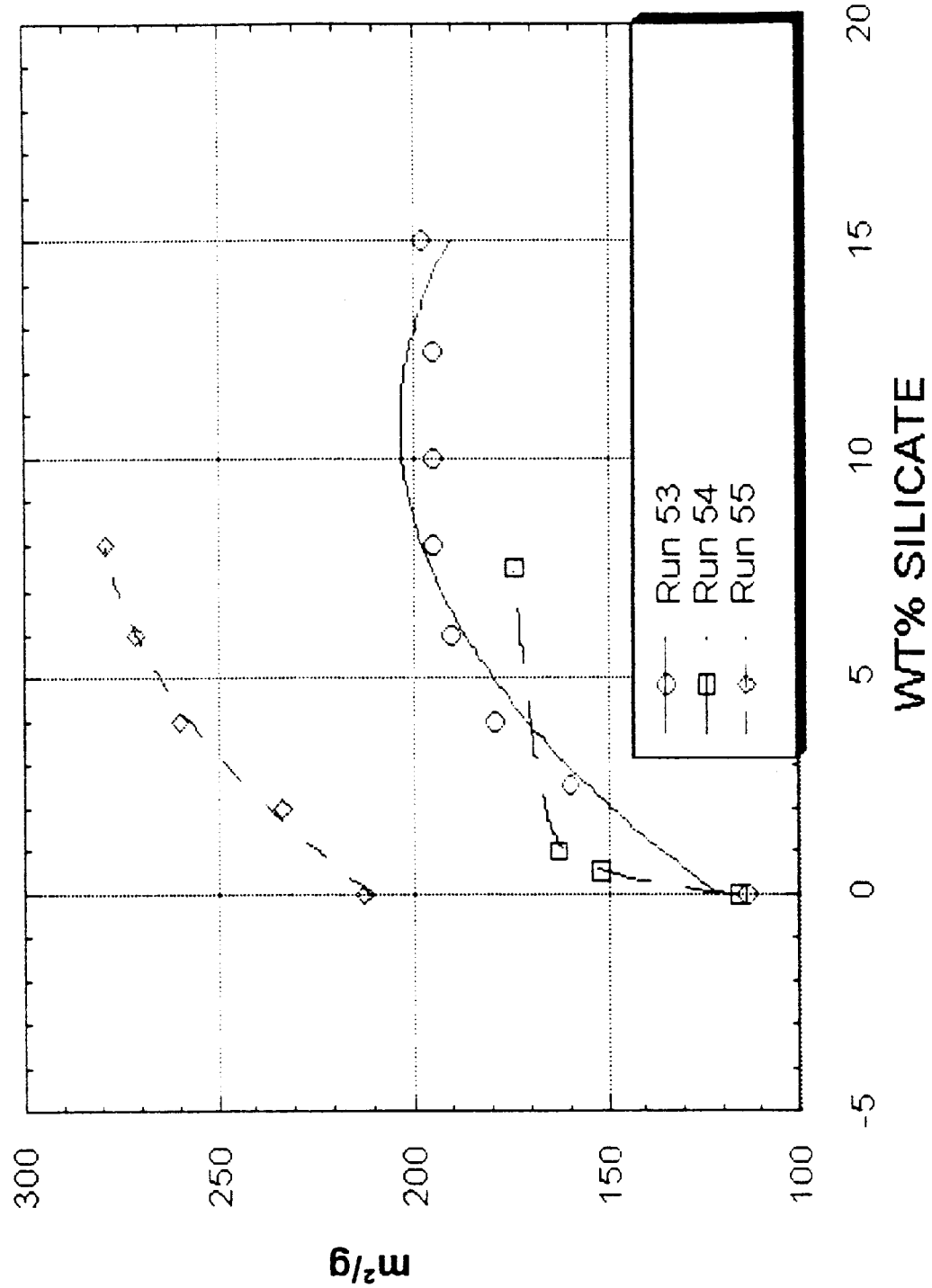

Slurries were prepared of the calcined alumina (CP-3, ALCOA) with varying silicate levels and then hot aged for 24 hours at boiling and under reflux. The resulting samples are grouped as Run 54. Slurries were also prepared using calcined alumina only (designated Run 53), or calcined alumina to which 3% of a dispersible Hectorite (Laponite® RD) was added before the hot aging (designated Run 55). The latter two preparations were treated with varying amounts of silicate after the hot age, which amounts are shown at FIG. 8. All samples were exchanged with ammonium sulfate to reduce $Na_2O$ to a low level (<0.25 wt. %) before steaming at 800° C. for 4 hours in an atmosphere of about 20% steam. The surface areas of the resulting products for Runs 53 to 55 are reported at FIG. 18. The surface area results indicate the addition of silicate improves the hydrothermal stability of all the samples. However, the surface areas follow generally in the order $Al_2O_3$+3% Laponite®>silicate addition after age >silicate addition before age. Addition of silicate before the hot age also reduces the pore volume/pore diameter of the Boehmite.

EXAMPLE 18

This example illustrates the effect of adding silicate after rehydration on the steamed pore structure of a boehmite alumina/Laponite® composite.

Figure 19:
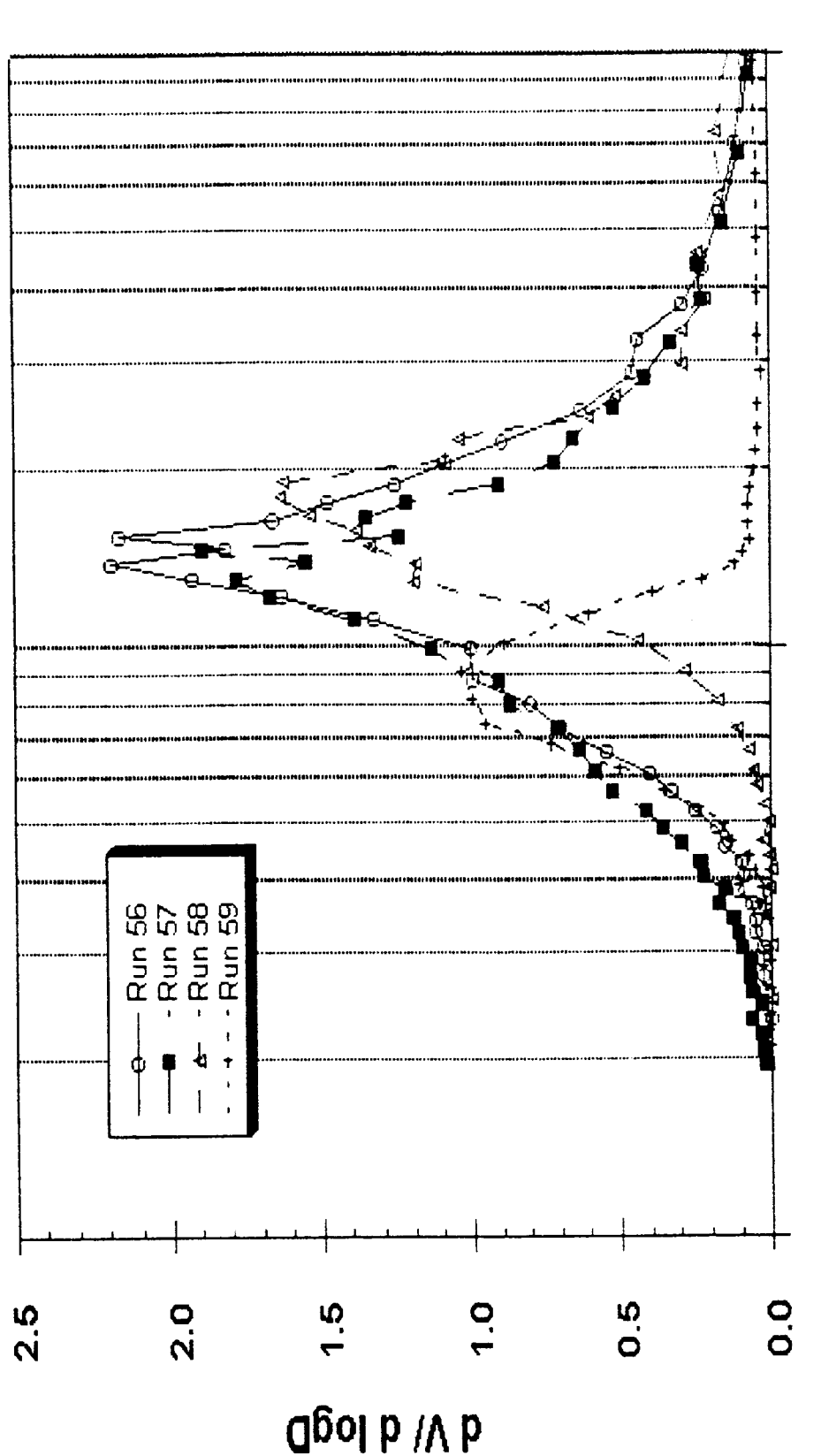

Samples of a 3% Laponite® containing boehrnite with varying silicate levels of 0 wt. % (Run 56), 2 wt. % (Run 57), 4 wt. % (Run 58) and 8 wt. % (Run 59), were prepared as described in Example 14. After 4 hours at 800° C. treatment in 20% steam, the nitrogen pore size distributions were measured. The results are reported at FIG. 19. FIG. 19 shows only minor changes in pore distribution between 0, 2, 4% added silicate, however, at 8% silicate, the pores do shift to a lower average pore diameter.

EXAMPLE 19

This example illustrates the preparation of the alumina/ swellable clay composite which is used in the following example to make agglomerates therefrom. 7,014 g OB (Original Basis not corrected for TV) (3% by weight, based on the combined weight of alumina and clay) of a synthetic hectorite Laponite® was slurried in 350 gallons of city water at ambient temperature. The slurry was mixed in an open tank with a 4 paddle agitator for 30 minutes at maximum agitation (about 300 rpm) to assure a good dispersion. Then, 234 kg (515 pounds) OB of Alcoa CP-3 activated alumina were slowly added to the slurried Laponite®. After all the CP-3 was added, the slurry was heated to 93.3° C. (200° F.) where it was held for 24 hours. The slurry was filtered and washed with 65.6–71.1° C. (150–160° F.) city water on a three-wash-zone Eimco belt filter. The filter cake was spray-dried at 371.1° C. (700° F.) inlet/121.1° C. (250° F.) outlet temperature.

The resulting product is designated Sample No. AX-1.

Figure 20:
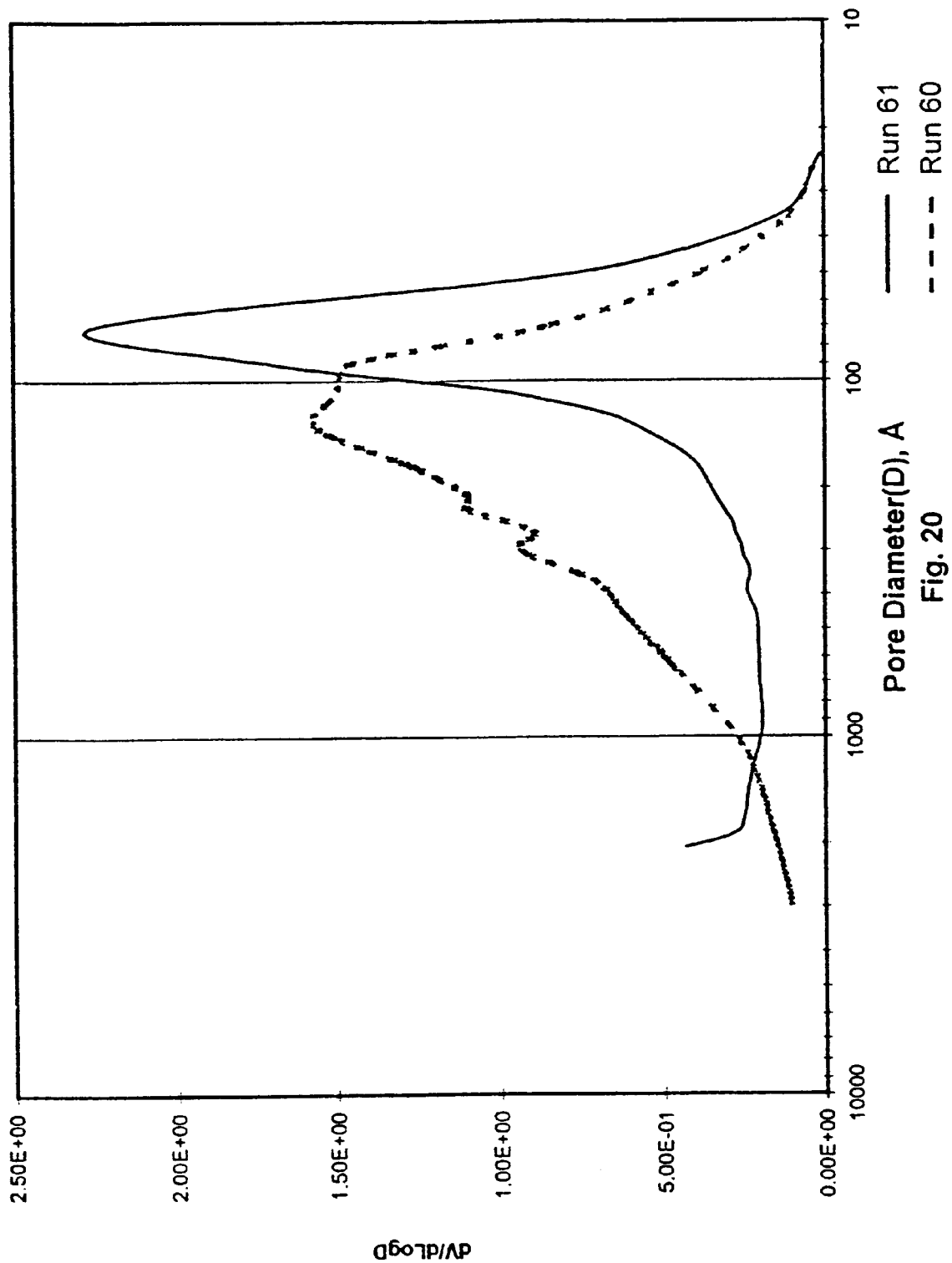

A summary of the properties of AX-1 is provided at Table 11 and a plot of its nitrogen pore size distribution is provided at FIG. 20. The data on AX-1 in FIG. 20 is designated Run 60.

COMPARATIVE EXAMPLE 3

A control sample of boehmite alumina was synthesized as follows.

To 4,950 parts by volume of water heated in a reactor to 63.3° C. (146° F.) under constant agitation was added 150 parts by volume of a 7.0 wt. % solution of aluminum sulfate as $Al_2O_3$ and the resultant mixture stirred for four minutes. Two separate solutions were then simultaneously fed to the reactor. The first solution was 7.0 wt. % aluminum sulfate as $Al_2O_3$ in water and the second solution was 20 wt. % aluminum as $Al_2O_3$ sodium aluminate in water. Upon completion of the addition, the weight ratio of aluminum sulfate:aluminum sodium sulfate in the reactor was 5:3. The flow rates are adjusted during addition to provide a pH of 7.6. When the 7.6 pH target is met, the aluminum sulfate addition is terminated and the sodium aluminate addition is continued until a pH of 9.3 is reached. The sodium aluminate addition is then terminated, and the reactor contents aged for 2 hours at 66° C. (150° F.) The precipitated product is then filtered, washed and spray dried at 371° C. (700° F.) inlet temperature 135° C. (275° F.) outlet temperature to form an aluminum powder which is sized to a particle size of 10–20 microns. The resulting product is designated CAX-1. The properties thereof are summarized at Table 11 and FIG. 20. The data on CAX-1 in FIG. 20 is designated Run 61.

TABLE 11

| RUN NO. | | 60 | 61 |
|---|---|---|---|
| Sample # | | AX-1 | CAX-1 |
| TV @ 1750° F. | wt. % | 22.0 | 29.4 |
| SA | $m^2/g$ | 291 | 292 |
| $N_2$PV (0.967 p/p°) | cc/g | 1.16 | 0.94 |
| DPI | | n/a | 31 |
| APS | $\mu$ | 9.8 | 15.9 |
| $Na_2O$ | wt. % | 0.41 | 0.03 |
| $SO_4$ | wt. % | 0.04 | 0.82 |
| Fe | wt. % | 0.05 | 0.01 |
| Mesopore Pore Mode | Å | 150 | 65.7 |
| % increase in Mesopore Pore Mode | % | 60 | N/A |

As can be seen from Table 11 and FIG. 20, AX-1 (Run 60) and CAX-1 (Run 61) have similar surface areas, but AX-1 has about 20 v% more pore volume than CAX-1 and the mesopore pore mode of AX-1 is about 150 Angstroms compared to 50–70 Angstroms for CAX-1.

EXAMPLE 20

Part A

This example illustrates the preparation of a pre-impregnation of AX-1 prior to extrusion.

13.6 kg (30 lbs.) OB of AX-1 alumina were mixed in an Eirich mixer with 10.5 kg of city water, 6.2 kg of ammonium molybdate solution and 2.0 kg of commercial grade (15% Ni) nickel nitrate solution. The ammonium molybdate solution was prepared by dissolving 2.2 kg of commercial ammonium dimolybdate crystals in 4.0 kg of deionized water. The mix was extruded in a 4" Bonnot pilot plant extruder to form 0.04" diameter extrudates using conventional extrusion conditions. The extrudates were dried at 121.1° C. (250° F.) for 4 hours and calcined at 648.9° C. (1200° F.) for 1 hour. The resulting extrudate is designated EMAX-1 (Run 62).

Part B:

The pore property results of Part A of Example 20 were normalized to a metals free basis and the results designated as Run 63. Samples are normalized herein to a metals free basis in accordance with the following Equation:

$$MFB = \frac{(X)(100)}{(100 - W)} \quad \text{(Equation 6)}$$

Wherein X is this pertinent pore property such as PV (in cc/g), or SA ($m^2/g$)

W=the wt. % of catalytic promoter metal oxides such as Ni, Co. and Mo oxide on the catalyst based on the wt. of porous constituents of the catalyst. The weight of non-porous constituents, e.g., non-porous diluents, of the catalyst extrudate are not included in the wt. % calculation and MFB=Metals Free Basis.

COMPARATIVE EXAMPLE 4

Part A:

Example 20 of Part A was repeated except that the AX-1 sample from Example 19 was replaced with the CAX-1 sample of Comparative Example 3. The resulting extrudate product is designated EMCAX-1 (Run 68).

Part B:

The pore property results of Part A of Comparative Example 4 were normalized to a metals free basis and the results designated Run 69.

Physical and compositional properties of the metal impregnated catalyst samples EMAX-1 and EMCAX-1 are provided at Table 12 and the mercury pore size distribution and other properties of these samples is provided at Tables 13A and B.

Figure 21:
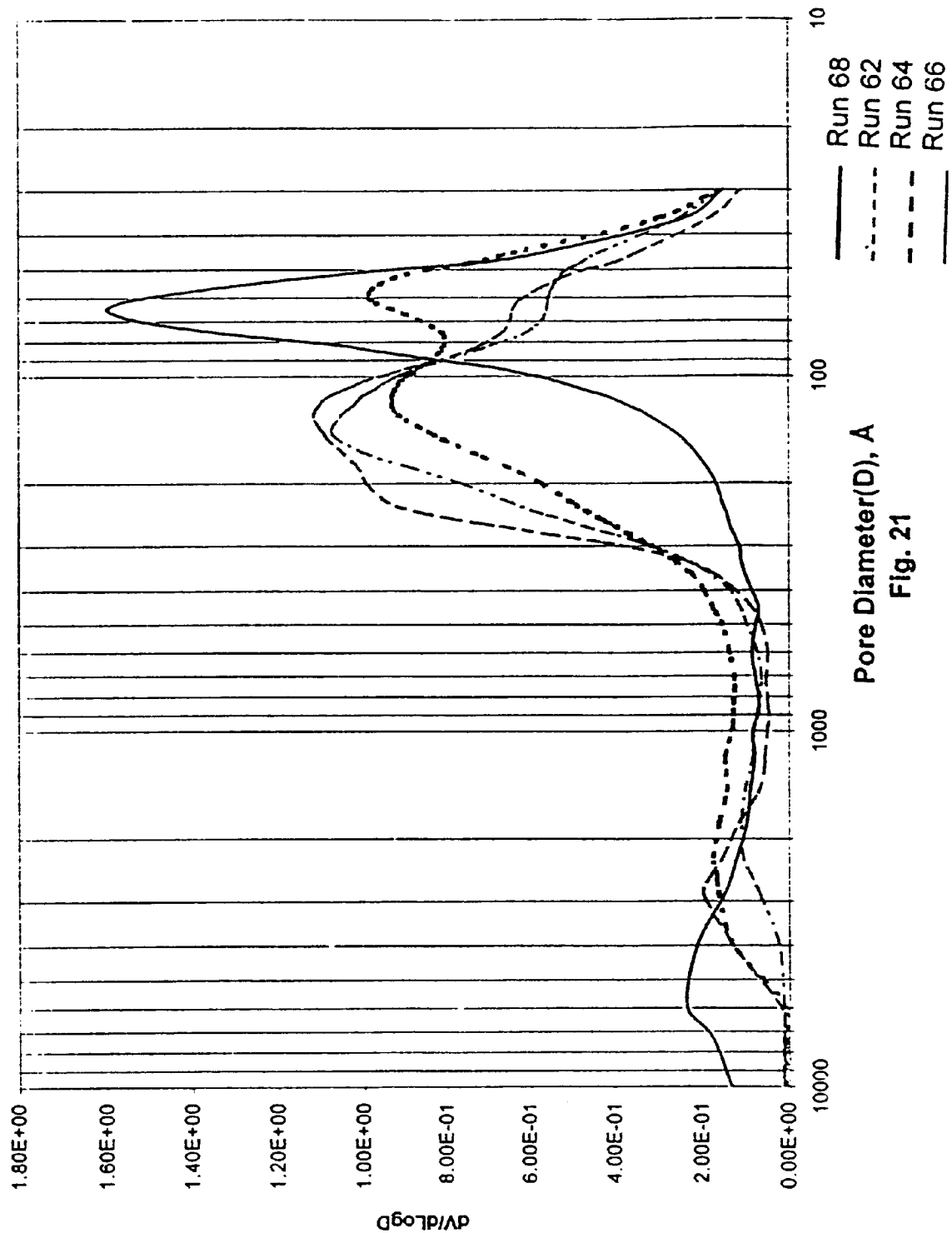

A higher $SiO_2$ is also noted due to the nature of the dispersible clay contained in AX-1. A plot of the mercury pore size distribution of each catalyst is shown in FIG. 21.

Of particular note is that SA and TPV of both Run 62 and Run 68 are similar. but that the pore mode for Run 62 is 145 Å compared to only 65 Å for Run 68. These modes are very close to those of the starting aluminas which is characteristic of the stabilizing effect of pre-impregnated metals on the alumina properties. As can be further seen from Tables 13A and B, pore diameters have shifted from the <100 Å in Run 68 to the 100–250 Å region, and more predominantly to the 130–250 Å region for Run 62. In spite of the shift and increase in pore modes the total surface area and total pore volume of Run 62 are similar to Run 68.

TABLE 12

Metal Pre-Impregnated Extrudates

| Run No. | | 62 | 64 | 66 | 68 |
|---|---|---|---|---|---|
| Sample ID | | EMAX-1 | EMAX-2 | EMAX-3 | EMCAX-1 |
| Alumina Type | | AX-1 | AX-1 | AX-1 + CAX-1 2 parts + 1 part | CAX-1 |
| Catalyst Properties | | | | | |
| $MoO_3$ | wt. % | 14.1 | 14.9 | 14.1 | 13.6 |
| NiO | wt. % | 3.1 | 3.5 | 3.1 | 3.3 |
| $SiO_2$ | wt. % | 0.66 | 0.61 | 0.51 | 0.08 |
| $Na_2O$ | wt. % | 0.2 | 0.18 | 0.17 | 0.06 |
| Fe | wt. % | 0.01 | 0.01 | 0.01 | 0.08 |
| Particle Diameter | mm | 0.98 | 0.99 | 1.00 | 1.00 |
| CBD, MaxPack | lbs/$ft^3$ | 35.4 | 32.1 | 34.5 | ~36 |
| Crush Strength | lb/mm | 2.9 | 2.5 | 2.0 | 1.7 |

CBD = Compacted Bulk Density

EXAMPLE 21

Part A:

The alumina sample AX-1 prepared in accordance with Example 19 was used to make a metal impregnated extrudate in accordance with Example 20, Part A, except that the mix contained 300 g more water in order to increase the amount of porosity in pores greater than 250 Å in diameter. The resulting extrudates are designated EMAX-2 (Run 64).

Part B:

The pore property results of Part A of this Example were normalized to a metals free basis and the results designated Run 65 and reported at Tables 13A and 13B.

TABLE 13A

| | | Total Pore Volume* | | | | | | | | | | | | | |
|---|---|---|---|---|---|---|---|---|---|---|---|---|---|---|---|
| RUN | | <100Å | | >100Å | | >130Å | | >150Å | | >250 | | >500 | | >1200 | |
| NO. | Sample | Ex or Comp Ex No | cc/g | ° " | cc/g | ° " | cc/g | ° " | cc/g | ° " | cc/g | ° " | cc/g | ° " | cc/g | ° " |
| 62 | EMAX -1 | Ex20(a) | 26 | 33 | .53 | 67 | .42 | 53 | .34 | 43 | 17 | 21 | .10 | 13 | .07 | 9 |
| 63 | MFB-EMAX-1 | Ex20(b) | .31 | 32.9 | .64 | 67.1 | .51 | 53.2 | 11 | 43 | .21 | 21.5 | | | .08 | 8.9 |
| 64 | EMAX-2 | Ex21(a) | .26 | 29 | .62 | 70 | .50 | 57 | .43 | 49 | .21 | 24 | .13 | 15 | .11 | 12 |
| 65 | MFB-EMAX-2 | Ex21(b) | .32 | 29.5 | .76 | 70.5 | 61 | 56.8 | .53 | 48.9 | .26 | 23.9 | | | .13 | 12.5 |
| 66 | EMAX-3 | Ex22(a) | .36 | 40 | 54 | 60 | 44 | 49 | .38 | 42 | 25 | 28 | .17 | 19 | 12 | 13 |
| 67 | MFB-EMAX-3 | Ex22(b) | 4.3 | 40 | 65 | 60 | .53 | 48.9 | .46 | 42.2 | .30 | 27.8 | | | .14 | 13.3 |
| 68 | EMCAX-1 | CEx4(a) | 44 | 51 | .38 | 44 | .33 | 38 | .31 | 36 | .27 | 31 | .24 | 28 | .21 | 24 |
| 69 | MFB-EMCAX-1 | CEx4(b) | 53 | 53.7 | .46 | 46.3 | .40 | 40.2 | 37 | 37.8 | .32 | 32.9 | | | .25 | 25.6 |

TABLE 13A-continued

| | | | | | | | | | | | | | | | | |
|---|---|---|---|---|---|---|---|---|---|---|---|---|---|---|---|---|
| 70 | EAX-4 | Ex23 | 22 | 27.2 | .59 | 72.8 | .44 | 53.9 | 24 | 29.6 | .04 | 4.9 | .02 | 2.5 | 0 | 0 |
| 71 | EAX-5 | Ex24(a) | .24 | 27.6 | .63 | 72.4 | .48 | 55.2 | .32 | 36.8 | .06 | 6.9 | .03 | 3.4 | .02 | 2.3 |
| 72 | ECAX-2 | CEx5 | 32 | 33.7 | 6.3 | 66.3 | .38 | 40.0 | .28 | 29.5 | .20 | 21.1 | .17 | 17.9 | .14 | 14.7 |
| 73 | EMAX-5 | Ex24(b) | .11 | 15.1 | 62 | 84.9 | .52 | 71.2 | 43 | 58.9 | 0.5 | 6.8 | .03 | 4.1 | .02 | 2.7 |
| 74 | EMAX-6 | Ex25 | .16 | 17.6 | .75 | 82.4 | .59 | 64.8 | 50 | 54.9 | .26 | 28.6 | .16 | 17.6 | .10 | 11.0 |
| 75 | EMCAX-2 | CEx6 | 18 | 22.5 | .62 | 77.5 | 0.42 | 52 | .31 | 38.8 | .18 | 22.5 | .15 | 18.8 | .12 | 15.0 |

| | | | Total Pore Volume* | | | | | | |
|---|---|---|---|---|---|---|---|---|---|
| RUN | | Ex or Comp | >1500 | | >4000 | 100–130Å | | 130–250Å | |
| NO. | Sample | Ex No | cc/b | ° " | cc/g | cc/g | ° " | cc/g | ° " |
| 62 | EMAX -1 | Ex20(a) | .06 | 7.6 | 0.3 | .13 | 13.9 | .31 | 31.6 |
| 63 | MFB-EMAX-1 | Ex20(b) | .07 | 7.6 | | | | | |
| 64 | EMAX-2 | Ex21(a) | .11 | 12 | .04 | .15 | 13.6 | .36 | 33 |
| 65 | MFB-EMAX-2 | Ex21(b) | .13 | 12.5 | | | | | |
| 66 | EMAX-3 | Ex22(a) | .11 | 12 | .04 | .12 | 11.1 | .23 | 21.1 |
| 67 | MFB-EMAX-3 | Ex22(b) | .13 | 12.2 | | | | | |
| 68 | EMCAX-1 | CEx4(a) | .20 | 23 | .15 | | | | |
| 69 | MFB-EMCAX-1 | CEx4(b) | 24 | 24.4 | | | | | |
| 70 | EAX-4 | Ex23 | 0 | 0 | 0 | .15 | 18.9 | .40 | 49 |
| 71 | EAX-5 | Ex24(a) | .01 | 1.1 | .01 | .15 | 17.2 | .42 | 48.3 |
| 72 | ECAX-2 | CEx5 | 1.3 | 13.7 | .06 | 25 | 26.3 | .18 | 18.9 |
| 73 | EMAX-5 | Ex24(b) | .02 | 2.7 | .01 | .10 | 13.7 | .47 | 64.4 |
| 74 | EMAX-6 | Ex25 | .09 | 9.9 | .02 | .16 | 17.6 | .33 | 36.3 |
| 75 | EMCAX-2 | CEx6 | .12 | 15.0 | .04 | 0.20 | 25.5 | 0.24 | 29.5 |

*by Hg Porosimetry with Contact Angle = 140°

TABLE 13B

| Run No. | Sample | Ex or Comp Ex No | Pore Mode A (dV/dlogD) | SA m²/g (Hg) | TPV cc/g (Hg) |
|---|---|---|---|---|---|
| 62 | EMAX-1 | Ex20(a) | 148 | 288 | 0.86 |
| 63 | MFB-EMAX-1 | Ex20(b) | 148 | 348 | .95 |
| 64 | EMAX-2 | Ex21(a) | 135 | 290 | .88 |
| 65 | MFB-EMAX-2 | Ex21(b) | 135 | 355 | 1.08 |
| 66 | EMAX-3 | Ex22(a) | 119/63 | 312 | .90 |
| 67 | MFB-EMAX-3 | Ex22(b) | 119/63 | 377 | 1.09 |
| 68 | EMCAX-1 | CEx4(a) | 67 | 297 | 0.82 |
| 69 | MFB-EMCAX-1 | CEx4(b) | 67 | 357 | .99 |
| 70 | EAX-4 | Ex23 | 148 | 212 | .81 |
| 71 | EAX-5 | Ex24(a) | 158 | 222 | .87 |
| 72 | ECAX-2 | CEx5 | 99 | 201 | .95 |
| 73 | EMAX-5 | Ex24(b) | 191 | 160 | .73 |
| 74 | EMAX-6 | Ex25 | 115 | 180 | .91 |
| 75 | EMCAX-2 | CEx6 | 115 | 192 | .80 |

MFB = Metals Free Basis

EXAMPLE 22

Part A

The catalyst was prepared in the same way as EMAX-1 (Run 62) except that the alumina source was a physical powder blend of 9.09 kg (20 pounds) original batch (OB) of AX-1 (Run 60) and 4.5 kg (10 pounds) OB of CAX-1 (Run 61). The CAX-1 alumina was added to increase macroporosity (pores >250 Å) in the catalyst. The resulting product is designated EMAX-3 (Run 66) and the properties thereof are summarized at Tables 12 and 13A and B, and FIG. 21. As can be seen therefrom, the addition of CAX-1 adds pores in <100 Angstrom region and the <250 region becomes bimodal.

Part B

The pore properties of the sample of Part A were normalized to a metals free basis and the results designated Run 67 and reported at Tables 13A and B.

EXAMPLE 23

This example describes a procedure of making the alumina base (only) of a catalyst that could be eventually finished into catalyst via a "post-impregnation" process. The base for post-impregnated catalysts is prepared by extruding/calcining the alumina in the absence of promoter metals (Ni and Mo in this case).

30 pounds OB of AX-1 alumina were mixed with 31 pounds of city water in a pilot scale Eirich mixer. The mix was extruded using a 4" Bonnot extruder to form 0.04" diameter extrudates. The extrudates were dried at 121.1° C. (250° F.) for 4 hours and then calcined at 732.2° C. (1,350° F.) for 1 hour.

The resulting product is designated EAX-4 (Run 70) and the mercury pore properties shown at Tables 13A and B.

COMPARATIVE EXAMPLE 5

Example 22 was repeated except that the starting alumina was CAX-1. The resulting product is designated ECAX-2 (Run 72). The mercury pore properties are shown at Tables 13A and B.

Comparing Runs 70 with 72, it can be seen that Run 70 has almost 70% of the TPV in the 100–250 Angstrom range, and the majority (49%) in the 130–250 Angstrom range. It will be further noted that Run 72 shifts the pore mode of the starting CAX-1 alumina (Run 61) from 65 Angstroms to 100 Angstroms in the extrudate. The same is not true of Run 70 (FIG. 22) versus AX-1 of Run 60 (FIG. 20) which both exhibit a pore mode at about 145 Angstroms. Moreover, Run 70 exhibits about the same pore mode as Runs 62 and 64 (FIG. 21). Thus, it appears the AX-1 alumina of the present invention has the same pore mode whether pre- or post-impregnated. It will be further noted that Run 70 has essentially no porosity >250 Angstroms unlike its pre-impregnated analog of Run 62.

EXAMPLE 24

Part A

Example 23 was repeated except that 14.5 kg (32 pounds) of water (1 pound more than in Example 23) was employed in the mixture to increase total porosity in the pores >250 Angstroms. The resulting extrudate is designated EAX-5 (Run 71).

Figure 22:
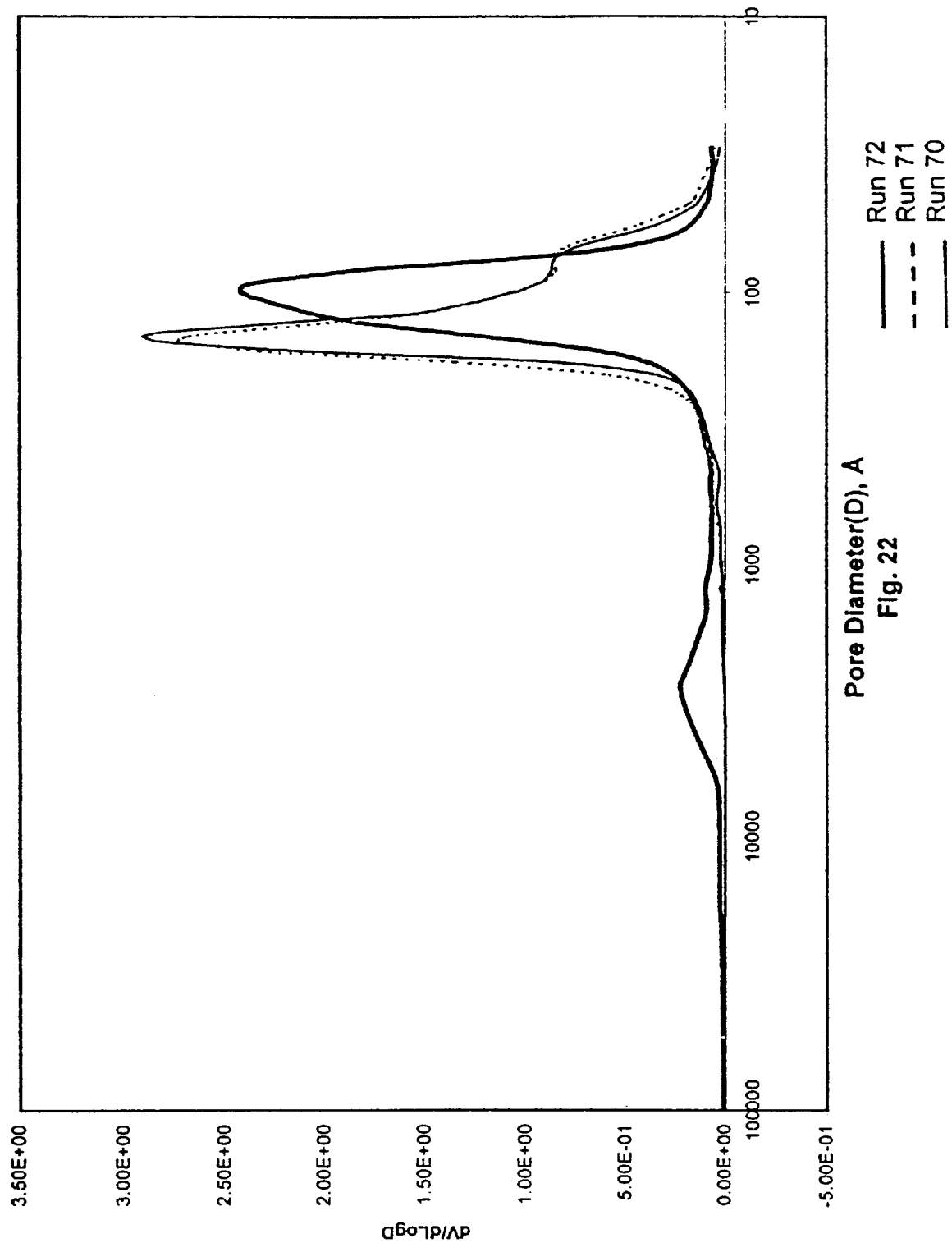

The compositional properties, particle diameter, and crush strength of Runs 70 to 72 are summarized at Table 14, and the mercury pore distribution of the samples of Runs 70–72 are summarized at Tables 13A and B. The mercury pore distribution of Runs 70–72 is also shown at FIG. 22.

Part B

The EAX-5 (Run 71) metal free extrudate sample of Part A was post-impregnated as follows:

313 g of ammonium molybdate solution adjusted to 5.2–5.4 pH was mixed with 120 g of nickel nitrate. Water was added to make a total of 440 cc of solution. The entire solution was transferred onto 550 g of EAX-5 base. Impregnation was done by incipient wetness technique in a plastic bag. The impregnated material was dried overnight at 121.1° C. (250° F.) and calcined at 537.8° C. (1,000° F.) for one hour. The resulting catalyst is designated EMAX-5 (Run 73) the mercury pore properties of which are shown at Tables 13A and B.

COMPARATIVE EXAMPLE 6

Example 24. Part B, was repeated except that the EAX-5 sample was replaced with the extrudate control sample.ECAX-2 of Run 72. The resulting metals impregnated extrudate sample is designated EMCAX-2 (Run 75) the mercury pore properties of which are shown at Tables 13A and B.

EXAMPLE 25

Example 22 was repeated except that the blend was composed of equal amounts of AX-1 and CAX-1 6.8 kg (15 pounds) each. The blend was mixed with 31 pounds of water in an Eirich mixer, impregnated with nickel and molybdenum using a metals solution prepared in accordance with Example 24. Part B, except the total solution volume was 550 cc due to a higher pore volume of the present sample.

The resulting metal impregnated extrudate is designated EMAX-6 (Run 74), the mercury pore properties of which are shown at Tables 13A and B.

The compositional properties, particle diameter, bulk density, and crush strength for Runs 73 to 75 are summarized at Table 15.

TABLE 14

Examples of Metals-Free Base

| Run No. | | 70 | 71 | 72 |
|---|---|---|---|---|
| Sample ID | | EAX-4 | EAX-5 | ECAX-2 |
| Alumina Type | | AX-1 | AX-1 | CAX-1 |
| Catalyst Properties | | | | |
| MoO$_3$ | wt. % | | Metals-Free | |
| NiO | wt. % | | Metals-Free | |
| SiO$_2$ | wt. % | 0.2 | 0.2 | 1.01 |
| Na$_2$O | wt. % | 0.42 | 0.41 | 0.03 |
| Fe | wt. % | 0.05 | 0.05 | 0.01 |
| Particle Diameter | mm | 0.99 | 0.97 | 1.02 |
| Crush Strength | lb/mm | 1.96 | 1.55 | 1.74 |

TABLE 15

Post-Impregnation Examples

| Run No. | | 73 | 74 | 75 |
|---|---|---|---|---|
| Sample ID | | EMAX-5 | EMAX-6 | EMCAX-2 |
| Alumina Type | | AX-1 | AX-1 + CAX-1 Equal Parts | CAX-1 |
| Catalyst Properties | | | | |
| MoO$_3$ | wt. % | 13.5 | 13.3 | 13.3 |

TABLE 15-continued

Post-Impregnation Examples

| Run No. | | 73 | 74 | 75 |
|---|---|---|---|---|
| NiO | wt. % | 3.5 | 3.4 | 3.5 |
| SiO$_2$ | wt. % | 0.65 | 0.24 | |
| Na$_2$O | wt. % | 0.17 | 0.11 | |
| Fe | wt. % | 0.0 | 0.01 | |
| Particle Diameter | mm | 0.99 | 0.99 | |
| CBD, MaxPack | lb/cf | 39.6 | 33.7 | 36.8 |
| Crush Strength | lb/mm | 1.64 | 1.84 | |

EXAMPLE 26

Vacuum tower bottoms (VTB) derived from arab medium crude oil having the properties summarized at Table 16 was selected as the feed to a fixed bed resid hydrotreating pilot plant unit. The operating conditions of the pilot plant are summarized at Table 17.

The catalyst from Run 62 (EMAX-1) was placed in the pilot unit and tested as described below. The pilot unit has four independent reactors located in a common sandbath. The sandbath maintains the four reactors at approximately the same temperature. Each reactor is loaded with 75 cc of the catalyst to be tested. Inert glass beads are loaded above and below the catalyst bed to preheat the reactants to the desired conditions and to take up any additional space. Hydrogen and resid feedstock enter the bottom of the reactor and flow together up through the catalyst bed and out the top of the reactor. The products go into a gas liquid separation vessel which is located downstream of the reactor. The gas products pass out of the system through a pressure control valve which is used to control the reactor pressure. The liquid products pass from the separation vessel through a level control valve to the liquid product vessel which accumulates the product until it is removed from the system. The hydrogen flowrate to the reactor is controlled with a mass flow controller. The resid feedrate to the reactor is controlled with a feed pump. The temperature of the reactors are controlled by changing the temperature of the sandbath.

The catalyst was tested at reference conditions: LHSV of 1.0 (75 cc/hr feed and 75 cc of catalyst bed volume), reactor temperature of 426.7° C. (800° F.) and 2000 psig H$_2$ pressure. The hydrogen flowrate was maintained at 75 Normal Liters (NL)/hr (Note: NL is measured at 0° C. and 1 atmosphere pressure). These conditions produce about the same level of conversion as well as sulfur and Conradson carbon removal as would be expected for the conventional catalysts in a commercial ebullating bed hydrocracker. The percent conversion of materials boiling over 537.8° C. (1000° F.) to materials boiling under 537.8° C. was measured as a function of time expressed as barrels of feed processed per pound of catalystloaded.

Figure 23:
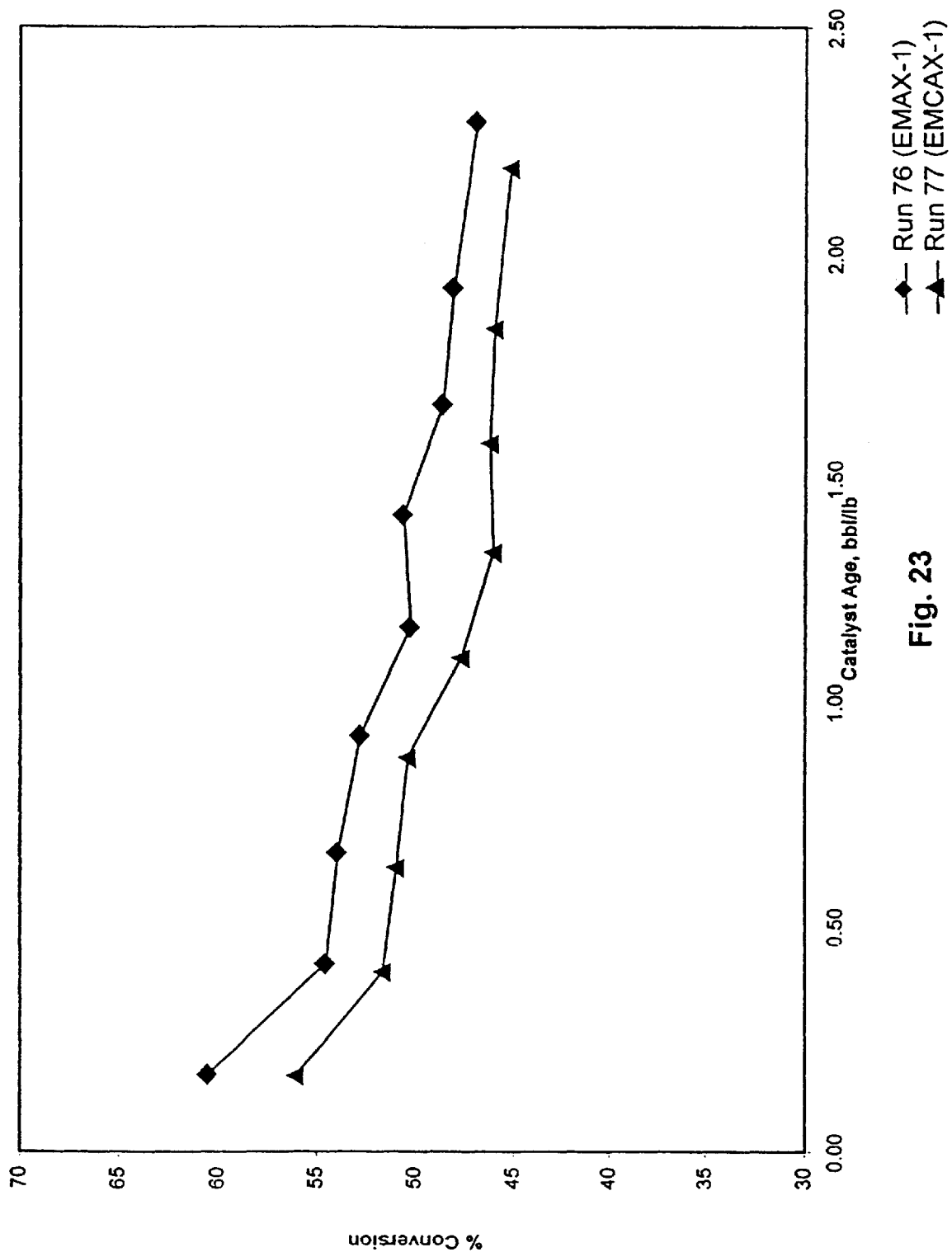

The results are shown at FIG. 23 and designated Run 76.

COMPARATIVE EXAMPLE 7

Example 26 was repeated except that the catalyst from Run 68 was employed in lieu of that from Run 62.

The conversion results are also summarized at FIG. 23 as Run 77. As can be seen from FIG. 23, the AX-1 derived sample of Run 76 exhibits a higher activity for cracking the high boiling (1000+° F.) resid material to lighter products than the reference CAX-1 derived sample of Run 77. The data shown are corrected to the standard operating conditions to remove any fluctuations caused by changes in the actual operating conditions. The AX-1 derived catalyst of Run 76 also has activity advantages for saturation (product API increase), desulfurization and Conradson carbon removal. It is theorized that the higher cracking and hydroactivity of this catalyst is due to the modified pore size distribution, and perhaps the chemical composition of base due to the AX-1 starting materials.

Sediment and metals removal for Run 76 are slightly inferior to the control of Run 77. Sediment is expected to increase at higher resid conversion. The Run 76 sample also has lower porosity in the macro range, which may also be affecting sediment and metals performance on this feed.

TABLE 16

Feedstock Properties

| Feedstock | Arabian Medium Vacuum Resid | |
|---|---|---|
| ID Number | F94-71 | F98-559 |
| AP1 @ 60° F. | 4.87 | 5.60 |
| S.G. @ 60° F. | 1.0376 | 1.0321 |
| Sulfur wt. % | 5.88 | 4.72 |
| Total Nitrogen, wt. % | 0.41 | 0.34 |
| Basic Nitrogen, wt. % | 0.043 | 0.12 |
| Conradson Carbon, wt. % | 23.2 | 26 |
| Pentane Insoluble, wt. % | 27.0 | 22.9 |
| Toluene Insoluble, wt. % | 0.06 | 0.16 |
| Metals (ppm) | | |
| Ni | 36.8 | 29.4 |
| V | 118.3 | 103.3 |
| Fe | 7 | 43.9 |
| Zn | 2.1 | 2 |
| Ca | 21 | 7 |
| Na | 5.6 | 21 |
| K | 1.4 | 1.1 |
| Distillation: | | |
| LV % > 1000° F. | 87 | 97 |

TABLE 17

Operating Conditions of Pilot Plant

Feedstock: Arabian Med VTB
Pressure: 2000 psig
Rx Temp: 790–800° F. (near isothermal)
Feedrate: 75 cc/hr
$H_2$ Once Thru: 75 NL/hr (6000 SCFB)
Run Length: 3 weeks (about 2.0 bbl/lb)
Upflow Regime
Catalyst Loading: 75 cc
LHSV (Catalyst Basis)
Glass Bead Section
Provides reactor space without catalyst
Simulates commercial cat/thermal space ratios

EXAMPLE 27

Example 24 was repeated except the catalyst from Run 64 (EMAX-2) replaced the catalyst of the reference example and the feedstock was an alternate Arab medium Vacuum Resid, the properties for which are summarized at Table 16. The results are grouped as Run 78 and the conversion performance is summarized at FIG. 24.

EXAMPLE 28

Figure 24:
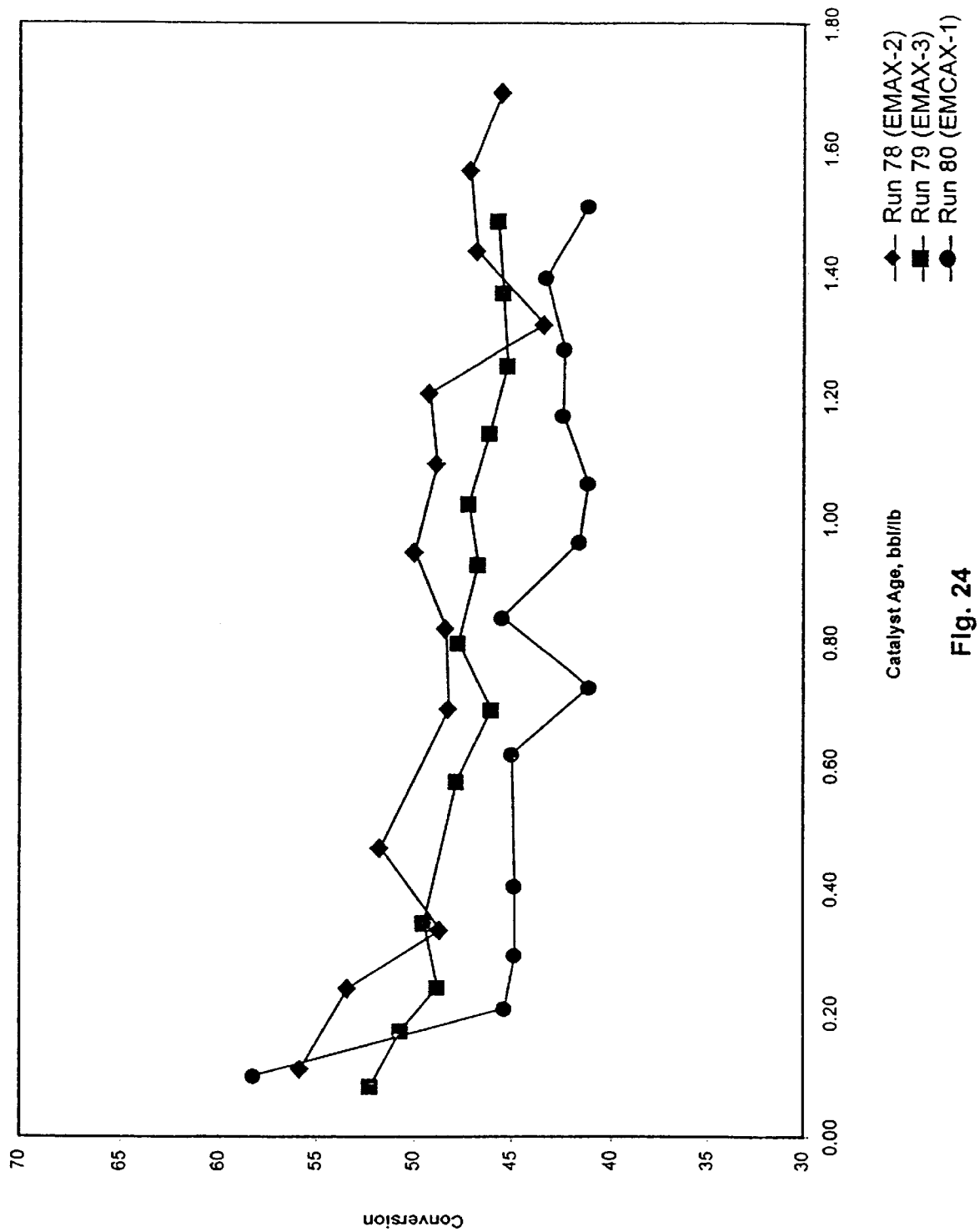

Example 27 was repeated using the catalyst of Run 66 (EMAX-3) and the results grouped as Run 79 and depicted at FIG. 24.

COMPARATIVE EXAMPLE 8

Example 27 was repeated using the control catalyst of Run 68 (EMCAX-1). The results are grouped as Run 80 and depicted at FIG. 24.

As can be seen from FIG. 24, Runs 78 and 79 are superior to the control in conversion.

Moreover, in respect to:

(a) Total Liquid Product API, the control was inferior to Run 79 but superior to Run 78;

(b) Sulfur Reduction—the control was inferior to Run 79 but superior to Run 78;

(c) wt. % Conradson Carbon Residue (CCR) Reduction—the control was inferior to Run 79 but superior to Run 78;

(d) Sediment Reduction—the control was superior to Runs 78 and 79, with Run 79 being better than Run 78;

(e) Vanadium Reduction—the control was superior to Runs 78 and 79, with Run 79 being better than Run 78;

(f) Nickel Reduction—the control was inferior to Run 79 but superior to Run 78.

Note that the CCR is the leftover carbonaceous material after all of the lighter hydrocarbons are boiled away. It is measured by a standard destructive distillation test (ASTM (D-189). The test is run on the feed and on the products. The difference between the two numbers is the CCR reduction.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art, without departing from the spirit of the invention.

What is claimed is:

1. In a process for the hydroprocessing of petroleum feedstock wherein said feedstock is contacted with hydrogen under pressure in the presence of a supported hydroprocessing catalyst, the improvement comprising utilizing porous agglomerate particles as the support for the supported catalyst wherein said porous agglomerate particles comprise constituent composite particles of a swellable clay component intimately dispersed within an aluminum oxide component wherein:

(A) the agglomerate particle size is from about 0.5 to about 5 mm;

(B) the aluminum oxide component comprises at least 75 wt. % alumina, at least 3.75 wt. % of which aluminum oxide component is in the form of crystalline boehmite, gamma alumina derived from the crystalline boehmite, or mixtures thereof; and (C) the swellable clay component is present within the aluminum oxide component at an amount (i) of less than 10 wt. %, based on the combined weight of the aluminum oxide and swellable clay components, and (ii) effective to increase at least one of the hydrothermal stability, mercury pore volume, and the mercury mesopore pore mode of the agglomerate particles relative to the corresponding hydrothermal stability, pore volume and mesopore pore mode of the agglomerate particles in the absence of the swellable clay.

2. The process of claim 1 wherein the support agglomerate particles possess:

(i) a specific surface area of at least about 200 $m^2/g$;

(ii) a mesopore mercury pore mode of from about 60 to about 400 Angstroms; and (iii) a total mercury pore volume of from about 0.5 to about 1.8 cc/g.

3. The process of claim 1 wherein in the porous agglomerate particles, the aluminum oxide component comprises at least 90 wt. % rehydrated active alumina at least 7.5% of which aluminum oxide component is in the form of crystalline boehmite, gamma alumina derived from the crystalline boehmite, or mixtures thereof, and the swellable clay component is present in the agglomerate constituent particles at from about 1 to about 8 wt. %, based on the combined weight of the swellable clay component and aluminum oxide component.

4. The process of claim 1 wherein in the porous agglomerate particles, the swellable clay component comprises smectite clay.

5. The process of claim 4 wherein in the porous agglomerate particles, the smectite clay is selected from the group consisting of montmorillonite, hectorite, and saponite.

6. The process of claim 1 wherein in the porous agglomerate particles, the smectite is a natural or synthetic hectorite.

7. The process of claim 6 wherein in the porous agglomerate particles, the smectite is a synthetic hectorite.

8. The process of claim 7 wherein in the porous agglomerate particles, the swellable clay component is present therein at from about 2 to about 7 wt. % based on the combined weight of the aluminum oxide and swellable clay components.

9. The process of claim 1 wherein the porous agglomerate particles when calcined at 537.8° C. for 2 hours, have a mesopore mercury pore mode of from about 70 to about 250 Angstroms, a mercury surface area of from about 200 to about 350 $m^2/g$, and a total mercury pore volume of from about 0.6 to about 1.5 cc/g.

10. The process of claim 1 wherein the porous agglomerate particles additionally contain from about 2 to about 10 wt. % silicate based on the combined weight of silicate, aluminum oxide component, and swellable clay component, intimately dispersed within the constituent particles.

11. The process of claim 1 wherein the catalyst supported on the agglomerate particles is at least one hydrogenation component of a metal having hydrogenation activity selected from the group consisting of Group VIII and Group VIA metals of the Periodic Table.

12. The process of claim 1 which is conducted in at least one ebullating bed reactor.

* * * * *

UNITED STATES PATENT AND TRADEMARK OFFICE
CERTIFICATE OF CORRECTION

PATENT NO.    : 6,451,200 B1  
DATED         : September 17, 2002  
INVENTOR(S)   : Lussier et al.

It is certified that error appears in the above-identified patent and that said Letters Patent is hereby corrected as shown below:

<u>Column 51,</u>  
Line 13, "1" should be -- 5 --.

Signed and Sealed this

Seventeenth Day of December, 2002

JAMES E. ROGAN  
*Director of the United States Patent and Trademark Office*